US012479917B2

(12) United States Patent
Maier et al.

(10) Patent No.: US 12,479,917 B2
(45) Date of Patent: Nov. 25, 2025

(54) METHODS OF TREATING NSCLC COMPRISING ADMINISTERING PLATINUM DOUBLET CHEMOTHERAPY FOLLOWED BY AN ANTI-PD-1 ANTIBODY AND AN ANTI-CTLA-4 ANTIBODY

(71) Applicant: Bristol-Myers Squibb Company, Princeton, NJ (US)

(72) Inventors: Sabine Maier, Lawrenceville, NJ (US); Abderrahim Oukessou, Skillman, NJ (US); Nicholas Allan Botwood, Princeton, NJ (US); Kelly L. Covello, Philadelphia, PA (US); Michael V. Mandola, Williamstown, NJ (US); Stephen R. Lane, Doylestown, PA (US)

(73) Assignee: Bristol-Myers Squibb Company, Princeton, NJ (US)

( * ) Notice: Subject to any disclaimer, the term of this patent is extended or adjusted under 35 U.S.C. 154(b) by 960 days.

(21) Appl. No.: 17/287,838

(22) PCT Filed: Oct. 23, 2019

(86) PCT No.: PCT/US2019/057672
§ 371 (c)(1),
(2) Date: Apr. 22, 2021

(87) PCT Pub. No.: WO2020/086724
PCT Pub. Date: Apr. 30, 2020

(65) Prior Publication Data
US 2021/0380693 A1   Dec. 9, 2021

Related U.S. Application Data

(60) Provisional application No. 62/749,393, filed on Oct. 23, 2018.

(51) Int. Cl.
| | | |
|---|---|---|
| *C07K 16/28* | (2006.01) |
| *A61K 31/337* | (2006.01) |
| *A61K 31/519* | (2006.01) |
| *A61K 31/555* | (2006.01) |
| *A61K 33/243* | (2019.01) |
| *A61K 39/00* | (2006.01) |
| *A61K 45/06* | (2006.01) |
| *A61P 35/00* | (2006.01) |

(52) U.S. Cl.
CPC ........ *C07K 16/2818* (2013.01); *A61K 31/337* (2013.01); *A61K 31/519* (2013.01); *A61K 31/555* (2013.01); *A61K 33/243* (2019.01); *A61K 45/06* (2013.01); *A61P 35/00* (2018.01); *C07K 16/2827* (2013.01); *A61K 2039/505* (2013.01); *A61K 2039/545* (2013.01)

(58) Field of Classification Search
None
See application file for complete search history.

(56) References Cited

U.S. PATENT DOCUMENTS

| | | |
|---|---|---|
| 5,977,318 A | 11/1999 | Linsley et al. |
| 6,051,227 A | 4/2000 | Allison et al. |
| 6,682,736 B1 | 1/2004 | Hanson et al. |
| 6,808,710 B1 | 10/2004 | Wood et al. |
| 6,984,720 B1 | 1/2006 | Korman et al. |
| 7,034,121 B2 | 4/2006 | Carreno et al. |
| 7,488,802 B2 | 2/2009 | Collins et al. |
| 7,767,429 B2 | 8/2010 | Bookbinder et al. |
| 7,943,743 B2 | 5/2011 | Korman et al. |
| 8,008,449 B2 | 8/2011 | Korman et al. |
| 8,168,757 B2 | 5/2012 | Finnefrock et al. |
| 8,217,149 B2 | 7/2012 | Irving et al. |
| 8,354,509 B2 | 1/2013 | Carven et al. |
| 8,779,105 B2 | 7/2014 | Korman et al. |
| 8,900,587 B2 | 12/2014 | Carven et al. |
| 9,212,224 B2 | 12/2015 | Cogswell |
| 9,580,507 B2 | 2/2017 | Korman et al. |
| 9,856,320 B2 | 1/2018 | Cogswell |
| 10,072,082 B2 | 9/2018 | Cogswell |
| 10,138,299 B2 | 11/2018 | Cogswell |
| 10,266,594 B1 | 4/2019 | Cogswell |

(Continued)

FOREIGN PATENT DOCUMENTS

| | | |
|---|---|---|
| CN | 106714839 | 5/2017 |
| WO | WO-2000037504 A2 | 6/2000 |

(Continued)

OTHER PUBLICATIONS

Langer et al (Carboplatin and pemetrexed with or without pembrolizumab for advanced, non-squamous non-small-cell lung cancer: a randomized, phase 2 cohort of the open-label Keynote-021 study, Lancet Oncol 2016; 17: 1497-508). (Year: 2016).*
Clinical Trial: NCT03215706 (Published Aug. 28, 2018) (Year: 2018).*
Govindan et al. ("Phase III Trial of Ipilimumab Combined With Paclitaxel and Carboplatin in Advanced Squamous Non-Small-Cell Lung Cancer." Journal of clinical oncology : official journal of the American Society of Clinical Oncology vol. 35,30 (2017): 3449-3457. doi:10.1200/JCO.2016.71.7629), (Year: 2017).*
Rosell et al (2002) (Phase III randomised trial comparing paclitaxel/carboplatin with paclitaxel/cisplatin in patients with advanced non-small-cell lung cancer: a cooperative multinational trial, Annals of Oncology, vol. 13, pp. 1539-1549, Oct. 2002), (Year: 2002).*

(Continued)

*Primary Examiner* — Janet L Epps-Smith
*Assistant Examiner* — Sarah A Alsomairy
(74) *Attorney, Agent, or Firm* — Sterne, Kessler, Goldstein & Fox P.L.L.C.

(57) ABSTRACT

The disclosure provides a method for treating a subject afflicted with a tumor, e.g., derived from a non-small cell lung cancer (NSCLC), comprising administering to the subject a combination of a (a) chemotherapy, (b) an anti-PD-1 antibody or an anti-PD-L1 antibody, and (c) an anti-CTLA-4 antibody, wherein the chemotherapy is administered for a period of time that is less than the standard.

20 Claims, 2 Drawing Sheets

(56) References Cited

U.S. PATENT DOCUMENTS

| | | |
|---|---|---|
| 10,266,595 B2 | 4/2019 | Cogswell |
| 10,266,596 B1 | 4/2019 | Cogswell |
| 10,308,714 B2 | 6/2019 | Cogswell |
| 10,316,090 B2 | 6/2019 | Cogswell |
| 10,316,091 B2 | 6/2019 | Cogswell |
| 10,323,092 B2 | 6/2019 | Cogswell |
| 10,323,093 B2 | 6/2019 | Cogswell |
| 10,577,423 B2 | 3/2020 | Cogswell |
| 10,584,170 B2 | 3/2020 | Cogswell |
| 10,604,575 B2 | 3/2020 | Cogswell |
| 2015/0079109 A1 | 3/2015 | Li et al. |
| 2016/0272708 A1 | 9/2016 | Chen |
| 2017/0158776 A1 | 6/2017 | Feltquate et al. |
| 2018/0155429 A1 | 6/2018 | Finckenstein |
| 2024/0417471 A1 | 12/2024 | Cogswell |

FOREIGN PATENT DOCUMENTS

| | | | |
|---|---|---|---|
| WO | WO-2007113648 A2 | 10/2007 | |
| WO | WO-2008156712 A1 | 12/2008 | |
| WO | WO-2011066389 A1 | 6/2011 | |
| WO | WO-2015112800 A2 | 8/2012 | |
| WO | WO-2012122444 A1 | 9/2012 | |
| WO | WO-2012145493 A1 | 10/2012 | |
| WO | WO-2013079174 A1 | 6/2013 | |
| WO | WO-2013173223 A1 | 11/2013 | |
| WO | WO-2013181634 A2 | 12/2013 | |
| WO | WO-2014179664 A2 | 11/2014 | |
| WO | WO-2014194302 A2 | 12/2014 | |
| WO | WO-2014206107 A1 | 12/2014 | |
| WO | WO-2015035606 A1 | 3/2015 | |
| WO | WO-2015085847 A1 | 6/2015 | |
| WO | WO-2015112800 A1 | 7/2015 | |
| WO | WO-2015112900 A1 | 7/2015 | |
| WO | WO-2015176033 A1 | 11/2015 | |
| WO | WO-2016106159 A1 | 6/2016 | |
| WO | WO-2016149201 A2 | 9/2016 | |
| WO | WO-2016196237 A1 | 12/2016 | |
| WO | WO-2016197367 A1 | 12/2016 | |
| WO | WO-2017019846 A1 | 2/2017 | |
| WO | WO-2017020291 A1 | 2/2017 | |
| WO | WO-2017020858 A1 | 2/2017 | |
| WO | WO-2017024465 A1 | 2/2017 | |
| WO | WO-2017024515 A1 | 2/2017 | |
| WO | WO-2017025016 A1 | 2/2017 | |
| WO | WO-2017025051 A1 | 2/2017 | |
| WO | WO-2017028058 A1 | 2/2017 | |
| WO | WO-2017034916 A1 | 3/2017 | |
| WO | WO-2017040790 A1 | 3/2017 | |
| WO | WO-2017106061 A1 | 6/2017 | |
| WO | WO-2017123557 A1 | 7/2017 | |
| WO | WO-2017132825 A1 | 8/2017 | |
| WO | WO-2017132827 A1 | 8/2017 | |
| WO | WO-2017133540 A1 | 8/2017 | |
| WO | WO-2017210631 A1 | 12/2017 | |
| WO | WO-2018183928 A1 * | 10/2018 | ............ A61P 35/00 |
| WO | WO-2019075468 A1 | 4/2019 | |
| WO | WO-2019191676 A1 | 10/2019 | |

OTHER PUBLICATIONS

Hellmann et al. (Nivolumab plus ipilimumab as first-line treatment for advanced non-small-cell lung cancer (CheckMate 012): results of an open-label, phase 1, multicohort study. Lancet Oncol. 2017; 18(1):31-41. doi: 10.1016/S1470-2045(16)30624-6), (Year: 2017).*

Rizvi et al. ("Nivolumab in Combination With Platinum-Based Doublet Chemotherapy for First-Line Treatment of Advanced Non-Small-Cell Lung Cancer." Journal of clinical oncology : official journal of the American Society of Clinical Oncology vol. 34,25 (2016): 2969-79. doi: 10.1200/JCO.2016.66.9861), (Year: 2016).*

Niyongere et al Immunotherapy combination strategies (non-chemotherapy) in non-small cell lung cancer (J Thorac Dis 2018;10(Suppl 3):S433-S450; Published Feb. 2018). (Year: 2018).*

Healio, "FDA Accepts Application for Opdivo-Yervoy, First Immune-Oncology Combination for Lung Cancer," HemOnc Today, accessed at [https://www.healio.com/hematology-oncology/lung-cancer/news/online/{afc29ef3-500c-45f8-8770-d3bee9929533}/fda-accepts-application-for-opdivo-yervoy-first-immuno-oncology-combination-for-lung-cancer], published Jun. 22, 2018.

Borghaei, H., et al., "Nivolumab (Nivo) + Platinum-Doublet Chemotherapy (Chemo) vs Chemo as First-Line (1L) Treatment (Tx) for Advanced Non-Small Cell Lung Cancer (NSCLC) with <1% Tumor PD-L1 Expression: Results from CheckMate 227," Journal of Clinical Oncology 36(15 Suppl):9001, American Society of Clinical Oncology, United States (Jun. 1, 2018).

Borghaei, H., "Nivolumab Plus Chemotherapy Prolongs PFS in Lung Cancer with PD-L1 Less Than 1%," accessed at [https://www.healio.com/hematology-oncology/lung-cancer/news/online/{e8a16781-c9a5-4a28-8407-91ae8ada1690}/nivolumab-plus-chemotherapy-prolongs-pfs-in-lung-cancer-with-low-tumor-mutational-burden], published Jun. 12, 2018.

Brahmer., J.R., et al., "Phase I Study of Single-agent Anti-programmed Death-1 (MDX-1106) in Refractory Solid Tumors: Safety, Clinical Activity, Pharmacodynamics, and Immunologic Correlates," Journal of Clinical Oncology 28(19):3167-3175, American Society of Clinical Oncology, United States (Jul. 2010).

Brahmer, J.R., et al., "Safety and Activity of Anti-PD-L1 Antibody in Patients with Advanced Cancer," The New England Journal of Medicine 366(26):2455-2465, Massachusetts Medical Society, United States (Jun. 2012).

Bristol-Meyers Squibb Company, "CheckMate-9LA, a Phase 3 Trial Evaluating Opdivo (nivolumab) Plus Low-Dose Yervoy (ipilimumab) Combined with Chemotherapy, Meets Primary Endpoint Demonstrating Superior Overall Survival Compared to Chemotherapy Alone in First-Line Lung Cancer", BMS Newsroom, accessed at URL:[https://news.bms.com/news/details/2019/CheckMate--9LA-a-Phase-3-Trial-Evaluating-Opdivo-nivolumab-Plus-Low-Dose-Yervoy-ipilimumab-Combined-with-Chemotherapy-Meets-Primary-Endpoint-Demonstrating-Superior-Overall-Survival-Compared-to-Chemotherapy-Alone-in-First-Line-Lung-Cancer/default.aspx], published Oct. 22, 2019, 7 pages.

National Library of Medicine, ClinicalTrials.gov ID NCT03215706, "A Study of Nivolumab and Ipilimumab Combined with Chemotherapy Compared to Chemotherapy Alone in First Line NSCLC (CheckMate 9LA)," Oct. 2, 2018, accessed at URL:[https://classic.clinicaltrials.gov/ct2/show/NCT03215706].

National Library of Medicine, ClinicalTrials.gov Id NCT02659059, "Nivolumab in Combination With Ipilimumab (Part 1); Nivolumab Plus Ipilimumab in Combination With Chemotherapy (Part 2) as First Line Therapy in Stage IV Non-Small Cell Lung Cancer (CheckMate 568)," Sep. 18, 2018; available at URL:[https://classic.clinicaltrials.gov/ct2/show/NCT02659059].

National Library of Medicine, ClinicalTrials. gov Id NCT03043872, "Durvalumab ± Tremelimumab in Combination with Platinum Based Chemotherapy in Untreated Extensive-Stage Small Cell Lung Cancer (CASPIAN)," Oct. 8, 2018; available at URL:[https://clinicaltrials.gov/study/NCT03043872].

National Library of Medicine, ClinicalTrials.gov Id NCT02477826, "An Investigational Immuno-therapy Trial of Nivolumab, or Nivolumab Plus Ipilimumab, or Nivolumab Plus Platinum-doublet Chemotherapy, Compared to Platinum Doublet Chemotherapy in Patients With Stage IV Non-Small Cell Lung Cancer (NSCLC) (CheckMate 227)," Feb. 12, 2018; available at https://clinicaltrials.gov/study/NCT02477826.

Columbus, G., "Frontline Nivolumab/Ipilimumab Combo Improves OS in Advanced NSCLS," Sep. 28, 2019; available at https://www.onclive.com/view/frontline-nivolumab-ipilimumab-combo-improves-os-in-advanced-nsclc, 7 pages.

Condeelis, J. and Weissleder, R., "In Vivo Imaging in Cancer," Cold Spring Harbor Perspectives in Biology 2(12):a003848, Cold Spring Harbor Laboratory Press, United States (Dec. 2010).

Davis, A.A., et al., "Abstract 658: Association of tumor mutational burden (TMB) with DNA repair mutations and response to anti-PD-1/PD-L1 therapy in non-small cell lung cancer (NSCLC)," in: Proceedings of the American Association for Cancer Research Annual Meeting, Apr. 2017.

(56) References Cited

OTHER PUBLICATIONS

Drake, C.G., et al., "Survival, Safety, and Response Duration Results of Nivolumab (Anti-PD-1; BMS-936558; ONO-4538) in a Phase I Trial in Patients with Previously Treated Metastatic Renal Cell Carcinoma (mRCC): Long-Term Patient Follow-Up," Journal of Clinical Oncology 31(15_Suppl):4514, American Society of Clinical Oncology, United States (May 2013).

DEN170058: Evaluation of Automatic Class III Designation for MSK-IMPACT (Integrated Mutation Profiling of Actionable Cancer Targets): Decision Summary, United States Food and Drug Administration, accessed at https://www.accessdata.fda.gov/cdrh_docs/reviews/DEN170058.pdf, Nov. 2017, 57 pages.

Flies, D.B., et al., "Blockade of the B7-H1/PD-1 Pathway for Cancer Immunotherapy," The Yale Journal of Biology and Medicine 84(4):409-421, Yale Journal of Biology and Medicine, United States (Dec. 2011).

Foundation Medicine, "Foundation Medicine Announces Commercial Availability of FoundationOne CDxTM, the First FDA-Approved Comprehensive Genomic Profiling Assay for All Solid Tumors Incorporating Multiple Companion Diagnostics," Business Wire.com, published on Mar. 30, 2018, accessed at https://www.businesswire.com/news/home/20180330005010/en/Foundation-Medicine-Announces-Commercial-Availability-of-FoundationOne-CDx%E2%84%A2 on May 24, 2018, 3 pages.

Foundation Medicine, "Foundationone® CDx: Technical Information," FoundationMedicine.com, accessed at https://www.accessdata.fda.gov/cdrh_docs/pdf17/P170019S006C.pdf on Mar. 16, 2018, 45 pages.

Foundation Medicine, "Foundationone® CDx Liquid: Technical Specifications," accessed at http://www.fllcdxlabel.com/ on Oct. 6, 2018 4 pages.

Goodman, A., "Nivolumab Plus Ipilimumab Improves Progression-Free Survival in NSCLC With High Tumor Mutational Burden," ascopost.com, Jun. 25, 2018; accessed at https://ascopost.com/issues/june-25-2018/nivolumab-plus-ipilimumab-improves-survival-in-nsclc/ on Oct. 10, 2023.

Gorelik, L., et al., "Abstract 4606: Preclinical Characterization of a Novel Fully Human IgG1 Anti-PD-L1 mAb CK-301," Proceedings of 2017 AACR Annual Meeting 77(13):4606, American Association for Cancer Research, United States (Jul. 2017).

Hamid, O. & Carvajal, R.D., "Anti-programmed Death-1 and Anti-programmed Death-ligand 1 Antibodies in Cancer Therapy," Expert Opinion on Biological Therapy 13(6):847-861, Taylor & Francis, England (Jun. 2013).

Hamid, O., et al., "Safety and Tumor Responses with Lambrolizumab (Anti-Pd-1) in Melanoma," The New England Journal of Medicine 369(2):134-144, Massachusetts Medical Society, United States of America (Jul. 2013).

Hanna, N., et al., "Randomized Phase III Trial of Pemetrexed Versus Docetaxel in Patients with Non-small-cell Lung Cancer Previously Treated with Chemotherapy," Journal of Clinical Oncology 22(9):1589-1597, American Society of Clinical Oncology, United States (May 2004).

Hellmann, M.D., et al., "Nivolumab plus Ipilimumab in Lung Cancer with a High Tumor Mutational Burden," New England Journal of Medicine 378(22):2093-2104, Massachusetts Medical Society, United States (May 2018).

Hendriks, L.E., et al., "Clinical Utility of Tumor Mutational Burden in Patients with Non-Small Cell Lung Cancer Treated with Immunotherapy," Translational Lung Cancer Research, 7(5): 647-660 (Dec. 2018).

Herbst, R. S., et al., "A Study of MPDL3280A, an Engineered PD-L1 Antibody in Patients with Locally Advanced or Metastatic Tumors," Journal of Clinical Oncology, 31(Suppl): Abstract 3000, American Society of Clinical Oncology, United States (May 2013).

International Search Report and Written Opinion for International Application No. PCT/US2019/057672, mailed Feb. 21, 2020, 23 pages.

Jamal-Hanjani, M., et al., "Translational Implications of Tumor Heterogeneity," Clinical Cancer Research 21(6):1258-1266, The Association, United States (Mar. 2015).

Johnson, D.B., et al., "Severe Cutaneous and Neurologic Toxicity in Melanoma Patients during Vemurafenib Administration Following Anti-PD-1 Therapy," Cancer Immunology Research 1(6):373-377, American Association for Cancer Research, United States (Dec. 2013).

Liu, S.Y., and Wu, Y.L., "Ongoing Clinical Trials of PD-1 and PD-L1 Inhibitors for Lung Cancer in China, "Journal of Hematology & Oncology, 10(1):136, Biomed Central, England (Jul. 2017).

McCabe, K.E. and Wu, A.M., "Positive Progress in ImmunoPET—not Just a Coincidence," Cancer Biotherapy & Radiopharmaceuticals 25(3):253-261, Mary Ann Liebert, Inc, United States (Jun. 2010).

McGranahan, N., et al., "Clonal Neoantigens Elicit T Cell Immunoreactivity and Sensitivity to Immune Checkpoint Blockade," Science 351(6280):1463-1469, American Association for the Advancement of Science, United States (Mar. 2016).

National Cancer Institute, "Head and Neck Cancers," available at URL:[https://www.cancer.gov/types/head-and-neck/head-neck-fact-sheet], last accessed Oct. 9, 2023, 12 pages.

National Cancer Institute, "Ovarian Epithelial, Fallopian Tube, and Primary Peritoneal Cancer Treatment (PDQ®)-Health Professional Version," available at URL:[https://www.cancer.gov/types/ovarian/hp/ovarian-epithelial-treatment-pdq], last visited Oct. 9, 2023, 85 pages.

National Comprehensive Cancer Network, NCCN Guidelines, available at URL:[https://www.nccn.org/guidelines/nccn-guidelines], last accessed Nov. 30, 2023, 1 page.

National Comprehensive Cancer Network, NCCN Guidelines, "Treatment by Cancer Type," available at URL:[https://www.nccn.org/guidelines/category_1], last accessed Oct. 9, 2023, 2 pages.

National Comprehensive Cancer Network, NCCN Guidelines, Version 3.2014, "Non-Small Cell Lung Cancer," United States (2014).

Olafsen, T., et al., "ImmunoPET Imaging of B-Cell Lymphoma using $^{124}$I-Anti-CD20 scFv Dimers (Diabodies)," Protein Engineering, Design & Selection 23(4):243-249, Oxford University Press, England (Jan. 2010).

Pardoll, D.M., "The Blockade of Immune Checkpoints in Cancer Immunotherapy," Nature Reviews Cancer 12(4):252-264, Nature Publishing Group, England (Mar. 2012).

Pawlik, T.M., et al., "Colorectal Carcinogenesis: MSI-H Versus MSI-L," Disease Markers 20(4-5): 199-206, Hindawi Pub. Corp, United States (2004).

Paz-Ares, L.G., et al., "A Phase 3, Randomized Study of First-Line Durvalumab (D) ± Tremelimumab (T) + Platinum-Based Chemotherapy (CT) vs CT Alone in Extensive Disease Small-Cell Lung Cancer (ED-SCLS): Caspian," Journal of Clinical Oncology, 35(15), 2017 ASCO Annual Meeting I (May 30, 2017).

Peters, S., et al., "Abstract CT082: Impact of Tumor Mutation Burden on the Efficacy of First-line Nivolumab in Stage Iv or Recurrent Non-small Cell Lung Cancer: An Exploratory Analysis of Checkmate 026," Proceedings: AACR Annual Meeting 2017 77(13_Suppl):CT082, American Association for Cancer Research, United States (Jul. 2017).

Exosome Diagnostics, Inc., "Plasma-Based Solid Tumor Mutation Panel" Liquid Biopsy, Exosomedx.com, accessed at URL:[https://web.archive.org/web/20161223185114/http://exosomedx.com/sites/default/files/uploads/diagnostics/pharma_services_051816_v4.pdf] on Jun. 16, 2021, 2 pages.

Ramalingam, S.S., et al., "Abstract CT078: Tumor Mutational Burden (TMB) as a Biomarker for Clinical Benefit from Dual Immune Checkpoint Blockade with Nivolumab (nivo) + Ipilimumab (ipi) in First-Line (IL) Non-Small Cell Lung Cancer (NSCLC): Identification of TMB Cutoff from CheckMate 568," Proceedings of 2018 AACR Annual Meeting 78(13):CT078, American Association for Cancer Research, United States (Jul. 2018).

Ready, N., et al., "First-Line Nivolumab Plus Ipilimumab in Advanced Non-Small-Cell Lung Cancer (CheckMate 568): Outcomes by Programmed Death Ligand 1 and Tumor Mutational Burden as Biomarkers", Journal of Clinical Oncology: Official Journal of the American Society of Clinical Oncology 37(12):992-1000, American Society of Clinical Oncology, United States (Feb. 2019).

(56) References Cited

OTHER PUBLICATIONS

Ribas, A., "Anti-CTLA4 Antibody Clinical Trials in Melanoma," Update on Cancer Therapeutics 2(3):133-139, Elsevier, Ltd, England (Sep. 2007).

Rini, B.I., et al., "Comparative Effectiveness of Axitinib Versus Sorafenib in Advanced Renal Cell Carcinoma (AXIS): A Randomised Phase 3 Trial," The Lancet 378(9807):1931-1939, Elsevier Ltd., United Kingdom (Dec. 2011).

Rizvi, N.A., et al., "Mutational Landscape Determines Sensitivity to PD-1 Blockade in Non-Small Cell Lung Cancer," Science 348(6230): 124-128., American Association for the Advancement of Science, United States (Apr. 2015).

Rizvi, N.A., et al., "Nivolumab in Combination With Platinum-Based Doublet Chemotherapy for First-Line Treatment of Advanced Non-Small-Cell Lung Cancer," Journal of Clinical Oncology 34(25):2969-2979, American Society of Clinical Oncology, United States (Sep. 2016).

Siegel, R. et al., "Cancer Statistics," CA: A Cancer Journal for Clinicians 64(1): 9-29, Wiley-Blackwell, United States (Jan. 2014).

Singal, G., et al., "Development and Validation of a Real-World Clinicogenomic Database," 2017 ASCO Annual Meeting, American Society of Clinical Oncology, United States (May 30, 2017).

Taube, J.M., et al., "Colocalization of Inflammatory Response with B7-H1 Expression in Human Melanocytic Lesions Supports an Adaptive Resistance Mechanism of Immune Escape," Science Translational Medicine 4(127):127ra37, American Association for the Advancement of Science, United States (Mar. 2012).

Topalian, S.L., et al., "Safety, Activity and Immune Correlates of Anti-PD-1 Antibody in Cancer," The New England Journal of Medicine 366(26):2443-2454, Massachusetts Medical Society, United States (Jun. 2012).

Topalian, S.L., et al., "Survival, Durable Tumor Remission, and Long-term Safety in Patients with Advanced Melanoma Receiving Nivolumab," Journal of Clinical Oncology 32(10):1020-1030, American Society of Clinical Oncology, United States (Apr. 2014).

Vogelstein, B., et al., "Cancer Genome Landscapes," Science 339(6127):1546-1558, American Association for the Advancement of Science, United States (Mar. 2013).

Wang, C., et al., "In Vitro Characterization of the Anti-PD-1 Antibody Nivolumab, BMS-936558, and In Vivo Toxicology in Non-human Primates," Cancer Immunology Research 2(9):846-856, American Association for Cancer Research, United States (Sep. 2014).

Xu, X., et al., "The Efficacy and Safety of Anti-PD-1/PD-L1 Antibodies Combined with Chemotherapy or CTLA4 Antibody as a First-Line Treatment for Advanced Lung Cancer," International Journal of Cancer 142(11):2344-2354, Wiley, United States (Jun. 2018).

Yap, T.A., et al., "Intratumor Heterogeneity: Seeing the Wood for the Trees," Science Translational Medicine 4(127):127ps10, American Association for the Advancement of Science, United States (Mar. 2012).

Zhang, F., et al., "Structural Basis of a Novel PD-L1 Nanobody for Immune Checkpoint Blockade," Cell Discovery, 3:17004, Nature Publishing Group, England (Mar. 2017).

Guardant Health, "The Guardant360® Assay Specifications, " GuardantHealth.com, accessed at URL:[https://www.therapyselect. de/sites/default/files/downloads/guardant360/guardant360_specification-sheet_en.pdf], on Dec. 1, 2023, 2 pages.

National Cancer Institute, Colorectal Cancer, accessed at URL:[http:// www.cancer.gov/types/colorectal], on Dec. 9, 2015, 2 pages.

National Cancer Institute, Head and Neck Cancers, accessed at URL:[https://www.cancer.gov/types/head-and-neck/head-neck-fact-sheet', on Dec. 9, 2015, 9 pages.

National Cancer Institute, Ovarian Epithelial, Fallopian Tube, and Primary Peritoneal Cancer Treatment (PDQ®)-Patient Version, accessed at URL:[https://www.cancer.gov/types/ovarian/patient/ovarian-epithelial-treatment-pdq] on Dec. 9, 2015, 5 pages.

National Cancer Institute, Skin Cancer (Including Melanoma)-Patient Version, accessed at URL:[http://www.cancer.gov/types/ skin], on Dec. 9, 2015, 2 pages.

GenBank, "Human hPD-1 (hPD-1) mRNA, complete cds," Accession No. U64863.1, accessed at URL:[https://www.ncbi.nlm.nih. gov/nuccore/U64863], on Dec. 1, 2023, 3 pages.

GenBank, "Programmed Cell Death 1 Ligand 1," Accession No. Q9NZQ7, accessed at URL:[https://www.ncbi.nlm.nih.gov/protein/ Q9NZQ7], on Dec. 1, 2023, 10 pages.

GenBank, "Cytotoxic T-lymphocyte-associated protein 4 [*Homo sapiens*]," Accession No. AAB59385.1, accessed at URL:[https:// www.ncbi.nlm.nih.gov/protein/AAB59385], on Dec. 1, 2023, 3 pages.

Langer, C., et al., "Carboplatin and pemetrexed with or without pembrolizumab for advanced, non-squamous non-small-cell lung cancer: a randomized, phase 2 cohort of the open-label KEYNOTE-021 study," Lancet Oncol. 17(11): 1497-15080, Elsevier Ltd., United Kingdom (Nov. 2016).

Reck et al., "First-line nivolumab plus ipilimumab with two cycles of chemotherapy versus chemotherapy alone (four cycles) in advanced non-small-cell lung cancer: CheckMate 9LA 2-year update," *ESMO Open* 6(5):1-11 (Oct. 2021).

Antonia et al., "Phase I/II Study of Nivolumab With or Without Ipilimumab for Treatment of Recurrent Small Cell Lung Cancer (SCLC): CA209-032.," J Clin Oncology. May 20, 2015; 33(15S).

Ascierto et al., "Clinical Experiences with Anti-CD137 and Anti-PD1 Therapeutic Antibodies," Semin Oncol. Oct. 2010; 37(5):508-16.

Bai, S., et al., "A Guide to Rational Dosing of Monoclonal Antibodies," Clin Pharmacokinetics 51(2):119-135, Springer-Business, United States (Feb. 2012).

Barbee et al., "Current Status and Future Directions of the Immune Checkpoint Inhibitors Ipilimumab, Pembrolizumab, and Nivolumab in Oncology.,"Annals of Pharmacotherapy. May 19, 2015; 49(8):907-937.

Bi et al., "Model-Informed Drug Development Approach Supporting Approval of the 4-Week (Q4W) Dosing Schedule for Nivolumab (Opdivo) Across Multiple Indications: A Regulatory Perspective," Ann Oncol. Apr. 1, 2019; 30(4):644-651.

Callahan et al., "Peripheral and Tumor Immune Correlates in Patients with Advanced Melanoma Treated with Combination Nivolumab (Anti- PD-1, BMS-936558, ONO-4538) and Ipilimumab," 2013 ASCO Annual Meeting (May 20, 2013).

Callahan et al., "At the Bedside: CTLA-4- and PD-1-Blocking Antibodies in Cancer Immunotherapy," J Leukoc Biol. Jul. 2013; 94(1): 41-53.

Curran et al., "PD-1 and CTLA-4 combination blockade expands infiltrating T cells and reduces regulatory T and myeloid cells within B16 melanoma tumors," Proc Natl Acad Sci USA. Mar. 2, 2010; 107(9):4275-4280.

Feng et al., "Model-based Clinical Pharmacology Profiling of Ipilimumab in Patients with Advanced Melanoma," Br J Clin Pharmacol. Jul. 2014; 78(1):106-17.

Hammers et al., "Expanded Cohort Results from CheckMate 016: A Phase I Study of Nivolumab in Combination with Ipilimumab in Metastatic Renal Cell Carcinoma (mRCC)," J Clin Oncol., 33:15_ suppl, May 20, 2015.

Hellmann, M.D., et al., "Nivolumab plus Ipilimumab in Advanced Non-Small-Cell Lung Cancer," N Engl J Med 381(21):2020-2031, Massachusetts Medical Society, United States (Nov. 2019).

Korman et al., "Activity of Anti-PD-1 in murine tumor models: Role of 'host' PD-L1 and synergistic effect of anti-PD-1 and anti-CTLA-4. J Immunology," Apr. 2007; 178(1_Supplement):S82 (abstract). DOI:10.4049/jimmunol.178.Supp.48.37.

Larkin et al., "Combined Nivolumab and Ipilimumab or Monotherapy in Previously Untreated Melanoma," N Engl J Med. Jul. 2, 2015; 373(1):23- 4. doi: 10.1056/NEJMoa1504030. Epub May 31, 2015.

Lipson et al., "Durable Cancer Regression Off-Treatment and Effective Reinduction Therapy with an Anti-PD-1 Antibody," Clin Cancer Res. Jan. 15, 2013;19(2):462-8.

Lipson et al., "Ipilimumab: An Anti-CTLA-4 Antibody," Clin Cancer Res. Nov. 15, 2011; 17(22):6958-62.

(56) References Cited

OTHER PUBLICATIONS

Mansh, M., "Ipilimumab and Cancer Immunotherapy: A New Hope for Advanced Stage Melanoma," Yale J Biol Med. Dec. 2011; 84(4):381-389.
Mathijssen et al., "Flat-Fixed Dosing Versus Body Surface Area-Based Dosing of Anticancer Drugs in Adults," Oncologist. Aug. 2007; 12(8):913-23.
Mould et al., "Pharmacokinetics and Pharmacodynamics of Monoclonal Antibodies: Concepts and Lessons for Drug Development," BioDrugs. Feb. 1, 2010; 24(1):23-39.
NCT00094653 Version 1, Brief Title: "MDX-010 Antibody, MDX-1379 Melanoma Vaccine, or MDX-010/MDX-1379 Combination Treatment for Patients with Melanoma" (Last Update Posted to clinicaltrials.gov: Jun. 24, 2005).
NCT00441337 Version 1, Brief Title: "Safety and PK Study of MDX- 1106 in Patients With Selected Refractory or Relapsed Malignancies" (Last Update Posted to clinicaltrials.gov: Feb. 28, 2007).
NCT00729950 Version 1, Brief Title: "Study of MDX-010 in Subjects With Unresectable Stage III or Stage IV Malignant Melanoma" (Last Update Posted to clinicaltrials.gov: Aug. 8, 2008).
NCT00730639 Version 1, Brief Title: "A Phase 1b Study of MDX-1106 in Subjects With Advanced or Recurrent Malignancies" (Last Update Posted to clinicaltrials.gov: Aug. 8, 2008).
NCT01024231 Version 3, Brief Title: "Dose-escalation Study of Combination BMS-936558 (MDX-1106) and Ipilimumab in Subjects With Unresectable Stage III or Stage IV Malignant Melanoma" (Last Update Posted to clinicaltrials.gov: Jan. 5, 2010).
NCT01024231 Version 58, Brief Title: "Dose-escalation Study of Combination BMS-936558 (MDX-1106) and Ipilimumab in Subjects With Unresectable Stage III or Stage IV Malignant Melanoma" (Last Update Posted to clinicaltrials.gov: May 1, 2012).
NCT01844505 Version 1, Brief Title: "Phase 3 Study of Nivolumab or Nivolumab Plus Ipilimumab Versus Ipilimumab Alone in Previously Untreated Advanced Melanoma" (Last Update Posted to clinicaltrials.gov: May 1, 2013).
NCT01968109 Version 1, Brief Title: "Safety Study of Anti-LAG-3 With and Without Anti-PD-1 in the Treatment of Solid Tumors" (Last Update Posted to clinicaltrials.gov: Oct. 23, 2013).
NCT02713867 Version 2, Brief Title: "A Dose Frequency Optimization, Trial of Nivolumab 240 mg Every 2 Weeks vs Nivolumab 480 mg Every 4 Weeks in Subjects With Advanced or Metastatic Non-small Cell Lung Cancer Who Received 4 Months of Nivolumab at 3 mg/ kg or 240 mg Every 2 Weeks" (Last Update Posted to clinicaltrials. gov: Mar. 22, 2016).
Philips, G.K. and Atkins, M., "Therapeutic Uses of Anti-PD-1 and Anti-PD-L1 Antibodies," International Immunology 27(1):39-46, The Japanese Society for Immunology, Japan (Oct. 2014).
Postow et al., "Nivolumab and Ipilimumab versus Ipilimumab in Untreated Melanoma," N Engl J Med. May 2, 20151; 372(21):2006-17.
Raedler et al., "Opdivo (Nivolumab): Second PD-1 Inhibitor Receives FDA Approval for Unresectable or Metastatic Melanoma," Am Health Drug Benefits. Mar. 2015; 8(Spec Feature): 180-3.
Simeone et al., "Immunomodulating antibodies in the treatment of metastatic melanoma: The experience with anti-CTLA-4, anti-CD137, and anti-PD1," J Immunotoxicol. Jul. 2012-Sep; 9(3):241-7.
Sznol et al., "Safety and antitumor activity of biweekly MDX-1106 (Anti- PD-1 BMS-0936558/ONO4538) in patients with advanced refractory malignancies," J Clin Oncology. May 20, 2010; 28(15).
Wang, D.D., et al. "Fixed Dosing Versus Body Size-Based Dosing of Monoclonal Antibodies in Adult Clinical Trials," J Clin Pharmacol 49(9):1012-24, United States (Sep. 2009).
Wolchok, J.D., et al., "Ipilimumab monotherapy in patients with pretreated advanced melanoma: a randomised, double-blind, multicentre, phase 2, dose-ranging study," Lancet Oncol. Feb. 2010; 11(2):155-64.
Wolchok, J.D., et al., "Nivolumab Plus Ipilimumab in Advanced Melanoma," The New England Journal of Medicine 369(2):122-133, Massachusetts Medical Society, United States (Jul. 2013).
Zalevsky et al., "Enhanced Antibody Half-Life Improves in Vivo Activity," Nat Biotechnol. Feb. 2010; 28(2):157-9.
Zhao et al., "Model-Based Evaluation of the Efficacy and Safety of Nivolumab Once Every 4 Weeks Across Multiple Tumor Types," Ann Oncol. Feb. 2020; 31(2):302-309.

\* cited by examiner

METHODS OF TREATING NSCLC COMPRISING ADMINISTERING PLATINUM DOUBLET CHEMOTHERAPY FOLLOWED BY AN ANTI-PD-1 ANTIBODY AND AN ANTI-CTLA-4 ANTIBODY

CROSS REFERENCE TO RELATED APPLICATIONS

This PCT application claims the priority benefit of U.S. Provisional Application No. 62/749,393, filed Oct. 23, 2018, which is incorporated herein by reference in its entirety.

FIELD OF THE DISCLOSURE

The present disclosure provides a method for treating a subject afflicted with a tumor using an immunotherapy in combination with a chemotherapy.

BACKGROUND OF THE DISCLOSURE

Immunotherapeutic approaches recently have demonstrated clinical efficacy in several cancer types, including melanoma and hormone-refractory prostate cancer. Tumors may modulate and evade the host immune response through a number of mechanisms, including down regulation of tumor-specific antigen expression and presentation, secretion of anti-inflammatory cytokines, and upregulation of inhibitory ligands. T cell checkpoint regulators such as CTLA-4 and programmed death-1 (PD-1, CD279) are cell surface molecules that, when engaged by their cognate ligands, induce signaling cascades down-regulating T cell activation and proliferation.

PD-1 is a key immune checkpoint receptor expressed by activated T and B cells and mediates immunosuppression. PD-1 is a member of the CD28 family of receptors, which includes CD28, CTLA-4, ICOS, PD-1, and BTLA. Two cell surface glycoprotein ligands for PD-1 have been identified, Programmed Death Ligand-1 (PD-L1) and Programmed Death Ligand-2 (PD-L2), that are expressed on antigen-presenting cells as well as many human cancers and have been shown to downregulate T cell activation and cytokine secretion upon binding to PD-1. Inhibition of the PD-1/PD-L1 interaction mediates potent antitumor activity in preclinical models (U.S. Pat. Nos. 8,008,449 and 7,943,743), and the use of antibody inhibitors of the PD-1/PD-L1 interaction for treating cancer has entered clinical trials (Brahmer et al., 2010; Topalian et al., 2012a; Topalian et al., 2014; Hamid et al., 2013; Brahmer et al., 2012; Flies et al., 2011; Pardoll, 2012; Hamid and Carvajal, 2013).

Nivolumab (formerly designated 5C4, BMS-936558, MDX-1106, or ONO-4538) is a fully human IgG4 (S228P) PD-1 immune checkpoint inhibitor antibody that selectively prevents interaction with PD-1 ligands (PD-L1 and PD-L2), thereby blocking the down-regulation of antitumor T-cell functions (U.S. Pat. No. 8,008,449; Wang et al., 2014). Nivolumab has shown activity in a variety of advanced solid tumors, including renal cell carcinoma (renal adenocarcinoma, or hypernephroma), melanoma, and non-small cell lung cancer (NSCLC) (Topalian et al., 2012a; Topalian et al., 2014; Drake et al., 2013; WO 2013/173223).

Combining immunotherapeutic agents with different mechanisms of action offers the possibility of synergistic response. PD-1 and CTLA-4 are both co-inhibitory molecules, but evidence suggests that they use distinct mechanisms to limit T cell activation. Ipilimumab, and anti-CTLA-4 antibody, has been found to enhance the anti-cancer activity of nivolumab.

However, there remains a need to further enhance the efficacy of anti-PD-1 or anti-PD-L1 therapies. The present disclosure describes methods of administering a combination of an anti-PD-1 antibody (or an anti-PD-L1 antibody), an anti-CTLA-4 antibody, and platinum-based doublet chemotherapy.

SUMMARY OF THE DISCLOSURE

Certain aspects of the present disclosure are directed to a method of treating a tumor in a subject in need thereof, comprising: (1) an induction phase comprising administering to the subject a chemotherapy for a period of time that is less than the standard period of time for the chemotherapy; (2) a post induction phase comprising administering to the subject an antibody or an antigen-binding portion thereof that specifically binds to PD-1 ("an anti-PD-1 antibody") or an antibody or an antigen-binding portion thereof that specifically binds to PD-L1 ("an anti-PD-L1 antibody") after (1).

Some aspects of the present disclosure are directed to a method of treating a tumor in a subject in need thereof, comprising administering to the subject an anti-PD-1 antibody or an anti-PD-L1 antibody, wherein prior to administering the anti-PD-1 antibody or the anti-PD-L1 antibody, the subject is administered an induction phase comprising a chemotherapy for a period of time that is less than the standard period of time for the chemotherapy.

In some embodiments, the induction phase further comprises administering the anti-PD-1 antibody or the anti-PD-L1 antibody. In some embodiments, the method further comprises administering an antibody or an antigen-binding portion thereof that specifically binds to CTLA-4 ("an anti-CTLA-4 antibody"). In some embodiments, the anti-CTLA-4 antibody is administered during the induction phase. In some embodiments, the anti-CTLA-4 antibody is administered during the post induction phase. In some embodiments, the anti-CTLA-4 antibody is administered before or after the anti-PD-1 antibody or the anti-PD-L1 antibody. In some embodiments, the anti-CTLA-4 antibody is administered after the chemotherapy. In some embodiments, the anti-CTLA-4 antibody is administered concurrently with the anti-PD-1 antibody or the anti-PD-L1 antibody.

In some embodiments, the chemotherapy is administered for less than 10 cycles, less than 9 cycles, less than 8 cycles, less than 7 cycles, less than 6 cycles, less than 5 cycles, less than 4 cycles, or less than 3 cycles. In some embodiments, the chemotherapy is administered for 5 cycles, 4 cycles, 3 cycles, 2 cycles, or 1 cycle. In some embodiments, the chemotherapy is administered for less than 5 cycles. In some embodiments, the chemotherapy is administered for less than 4 cycles. In some embodiments, the chemotherapy is administered for less than 3 cycles. In some embodiments, the chemotherapy is administered for less than 2 cycles. In some embodiments, the chemotherapy is administered for no more than 2 cycles.

In some embodiments, the chemotherapy comprises a standard of care therapy. In some embodiments, the chemotherapy comprises an alkylating agent, and antimetabolite, an anti-microtubule agent, a topoisomerase inhibitory, a cytotoxic antibiotic, or any combination thereof.

In some embodiments, the chemotherapy comprises a platinum-based chemotherapy. In some embodiments, the chemotherapy comprises cisplatin, oxaliplatin, carboplatin, nedaplatin, triplatin tetranitrate, phenanthriplatin, picoplatin, satraplatin or any combination thereof. In some embodiments, the chemotherapy comprises a platinum-based chemotherapy and a second agent. In some embodiments, the chemotherapy comprises a platinum-based chemotherapy and paclitaxel. In some embodiments, the chemotherapy comprises a platinum-based chemotherapy and pemetrexed. In some embodiments, the chemotherapy comprises carboplatin and paclitaxel. In some embodiments, the chemotherapy comprises carboplatin and pemetrexed. In some embodiments, the chemotherapy comprises cisplatin and pemetrexed. In some embodiments, the chemotherapy is histology-based.

In some embodiments, the chemotherapy is administered once about every two weeks, once about every three weeks, once about every four weeks, once about every five weeks, or once about every six weeks. In some embodiments, each cycle is three weeks. In some embodiments, the chemotherapy is administered on day one of each three week cycle.

In some embodiments, the chemotherapy comprises administering carboplatin AUC 6 and paclitaxel 200 mg/m$^2$ on day one of each three week cycle. In some embodiments, the chemotherapy comprises administering carboplatin AUC 5 or AUC 6 and pemetrexed 500 mg/m$^2$. In some embodiments, the chemotherapy comprises administering cisplatin 75 mg/m$^2$ and pemetrexed 500 mg/m$^2$.

In some embodiments, the anti-PD-1 antibody cross-competes with nivolumab for binding to human PD-1. In some embodiments, the anti-PD-1 antibody binds to the same epitope as nivolumab. In some embodiments, the anti-PD-1 antibody is a chimeric antibody, a humanized antibody, a human monoclonal antibody, or an antigen-binding portion thereof. In some embodiments, the anti-PD-1 antibody comprises a heavy chain constant region of a human IgG1 isotype or a human IgG4 isotype. In some embodiments, the anti-PD-1 antibody is nivolumab. In some embodiments, the anti-PD-1 antibody is pembrolizumab.

In some embodiments, the anti-PD-1 antibody is administered at a dose ranging from 0.1 mg/kg to 10.0 mg/kg body weight once every 2, 3, or 4 weeks. In some embodiments, the anti-PD-1 antibody is administered at a dose of 3 mg/kg, 5 mg/kg, or 10 mg/kg body weight once every 3 weeks. In some embodiments, the anti-PD-1 antibody is administered at a flat dose. In some embodiments, the anti-PD-1 antibody is administered at a flat dose of at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, at least about 500 mg, or at least about 550 mg. In some embodiments, the anti-PD-1 antibody is administered at a flat dose once about once every 1, 2, 3, or 4 weeks. In some embodiments, the anti-PD-1 antibody is administered at a flat dose of about 360 mg once about every 3 weeks. In some embodiments, the anti-PD-1 antibody is administered at a flat dose of about 240 mg once about every 2 weeks. In some embodiments, the anti-PD-1 antibody is administered at a flat dose of about 480 mg once about every 4 weeks.

In some embodiments, the anti-PD-L1 antibody is a chimeric antibody, a humanized antibody, a human monoclonal antibody, or an antigen-binding portion thereof. In some embodiments, the anti-PD-L1 antibody comprises a heavy chain constant region of a human IgG1 isotype. In some embodiments, the anti-PD-L1 antibody cross-competes for binding to human PD-L1 with an antibody selected from atezolizumab, durvalumab, and avelumab. In some embodiments, the anti-PD-L1 antibody binds the same epitope on human PD-L1 as an antibody selected from atezolizumab, durvalumab, and avelumab. In some embodiments, the anti-PD-L1 antibody is atezolizumab, durvalumab, or avelumab.

In some embodiments, the anti-PD-L1 antibody is administered at a dose ranging from 0.1 mg/kg to 15.0 mg/kg body weight once every 2, 3, or 4 weeks. In some embodiments, the anti-PD-L1 antibody is administered at a dose of 3 mg/kg or 5 mg/kg body weight once every 2 weeks. In some embodiments, the anti-PD-L1 antibody is administered at a dose of 10 mg/kg body weight once every 3 weeks. In some embodiments, the anti-PD-L1 antibody is administered at a flat dose. In some embodiments, the anti-PD-L1 antibody is administered at a flat dose of at least about 240 mg, at least about 300 mg, at least about 320 mg, at least about 400 mg, at least about 480 mg, at least about 500 mg, at least about 560 mg, at least about 600 mg, at least about 640 mg, at least about 700 mg, at least 720 mg, at least about 800 mg, at least about 880 mg, at least about 900 mg, at least 960 mg, at least about 1000 mg, at least about 1040 mg, at least about 1100 mg, at least about 1120 mg, at least about 1200 mg, at least about 1280 mg, at least about 1300 mg, at least about 1360 mg, at least about 1400 mg, or at least about 1500 mg. In some embodiments, the anti-PD-L1 antibody is administered at a flat dose once about once every 1, 2, 3, or 4 weeks. In some embodiments, the anti-PD-L1 antibody is administered at a flat dose of about 1200 mg once about every 3 weeks.

In some embodiments, the anti-CTLA-4 antibody is a chimeric, humanized or human monoclonal antibody or a portion thereof. In some embodiments, the anti-CTLA-4 antibody comprises a heavy chain constant region which is of a human IgG1 isotype. In some embodiments, the anti-CTLA-4 antibody is ipilimumab. In some embodiments, the anti-CTLA-4 antibody is tremelimumab. In some embodiments, the anti-CTLA-4 antibody cross-competes with ipilimumab for binding to human CTLA-4.

In some embodiments, the anti-CTLA-4 antibody is administered at a dose ranging from at least about 0.1 mg/kg to at least about 10.0 mg/kg body weight once about every 1, 2, 3, 4, 5, 6, 7, 8, 9, 10, 11, or 12 weeks. In some embodiments, the anti-CTLA-4 antibody is administered at a dose of about 1 mg/kg body weight once about every 6 weeks. In some embodiments, the anti-CTLA-4 antibody is administered at a dose of about 3 mg/kg body weight once about every 12 weeks. In some embodiments, the anti-CTLA-4 antibody is administered at a flat dose.

In some embodiments, (i) the anti-PD-1 antibody is administered at a flat dose of about 360 mg once about every 3 weeks, and (ii) the anti-CTLA-4 antibody is administered at a dose of about 1 mg/kg body weight once about every 6 weeks.

In some embodiments, the anti-PD-1 antibody is administered at a flat dose of about 360 mg once about every 3 weeks; (ii) the anti-CTLA-4 antibody is administered at a dose of about 1 mg/kg body weight once about every 6 weeks; and (iii) the chemotherapy comprises carboplatin AUC 6 and paclitaxel 200 mg/m$^2$, administered on day one of each 3 week cycle.

In some embodiments, (i) the anti-PD-1 antibody is administered at a flat dose of about 360 mg once about every 3 weeks; (ii) the anti-CTLA-4 antibody is administered at a dose of about 1 mg/kg body weight once about every 6 weeks; and (iii) the chemotherapy comprises carboplatin AUC 5 and pemetrexed 500 mg/m², administered on day one of each 3 week cycle.

In some embodiments, (i) the anti-PD-1 antibody is administered at a flat dose of about 360 mg once about every 3 weeks; (ii) the anti-CTLA-4 antibody is administered at a dose of about 1 mg/kg body weight once about every 6 weeks; and (iii) the chemotherapy comprises carboplatin AUC 6 and pemetrexed 500 mg/m², administered on day one of each 3 week cycle.

In some embodiments, (i) the anti-PD-1 antibody is administered at a flat dose of about 360 mg once about every 3 weeks; (ii) the anti-CTLA-4 antibody is administered at a dose of about 1 mg/kg body weight once about every 6 weeks; and (iii) the chemotherapy comprises cisplatin 75 mg/m² and pemetrexed 500 mg/m², administered on day one of each 3 week cycle.

In some embodiments, the chemotherapy is administered for less than 3 cycles. In some embodiments, the chemotherapy is administered for 2 cycles.

In some embodiments, the subject exhibits progression-free survival of at least about one month, at least about 2 months, at least about 3 months, at least about 4 months, at least about 5 months, at least about 6 months, at least about 7 months, at least about 8 months, at least about 9 months, at least about 10 months, at least about 11 months, at least about one year, at least about eighteen months, at least about two years, at least about three years, at least about four years, or at least about five years after the administration. In some embodiments, the subject exhibits an overall survival of at least about one month, at least about 2 months, at least about 3 months, at least about 4 months, at least about 5 months, at least about 6 months, at least about 7 months, at least about 8 months, at least about 9 months, at least about 10 months, at least about 11 months, at least about one year, at least about 14 months, at least about 16 months, at least about 18 months, at least about 20 months, at least about 22 months, at least about two years, at least about three years, at least about four years, or at least about five years after the administration. In some embodiments, the subject exhibits an objective response rate of at least about 15%, at least about 20%, at least about 25%, at least about 30%, about 35%, about 40%, about 45%, about 50%, about 55%, about 60%, about 65%, about 70%, about 75%, about 80%, about 85%, about 90%, about 95%, or about 100%.

In some embodiments, the tumor has a tumor mutational burden (TMB) status that is a high TMB. In some embodiments, the TMB status is determined by sequencing nucleic acids in the tumor and identifying a genomic alteration in the sequenced nucleic acids. In some embodiments, wherein the genomic alteration comprises: (i) one or more somatic mutations; (ii) one or more nonsynonymous mutations; (iii) one or more missense mutations; (iv) one or more alterations selected from the group consisting of a base pair substitution, a base pair insertion, a base pair deletion, a copy number alteration (CNAs), a gene rearrangement, and any combination thereof; or (v) any combination of (i)-(iv).

In some embodiments, the high TMB has a score of at least 210, at least 215, at least 220, at least 221, at least 222, at least 223, at least 224, at least 225, at least 226, at least 227, at least 228, at least 229, at least 230, at least 231, at least 232, at least 233, at least 234, at least 235, at least 236, at least 237, at least 238, at least 239, at least 240, at least 241, at least 242, at least 243, at least 244, at least 245, at least 246, at least 247, at least 248, at least 249, at least 250, at least 255, at least 260, at least 265, at least 270, at least 275, at least 280, at least 285, at least 290, at least 295, at least 300, at least 305, at least 310, at least 315, at least 320, at least 325, at least 330, at least 335, at least 340, at least 345, at least 350, at least 355, at least 360, at least 365, at least 370, at least 375, at least 380, at least 385, at least 390, at least 395, at least 400, at least 405, at least 410, at least 415, at least 420, at least 425, at least 430, at least 435, at least 440, at least 445, at least 450, at least 455, at least 460, at least 465, at least 470, at least 475, at least 480, at least 485, at least 490, at least 495, or at least 500.

In some embodiments, the subject's TMB status is compared to a reference TMB value, wherein the subject's TMB status is within the highest fractile of the reference TMB value, or wherein the subject's TMB status is within the top tertile of the reference TMB value.

In some embodiments, the biological sample comprises a tumor tissue biopsy, a liquid biopsy, blood, serum, plasma, exoRNA, circulating tumor cells, ctDNA, cfDNA, or any combination thereof.

In some embodiments, the TMB status is determined by: (i) genome sequencing, (ii) exome sequencing, (iii) genomic profiling, or (iv) any combination of (i)-(iii). In some embodiments, the genomic profile comprises one or more genes selected from the group consisting of ABL1, BRAF, CHEK1, FANCC, GATA3, JAK2, MITF, PDCD1LG2, RBM10, STAT4, ABL2, BRCA1, CHEK2, FANCD2, GATA4, JAK3, MLH1, PDGFRA, RET, STK11, ACVR1B, BRCA2, CIC, FANCE, GATA6, JUN, MPL, PDGFRB, RICTOR, SUFU, AKT1, BRD4, CREBBP, FANCF, GID4 (C17orf39), KAT6A (MYST3), MRE11A, PDK1, RNF43, SYK, AKT2, BRIP1, CRKL, FANCG, GLI1, KDM5A, MSH2, PIK3C2B, ROS1, TAF1, AKT3, BTG1, CRLF2, FANCL, GNA11, KDM5C, MSH6, PIK3CA, RPTOR, TBX3, ALK, BTK, CSFIR, FAS, GNA13, KDM6A, MTOR, PIK3CB, RUNX1, TERC, AMER1 (FAM123B), C11orf30 (EMSY), CTCF, FAT1, GNAQ, KDR, MUTYH, PIK3CG, RUNXIT1, TERT (promoter only), APC, CARD11, CTNNA1, FBXW7, GNAS, KEAP1, MYC, PIK3R1, SDHA, TET2, AR, CBFB, CTNNB1, FGF10, GPR124, KEL, MYCL (MYCL1), PIK3R2, SDHB, TGFBR2, ARAF, CBL, CUL3, FGF14, GRIN2A, KIT, MYCN, PLCG2, SDHC, TNFAIP3, ARFRP1, CCND1, CYLD, FGF19, GRM3, KLHL6, MYD88, PMS2, SDHD, TNFRSF14, ARID1A, CCND2, DAXX, FGF23, GSK3B, KMT2A (MLL), NF1, POLD1, SETD2, TOP1, ARID1B, CCND3, DDR2, FGF3, H3F3A, KMT2C (MLL3), NF2, POLE, SF3B1, TOP2A, ARID2, CCNE1, DICER1, FGF4, HGF, KMT2D (MLL2), NFE2L2, PPP2RIA, SLIT2, TP53, ASXL1, CD274, DNMT3A, FGF6, HNFIA, KRAS, NFKBIA, PRDM1, SMAD2, TSC1, ATM, CD79A, DOT1L, FGFR1, HRAS, LMO1, NKX2-1, PREX2, SMAD3, TSC2, ATR, CD79B, EGFR, FGFR2, HSD3B1, LRP1B, NOTCH1, PRKAR1A, SMAD4, TSHR, ATRX, CDC73, EP300, FGFR3, HSP90AA1, LYN, NOTCH2, PRKC1, SMARCA4, U2AF1, AURKA, CDH1, EPHA3, FGFR4, IDH1, LZTR1, NOTCH3, PRKDC, SMARCB1, VEGFA, AURKB, CDK12, EPHA5, FH, IDH2, MAGI2, NPM1, PRSS8, SMO, VHL, AXIN1, CDK4, EPHA7, FLCN, IGFIR, MAP2K1, NRAS, PTCH1, SNCAIP, WISP3, AXL, CDK6, EPHB1, FLT1, IGF2, MAP2K2, NSD1, PTEN, SOCS1, WT1, BAP1, CDK8, ERBB2, FLT3, IKBKE, MAP2K4, NTRK1, PTPN11, SOX10, XPO1, BARD1, CDKN1A, ERBB3, FLT4, IKZF1, MAP3K1, NTRK2, QK1, SOX2, ZBTB2, BCL2, CDKN1B, ERBB4, FOXL2, IL7R, MCL1, NTRK3, RAC1, SOX9, ZNF217, BCL2L1, CDKN2A, ERG, FOXP1, INHBA, MDM2, NUP93, RAD50, SPEN, ZNF703, BCL2L2, CDKN2B, ERRFI1, FRS2, INPP4B, MDM4, PAK3, RAD51, SPOP, BCL6, CDKN2C, ESR1, FUBP1, IRF2, MED12, PALB2, RAF1, SPTA1, BCOR, CEBPA, EZH2, GABRA6, IRF4, MEF2B, PARK2, RANBP2, SRC, BCORL1, CHD2, FAM46C, GATA1, IRS2, MEN1, PAX5, RARA, STAG2, BLM, CHD4, FANCA, GATA2, JAK1, MET, PBRM1, RB1, STAT3, and any combination thereof.

In some embodiments, (i) the tumor comprises a non-small cell carcinoma, (ii) the tumor is recurrent or refractory following at least one previous line of therapy to treat the tumor, or (iii) both (i) and (ii).

In some embodiments, the genomic profile comprises FOUNDATIONONE® CDX™. In some embodiments, the tumor has a TMB of at least about 10 mutations per megabase of genome sequenced.

In some embodiments, the tumor is selected from lung cancer, renal cell carcinoma, ovarian cancer, colorectal cancer, gastrointestinal cancer, esophageal cancer, bladder cancer, lung cancer, and melanoma. In some embodiments, the tumor is derived from a lung cancer, renal cell carcinoma, ovarian cancer, colorectal cancer, gastrointestinal cancer, esophageal cancer, bladder cancer, lung cancer, or melanoma. In some embodiments, the tumor derived from a non-small cell lung cancer (NSCLC) or a small cell lung cancer (SCLC). In some embodiments, the tumor is derived from a NSCLC. In some embodiments, the tumor is derived from a stage IV NSCLC. In some embodiments, the NSCLC is a squamous NSCLC. In some embodiments, the NSCLC is a non-squamous NSCLC.

In some embodiments, the tumor is locally advanced, advanced, or metastatic. In some embodiments, the tumor is refractory or recurrent. In some embodiments, the tumor is refractory following at least one prior therapy to treat the tumor, wherein the at least one prior therapy comprises a standard of care therapy. In some embodiments, the at least one prior therapy comprises a prior chemotherapy. In some embodiments, the prior chemotherapy is a platinum-based chemotherapy.

In some embodiments, at least 1% of tumor cells exhibit membrane PD-L1 expression. In some embodiments, at least 5% of tumor cells exhibit membrane PD-L1 expression.

In some embodiments, the anti-PD-1 antibody and the chemotherapy are administered on the same day. In some embodiments, the anti-PD-1 antibody and the chemotherapy are administered on a different day. In some embodiments, a dose of the anti-PD-1 antibody, a dose of the anti-CTLA-4 antibody, and a dose of the chemotherapy are all administered on the same day.

In some embodiments, (i) the anti-PD-1 antibody is administered once every three weeks, (ii) the anti-CTLA-4 antibody is administered once every six weeks, and (iii) the chemotherapy is administered once every three weeks for two cycles; wherein a dose of the anti-PD-1 antibody, a dose of the anti-CTLA-4 antibody, and a dose of the chemotherapy are all administered on day one of the first three-week cycle. In some embodiments, a dose of the anti-PD-1 antibody and a dose of the chemotherapy are administered on day one of the second three-week cycle. In some embodiments, a dose of the anti-PD-1 antibody and a dose of the anti-CTLA-4 antibody are administered on day one of the third three-week cycle.

In some embodiments, the period between the first administration of the post-induction phase and the last administration of the induction phase is equal to or less than about a day, two days, three days, four days, five days, six days, seven days, eight days, nine days, ten days, 11 days, 12 days, 13 days, 14 days (two weeks), 15 days, 16 days, 17 days, 18 days, 19 days, 20 days, 21 days, 22 days, 23 days, 24 days, 25 days, 26 days, 27 days, 28 days, 29 days, 30 days (a month), 31 days (a month), five weeks, six weeks, seven weeks, eight weeks, two months, or three months.

In some embodiments, the tumor is not refractory to the chemotherapy during or after the induction phase.

Other features and advantages of the instant disclosure will be apparent from the following detailed description and examples which should not be construed as limiting. The contents of all cited references, including scientific articles, newspaper reports, GenBank entries, patents and patent applications cited throughout this application are expressly incorporated herein by reference.

DETAILED DESCRIPTION OF THE DISCLOSURE

Figure 1:
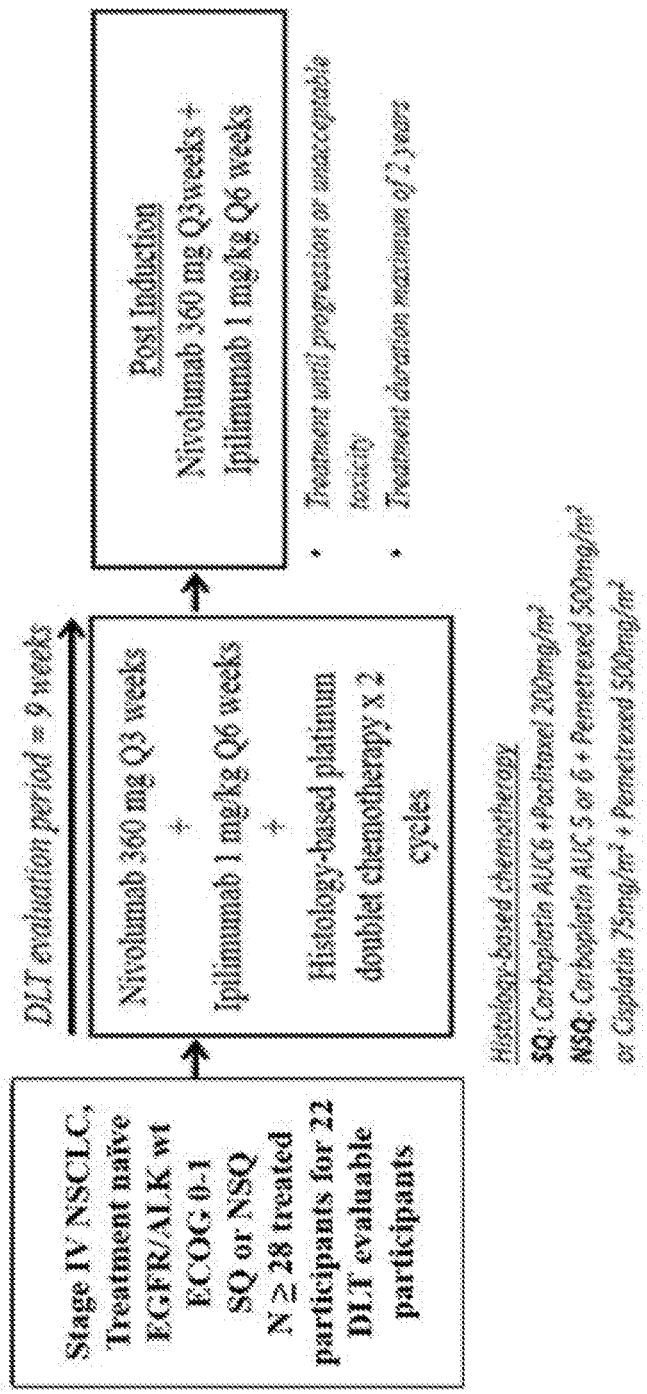
FIG. 1 shows the study design for a safety lead-in study to evaluate the safe dose level for nivolumab and ipilimumab administered with a lead-in treatment of histology-based platinum doublet chemotherapy. NSCLC=non-small cell lung cancer; SQ=squamous; NSQ=non-squamous; DLT=dose limiting toxicity.

The present disclosure provides a method for treating a subject afflicted with a tumor comprising (1) an induction phase comprising administering to the subject a chemotherapy for a period of time that is less than the standard period of time for the chemotherapy; (2) a post induction phase comprising administering to the subject an antibody or an antigen-binding portion thereof that specifically binds to PD-1 ("an anti-PD-1 antibody") or an antibody or an antigen-binding portion thereof that specifically binds to PD-L1 ("an anti-PD-L1 antibody") after (1). The specification further provides a method of treating a tumor in a subject in need thereof, comprising administering to the subject an anti-PD-1 antibody or an anti-PD-L1 antibody, wherein prior to administering the anti-PD-1 antibody or the anti-PD-L1 antibody, the subject is administered an induction phase comprising a chemotherapy for a period of time that is less than the standard period of time for the chemotherapy. In some embodiments, the tumor is derived from a NSCLC.

Terms

In order that the present disclosure can be more readily understood, certain terms are first defined. As used in this application, except as otherwise expressly provided herein, each of the following terms shall have the meaning set forth below. Additional definitions are set forth throughout the application.

"Administering" refers to the physical introduction of a composition comprising a therapeutic agent to a subject, using any of the various methods and delivery systems known to those skilled in the art. Preferred routes of administration for the immunotherapy, e.g., the anti-PD-1 antibody or the anti-PD-L1 antibody, include intravenous, intramuscular, subcutaneous, intraperitoneal, spinal or other parenteral routes of administration, for example by injection or infusion. The phrase "parenteral administration" as used herein means modes of administration other than enteral and topical administration, usually by injection, and includes, without limitation, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion, as well as in vivo electroporation. Other non-parenteral routes include an oral, topical, epidermal or mucosal route of administration, for example, intranasally, vaginally, rectally, sublingually or topically. Administering can also be performed, for example, once, a plurality of times, and/or over one or more extended periods.

An "adverse event" (AE) as used herein is any unfavorable and generally unintended or undesirable sign (including an abnormal laboratory finding), symptom, or disease associated with the use of a medical treatment. For example, an adverse event can be associated with activation of the immune system or expansion of immune system cells (e.g., T cells) in response to a treatment. A medical treatment can have one or more associated AEs and each AE can have the same or different level of severity. Reference to methods capable of "altering adverse events" means a treatment regime that decreases the incidence and/or severity of one or more AEs associated with the use of a different treatment regime.

An "antibody" (Ab) shall include, without limitation, a glycoprotein immunoglobulin which binds specifically to an antigen and comprises at least two heavy (H) chains and two light (L) chains interconnected by disulfide bonds, or an antigen-binding portion thereof. Each H chain comprises a heavy chain variable region (abbreviated herein as $V_H$) and a heavy chain constant region. The heavy chain constant region comprises three constant domains, $C_{H1}$, $C_{H2}$ and $C_{H3}$. Each light chain comprises a light chain variable region (abbreviated herein as $V_L$) and a light chain constant region. The light chain constant region is comprises one constant domain, $C_L$. The $V_H$ and $V_L$ regions can be further subdivided into regions of hypervariability, termed complementarity determining regions (CDRs), interspersed with regions that are more conserved, termed framework regions (FRs). Each $V_H$ and $V_L$ comprises three CDRs and four FRs, arranged from amino-terminus to carboxy-terminus in the following order: FR1, CDR1, FR2, CDR2, FR3, CDR3, and FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

An immunoglobulin can derive from any of the commonly known isotypes, including but not limited to IgA, secretory IgA, IgG and IgM. IgG subclasses are also well known to those in the art and include but are not limited to human IgG1, IgG2, IgG3 and IgG4. "Isotype" refers to the antibody class or subclass (e.g., IgM or IgG1) that is encoded by the heavy chain constant region genes. The term "antibody" includes, by way of example, both naturally occurring and non-naturally occurring antibodies; monoclonal and polyclonal antibodies; chimeric and humanized antibodies; human or nonhuman antibodies; wholly synthetic antibodies; and single chain antibodies. A nonhuman antibody can be humanized by recombinant methods to reduce its immunogenicity in man. Where not expressly stated, and unless the context indicates otherwise, the term "antibody" also includes an antigen-binding fragment or an antigen-binding portion of any of the aforementioned immunoglobulins, and includes a monovalent and a divalent fragment or portion, and a single chain antibody.

An "isolated antibody" refers to an antibody that is substantially free of other antibodies having different antigenic specificities (e.g., an isolated antibody that binds specifically to PD-1 is substantially free of antibodies that bind specifically to antigens other than PD-1). An isolated antibody that binds specifically to PD-1 may, however, have cross-reactivity to other antigens, such as PD-1 molecules from different species. Moreover, an isolated antibody can be substantially free of other cellular material and/or chemicals.

The term "monoclonal antibody" (mAb) refers to a non-naturally occurring preparation of antibody molecules of single molecular composition, i.e., antibody molecules whose primary sequences are essentially identical, and which exhibits a single binding specificity and affinity for a particular epitope. A monoclonal antibody is an example of an isolated antibody. Monoclonal antibodies can be produced by hybridoma, recombinant, transgenic or other techniques known to those skilled in the art.

A "human antibody" (HuMAb) refers to an antibody having variable regions in which both the framework and CDR regions are derived from human germline immunoglobulin sequences. Furthermore, if the antibody contains a constant region, the constant region also is derived from human germline immunoglobulin sequences. The human antibodies of the disclosure can include amino acid residues not encoded by human germline immunoglobulin sequences (e.g., mutations introduced by random or site-specific mutagenesis in vitro or by somatic mutation in vivo). However, the term "human antibody," as used herein, is not intended to include antibodies in which CDR sequences derived from the germline of another mammalian species, such as a mouse, have been grafted onto human framework sequences. The terms "human antibody" and "fully human antibody" and are used synonymously.

A "humanized antibody" refers to an antibody in which some, most or all of the amino acids outside the CDRs of a non-human antibody are replaced with corresponding amino acids derived from human immunoglobulins. In one embodiment of a humanized form of an antibody, some, most or all of the amino acids outside the CDRs have been replaced with amino acids from human immunoglobulins, whereas some, most or all amino acids within one or more CDRs are unchanged. Small additions, deletions, insertions, substitutions or modifications of amino acids are permissible as long as they do not abrogate the ability of the antibody to bind to a particular antigen. A "humanized antibody" retains an antigenic specificity similar to that of the original antibody.

A "chimeric antibody" refers to an antibody in which the variable regions are derived from one species and the constant regions are derived from another species, such as an antibody in which the variable regions are derived from a mouse antibody and the constant regions are derived from a human antibody.

An "anti-antigen antibody" refers to an antibody that binds specifically to the antigen. For example, an anti-PD-1 antibody binds specifically to PD-1, an anti-PD-L1 antibody binds specifically to PD-L1, and an anti-CTLA-4 antibody binds specifically to CTLA-4.

An "antigen-binding portion" of an antibody (also called an "antigen-binding fragment") refers to one or more fragments of an antibody that retain the ability to bind specifically to the antigen bound by the whole antibody.

A "cancer" refers a broad group of various diseases characterized by the uncontrolled growth of abnormal cells in the body. Unregulated cell division and growth divide and grow results in the formation of malignant tumors that invade neighboring tissues and can also metastasize to distant parts of the body through the lymphatic system or bloodstream.

The term "immunotherapy" refers to the treatment of a subject afflicted with, or at risk of contracting or suffering a recurrence of, a disease by a method comprising inducing, enhancing, suppressing or otherwise modifying an immune response. "Treatment" or "therapy" of a subject refers to any type of intervention or process performed on, or the administration of an active agent to, the subject with the objective of reversing, alleviating, ameliorating, inhibiting, slowing down or preventing the onset, progression, development, severity or recurrence of a symptom, complication or condition, or biochemical indicia associated with a disease.

"Programmed Death-1" (PD-1) refers to an immunoinhibitory receptor belonging to the CD28 family. PD-1 is expressed predominantly on previously activated T cells in vivo, and binds to two ligands, PD-L1 and PD-L2. The term "PD-1" as used herein includes human PD-1 (hPD-1), variants, isoforms, and species homologs of hPD-1, and analogs having at least one common epitope with hPD-1. The complete hPD-1 sequence can be found under GenBank Accession No. U64863.

"Programmed Death Ligand-1" (PD-L1) is one of two cell surface glycoprotein ligands for PD-1 (the other being PD-L2) that downregulate T cell activation and cytokine secretion upon binding to PD-1. The term "PD-L1" as used herein includes human PD-L1 (hPD-L1), variants, isoforms, and species homologs of hPD-L1, and analogs having at least one common epitope with hPD-L1. The complete hPD-L1 sequence can be found under GenBank Accession No. Q9NZQ7.

"Cytotoxic T-Lymphocyte Antigen-4" (CTLA-4) refers to an immunoinhibitory receptor belonging to the CD28 family. CTLA-4 is expressed exclusively on T cells in vivo, and binds to two ligands, CD80 and CD86 (also called B7-1 and B7-2, respectively). The term "CTLA-4" as used herein includes human CTLA-4 (hCTLA-4), variants, isoforms, and species homologs of hCTLA-4, and analogs having at least one common epitope with hCTLA-4. The complete hCTLA-4 sequence can be found under GenBank Accession No. AAB59385.

A "subject" includes any human or nonhuman animal. The term "nonhuman animal" includes, but is not limited to, vertebrates such as nonhuman primates, sheep, dogs, and rodents such as mice, rats and guinea pigs. In preferred embodiments, the subject is a human. The terms, "subject," "patient," and "participant" are used interchangeably herein.

The use of the term "flat dose" with regard to the methods and dosages of the disclosure means a dose that is administered to a patient without regard for the weight or body surface area (BSA) of the patient. The flat dose is therefore not provided as a mg/kg dose, but rather as an absolute amount of the agent (e.g., the anti-PD-1 antibody). For example, a 60 kg person and a 100 kg person would receive the same dose of an antibody (e.g., 360 mg of an anti-PD-1 antibody).

The use of the term "fixed dose" with regard to a method of the disclosure means that two or more different antibodies in a single composition (e.g., anti-PD-1 antibody and anti-CTLA-4 antibody or an anti-PD-L1 antibody and an anti-CTLA-4 antibody) are present in the composition in particular (fixed) ratios with each other. In some embodiments, the fixed dose is based on the weight (e.g., mg) of the antibodies. In certain embodiments, the fixed dose is based on the concentration (e.g., mg/ml) of the antibodies. In some embodiments, the ratio is at least about 1:1, about 1:2, about 1:3, about 1:4, about 1:5, about 1:6, about 1:7, about 1:8, about 1:9, about 1:10, about 1:15, about 1:20, about 1:30, about 1:40, about 1:50, about 1:60, about 1:70, about 1:80, about 1:90, about 1:100, about 1:120, about 1:140, about 1:160, about 1:180, about 1:200, about 200:1, about 180:1, about 160:1, about 140:1, about 120:1, about 100:1, about 90:1, about 80:1, about 70:1, about 60:1, about 50:1, about 40:1, about 30:1, about 20:1, about 15:1, about 10:1, about 9:1, about 8:1, about 7:1, about 6:1, about 5:1, about 4:1, about 3:1, or about 2:1 mg first antibody (e.g., anti-PD-1 antibody or an anti-PD-L1 antibody) to mg second antibody (e.g., anti-CTLA-4 antibody). For example, the 3:1 ratio of an anti-PD-1 antibody and an anti-CTLA-4 antibody can mean that a vial can contain about 240 mg of the anti-PD-1 antibody and 80 mg of the anti-CTLA-4 antibody or about 3 mg/ml of the anti-PD-1 antibody and 1 mg/ml of the anti-CTLA-4 antibody.

The term "weight-based dose" as referred to herein means that a dose that is administered to a patient is calculated based on the weight of the patient. For example, when a patient with 60 kg body weight requires 3 mg/kg of an anti-PD-1 antibody, one can calculate and use the appropriate amount of the anti-PD-1 antibody (i.e., 180 mg) for administration.

A "therapeutically effective amount" or "therapeutically effective dosage" of a drug or therapeutic agent is any amount of the drug that, when used alone or in combination with another therapeutic agent, protects a subject against the onset of a disease or promotes disease regression evidenced by a decrease in severity of disease symptoms, an increase in frequency and duration of disease symptom-free periods, or a prevention of impairment or disability due to the disease affliction. The ability of a therapeutic agent to promote disease regression can be evaluated using a variety of methods known to the skilled practitioner, such as in human subjects during clinical trials, in animal model systems predictive of efficacy in humans, or by assaying the activity of the agent in in vitro assays.

By way of example, an "anti-cancer agent" promotes cancer regression in a subject. In preferred embodiments, a therapeutically effective amount of the drug promotes cancer regression to the point of eliminating the cancer. "Promoting cancer regression" means that administering an effective amount of the drug, alone or in combination with an anti-neoplastic agent, results in a reduction in tumor growth or size, necrosis of the tumor, a decrease in severity of at least one disease symptom, an increase in frequency and duration of disease symptom-free periods, or a prevention of impairment or disability due to the disease affliction. In addition, the terms "effective" and "effectiveness" with regard to a treatment includes both pharmacological effectiveness and physiological safety. Pharmacological effectiveness refers to the ability of the drug to promote cancer regression in the patient. Physiological safety refers to the level of toxicity, or other adverse physiological effects at the cellular, organ and/or organism level (adverse effects) resulting from administration of the drug.

By way of example for the treatment of tumors, e.g., a tumor derived from an NSCLC, a therapeutically effective amount of an anti-cancer agent preferably inhibits cell growth or tumor growth by at least about 20%, more preferably by at least about 40%, even more preferably by at least about 60%, and still more preferably by at least about 80% relative to untreated subjects. In other preferred embodiments of the disclosure, tumor regression can be observed and continue for a period of at least about 20 days, more preferably at least about 40 days, or even more preferably at least about 60 days. Notwithstanding these ultimate measurements of therapeutic effectiveness, evaluation of immunotherapeutic drugs must also make allowance for immune-related response patterns.

An "immune response" is as understood in the art, and generally refers to a biological response within a vertebrate against foreign agents or abnormal, e.g., cancerous cells, which response protects the organism against these agents and diseases caused by them. An immune response is mediated by the action of one or more cells of the immune system (for example, a T lymphocyte, B lymphocyte, natural killer (NK) cell, macrophage, eosinophil, mast cell, dendritic cell or neutrophil) and soluble macromolecules produced by any of these cells or the liver (including antibodies, cytokines, and complement) that results in selective targeting, binding to, damage to, destruction of, and/or elimination from the vertebrate's body of invading pathogens, cells or tissues infected with pathogens, cancerous or other abnormal cells, or, in cases of autoimmunity or pathological inflammation, normal human cells or tissues. An immune reaction includes, e.g., activation or inhibition of a T cell, e.g., an effector T cell, a Th cell, a $CD4^+$ cell, a $CD8^+$ T cell, or a Treg cell, or activation or inhibition of any other cell of the immune system, e.g., NK cell.

An "immune-related response pattern" refers to a clinical response pattern often observed in cancer patients treated with immunotherapeutic agents that produce antitumor effects by inducing cancer-specific immune responses or by modifying native immune processes. This response pattern is characterized by a beneficial therapeutic effect that follows an initial increase in tumor burden or the appearance of new lesions, which in the evaluation of traditional chemotherapeutic agents would be classified as disease progression and would be synonymous with drug failure. Accordingly, proper evaluation of immunotherapeutic agents can require long-term monitoring of the effects of these agents on the target disease.

An "immunomodulator" or "immunoregulator" refers to an agent, e.g., an agent targeting a component of a signaling pathway that can be involved in modulating, regulating, or modifying an immune response. "Modulating," "regulating," or "modifying" an immune response refers to any alteration in a cell of the immune system or in the activity of such cell (e.g., an effector T cell, such as a Th1 cell). Such modulation includes stimulation or suppression of the immune system which can be manifested by an increase or decrease in the number of various cell types, an increase or decrease in the activity of these cells, or any other changes which can occur within the immune system. Both inhibitory and stimulatory immunomodulators have been identified, some of which can have enhanced function in a tumor microenvironment. In some embodiments, the immunomodulator targets a molecule on the surface of a T cell. An "immunomodulatory target" or "immunoregulatory target" is a molecule, e.g., a cell surface molecule, that is targeted for binding by, and whose activity is altered by the binding of, a substance, agent, moiety, compound or molecule. Immunomodulatory targets include, for example, receptors on the surface of a cell ("immunomodulatory receptors") and receptor ligands ("immunomodulatory ligands").

"Immunotherapy" refers to the treatment of a subject afflicted with, or at risk of contracting or suffering a recurrence of, a disease by a method comprising inducing, enhancing, suppressing or otherwise modifying the immune system or an immune response. In certain embodiments, the immunotherapy comprises administering an antibody to a subject. In other embodiments, the immunotherapy comprises administering a small molecule to a subject. In other embodiments, the immunotherapy comprises administering a cytokine or an analog, variant, or fragment thereof.

"Immuno stimulating therapy" or "immuno stimulatory therapy" refers to a therapy that results in increasing (inducing or enhancing) an immune response in a subject for, e.g., treating cancer.

"Potentiating an endogenous immune response" means increasing the effectiveness or potency of an existing immune response in a subject. This increase in effectiveness and potency can be achieved, for example, by overcoming mechanisms that suppress the endogenous host immune response or by stimulating mechanisms that enhance the endogenous host immune response.

A therapeutically effective amount of a drug includes a "prophylactically effective amount," which is any amount of the drug that, when administered alone or in combination with an anti-neoplastic agent to a subject at risk of developing a cancer (e.g., a subject having a pre-malignant condition) or of suffering a recurrence of cancer, inhibits the development or recurrence of the cancer. In preferred embodiments, the prophylactically effective amount prevents the development or recurrence of the cancer entirely. "Inhibiting" the development or recurrence of a cancer means either lessening the likelihood of the cancer's development or recurrence, or preventing the development or recurrence of the cancer entirely.

The term "induction phase," as used herein, refers to a portion of a treatment that prepares the subject for an immunotherapy. In certain embodiments, the induction phase is shorter than the post induction phase. In some embodiments, the induction phase comprises administering to the subject a chemotherapy. In some embodiments, the induction phase comprises administering to the subject a chemotherapy and an immunotherapy, e.g., a combination of an anti-PD-1 antibody and an anti-CTLA-4 antibody or an anti-PD-L1 antibody and an anti-CTLA-4 antibody. In some embodiments, the induction phase comprises administering a chemotherapy for a period of time that is less than the standard period of time for the chemotherapy. In some embodiments, the chemotherapy is administered for less than four cycles. In some embodiments, the chemotherapy is administered for less than three cycles. In some embodiments, the chemotherapy is administered for less than two cycles. In some embodiments, the chemotherapy is administered for two cycles. In some embodiments, the induction phase comprises administering (i) a standard-of-care chemotherapy, which is modified to reduce the period of time that the chemotherapy is administered; and (ii) an immunotherapy comprising an anti-PD-1 antibody and an anti-CTLA-4 antibody or an anti-PD-L1 antibody and an anti-CTLA-4 antibody. In certain embodiments, the induction phase lasts for about six weeks. In certain embodiments, the induction phase lasts for two cycles, wherein each cycle is twenty-one days.

The term "post induction phase," as used herein, refers to any period of time during a therapy or treatment that occurs after the induction phase. The post induction phase can continue for any amount of time. In some embodiments, the post induction phase continues until disease progression, unacceptable adverse events, complete response, or two years. In some embodiments, the post induction phase comprises an immunotherapy comprising administering an anti-PD-1 antibody and an anti-CTLA-4 antibody or an anti-PD-L1 antibody and an anti-CTLA-4 antibody. In certain embodiments, the post induction phase does not comprise administering a chemotherapy. In particular embodiments, the post induction phase begins on the first day wherein an immunotherapy is administered in the absence of a chemotherapy.

The term "tumor mutation burden" (TMB) as used herein refers to the number of somatic mutations in a tumor's genome and/or the number of somatic mutations per area of the tumor's genome. Germline (inherited) variants are excluded when determining TMB, because the immune system has a higher likelihood of recognizing these as self. Tumor mutation burden (TMB) can also be used interchangeably with "tumor mutation load," "tumor mutational burden," or "tumor mutational load."

TMB is a genetic analysis of a tumor's genome and, thus, can be measured by applying sequencing methods well known to those of skill in the art. The tumor DNA can be compared with DNA from patient-matched normal tissue to eliminate germline mutations or polymorphisms.

In some embodiments, TMB is determined by sequencing tumor DNA using a high-throughput sequence technique, e.g., next-generation sequencing (NGS) or an NGS-based method. In some embodiments, the NGS-based method is selected from whole genome sequencing (WGS), whole exome sequencing (WES), or comprehensive genomic profiling (CGP) of cancer gene panels such as FOUNDATION-ONE CDX™ and MSK-IMPACT clinical tests. In some embodiments, TMB, as used herein, refers to the number of somatic mutations per megabase (Mb) of DNA sequenced. In one embodiment, TMB is measured using the total number of nonsynonymous mutations, e.g., missense mutation (i.e. changing a particular amino acid in the protein) and/or nonsense (causing premature termination and thus truncation of the protein sequence), identified by normalizing matched tumor with germline samples to exclude any inherited germline genetic alterations. In another embodiment, TMB is measured using the total number of missense mutations in a tumor. In order to measure TMB, a sufficient amount of sample is required. In one embodiment, tissue sample (for example, a minimum of 10 slides) is used for evaluation. In some embodiments, TMB is expressed as NsMs per megabase (NsM/Mb). 1 megabase represents 1 million bases.

The TMB status can be a numerical value or a relative value, e.g., high, medium, or low; within the highest fractile, or within the top tertile, of a reference set.

The term "high TMB" as used herein refers to a number of somatic mutations in a tumor's genome that is above a number of somatic mutations that is normal or average. In some embodiments, a TMB has a score of at least 210, at least 215, at least 220, at least 225, at least 230, at least 235, at least 240, at least 245, at least 250, at least 255, at least 260, at least 265, at least 270, at least 275, at least 280, at least 285, at least 290, at least 295, at least 300, at least 305, at least 310, at least 315, at least 320, at least 325, at least 330, at least 335, at least 340, at least 345, at least 350, at least 355, at least 360, at least 365, at least 370, at least 375, at least 380, at least 385, at least 390, at least 395, at least 400, at least 405, at least 410, at least 415, at least 420, at least 425, at least 430, at least 435, at least 440, at least 445, at least 450, at least 455, at least 460, at least 465, at least 470, at least 475, at least 480, at least 485, at least 490, at least 495, or at least 500; in other embodiments a high TMB has a score of at least at least 221, at least 222, at least 223, at least 224, at least 225, at least 226, at least 227, at least 228, at least 229, at least 230, at least 231, at least 232, at least 233, at least 234, at least 235, at least 236, at least 237, at least 238, at least 239, at least 240, at least 241, at least 242, at least 243, at least 244, at least 245, at least 246, at least 247, at least 248, at least 249, or at least 250; and, in a particular embodiment, a high TMB has a score of at least 243.

In other embodiments, a "high TMB" refers to a TMB within the highest fractile of the reference TMB value. For example, all subject's with evaluable TMB data are grouped according to fractile distribution of TMB, i.e., subjects are rank ordered from highest to lowest number of genetic alterations and divided into a defined number of groups. In one embodiment, all subjects with evaluable TMB data are ranked ordered and divided into thirds, and a "high TMB" is within the top tertile of the reference TMB value. In a particular embodiment, the tertile boundaries are 0<100 genetic alterations; 100 to 243 genetic alterations; and >243 genetic alterations. It should be understood that, once rank ordered, subjects with evaluable TMB data can be divided into any number of groups, e.g., quartiles, quintiles, etc.

In some embodiments, a "high TMB" refers to a TMB of at least about 20 mutations/tumor, at least about 25 mutations/tumor, at least about 30 mutations/tumor, at least about 35 mutations/tumor, at least about 40 mutations/tumor, at least about 45 mutations/tumor, at least about 50 mutations/tumor, at least about 55 mutations/tumor, at least about 60 mutations/tumor, at least about 65 mutations/tumor, at least about 70 mutations/tumor, at least about 75 mutations/tumor, at least about 80 mutations/tumor, at least about 85 mutations/tumor, at least about 90 mutations/tumor, at least about 95 mutations/tumor, or at least about 100 mutations/tumor. In some embodiments, a "high TMB" refers to a TMB of at least about 105 mutations/tumor, at least about 110 mutations/tumor, at least about 115 mutations/tumor, at least about 120 mutations/tumor, at least about 125 mutations/tumor, at least about 130 mutations/tumor, at least about 135 mutations/tumor, at least about 140 mutations/tumor, at least about 145 mutations/tumor, at least about 150 mutations/tumor, at least about 175 mutations/tumor, or at least about 200 mutations/tumor. In certain embodiments, a tumor having a high TMB has at least about 100 mutations/tumor.

The "high TMB" can also be referred to as the number of mutations per megabase of tumor genome sequenced, e.g., as measured by a mutation assay, e.g., FOUNDATION-ONE® CDX™ assay. In one embodiment, the high TMB refers to at least about 9, at least about 10, at least about 11, at least 12, at least about 13, at least about 14, at least about 15, at least about 16, at least about 17, at least about 18, at least about 19, or at least about 20 mutations per megabase of genome as measured by a FOUNDATIONONE® CDX™ assay. In a particular embodiment, the "high TMB" refers to at least 10 mutations per megabase of genome sequenced by a FOUNDATIONONE® CDX™ assay.

As used herein, the term "medium TMB" refers to a number of somatic mutations in a tumor's genome that is at or around a number of somatic mutations that is normal or average and the term "low TMB" refers to a number of somatic mutations in a tumor's genome that is below a number of somatic mutations that is normal or average. In a particular embodiment, a "high TMB" has a score of at least 243, a "medium TMB" has a score of between 100 and 242, and a "low TMB" has a score of less than 100 (or between 0 and 100). The "medium or low TMB" refers to less than 9 mutations per megabase of genome sequenced, e.g., as measured by a FOUNDATIONONE® CDX™ assay.

The term "reference TMB value" as referred to herein can be the TMB value shown in Table 9.

In some embodiments, TMB status can correlate with smoking status. In particular, subjects who currently or formerly smoke(d) often have more genetic alterations, e.g., missense mutations, than subjects who never smoke(d).

A tumor, e.g., a tumor derived from a NSCLC, with a high TMB can also have a high neoantigen load. As used herein, the term "neoantigen" refers to a newly formed antigen that has not been previously recognized by the immune system. A neoantigen can be a protein or peptide that is recognized as foreign (or non-self) by the immune system. Transcription of a gene in the tumor genome harboring a somatic mutation results in mutated mRNA that, when translated, gives rise to a mutated protein, which is then processed and transported to the ER lumen and binds to MHC class I complex, facilitating T-cell recognition of the neoantigen. Neoantigen recognition can promote T-cell activation, clonal expansion, and differentiation into effector and memory T-cells. Neoantigen load can correlate with TMB. In some embodiments, TMB is assessed as a surrogate for measuring tumor neoantigen load. The TMB status of a tumor, e.g., a tumor derived from a NSCLC, can be used as a factor, alone or in combination with other factors, in determining whether a patient is likely to benefit from a particular anti-cancer agent or type of treatment or therapy, e.g., a combination therapy comprising (a) an anti-PD-1 antibody or an anti-PD-L1 antibody and (b) an anti-CTLA-4 antibody. In one embodiment, a high TMB status (or a high TMB) indicates an enhanced likelihood of benefit from immuno-oncology and, thus, can be used to identify patients more likely to benefit from therapy of a combination therapy comprising (a) an anti-PD-1 antibody or an anti-PD-L1 antibody and (b) an anti-CTLA-4 antibody. Similarly, tumors with high tumor neoantigen load and high TMB are more likely to be immunogenic than tumors with low neoantigen load and low TMB. In addition, high-neoantigen/high-TMB tumors are more likely to be recognized as non-self by the immune system, thus triggering an immune-mediated antitumor response. In one embodiment, a high TMB status and a high neoantigen load indicate an enhanced likelihood of benefit from immuno-oncology, e.g., a combination therapy comprising (1) an induction phase comprising administering to the subject a chemotherapy for a period of time that is less than the standard period of time for the chemotherapy; (2) a post induction phase comprising administering to the subject an anti-PD-1 antibody or an anti-PD-L1 antibody after (1). As used herein, the term "benefit from therapy" refers to an improvement in one or more of overall survival, progression-free survival, partial response, complete response, and overall response rate and can also include a reduction in tumor growth or size, a decrease in severity of disease symptoms, an increase in frequency and duration of disease symptom-free periods, or a prevention of impairment or disability due to the disease affliction.

Other factors, e.g., environmental factors, can associate with TMB status. For example, smoking status of patients with NSCLC was correlated with TMB distribution, whereby current and former smokers had higher median TMB compared with those patients who had never smoked. See Peters et al., *AACR*, Apr. 1-5, 2017, Washington, D.C. The presence of a driver mutation in NSCLC tumors was associated with younger age, female sex, and non-smoker status. See Singal et al., *ASCO*, Jun. 1-5, 2017; Chicago, IL. A trend associating the presence of driver mutations, such as EGFR, ALK, or KRAS, with lower TMB was observed (P=0.06). Davis et al., *AACR*, Apr. 1-5, 2017, Washington, D.C.

The term "somatic mutation" as used herein refers to an acquired alteration in DNA that occurs after conception. Somatic mutations can occur in any of the cells of the body except the germ cells (sperm and egg) and therefore are not passed on to children. These alterations can, but do not always, cause cancer or other diseases. The term "germline mutation" refers to a gene change in a body's reproductive cell (egg or sperm) that becomes incorporated into the DNA of every cell in the body of the offspring. Germline mutations are passed on from parents to offspring. Also called a "hereditary mutation." In the analysis of TMB, germline mutations are considered as a "baseline," and are subtracted from the number of mutations found in the tumor biopsy to determine the TMB within the tumor. As germline mutations are found in every cell in the body, their presence can be determined via less invasive sample collections than tumor biopsies, such as blood or saliva. Germline mutations can increase the risk of developing certain cancers, and can play a role in the response to chemotherapy.

The term "measuring" or "measured" or "measurement" when referring to TMB status means determining a measurable quantity of somatic mutations in a biological sample of the subject. It will be appreciated that measuring can be performed by sequencing nucleic acids, e.g., cDNA, mRNA, exoRNA, ctDNA, and cfDNA, in the sample. The measuring is performed on a subject's sample and/or a reference sample or samples and can, for example, be detected de novo or correspond to a previous determination. The measuring can be performed, for example, using PCR methods, qPCR methods, Sanger sequencing methods, genomic profiling methods (including comprehensive gene panels), exome sequencing methods, genome sequencing methods, and/or any other method disclosed herein, as is known to a person of skill in the art. In some embodiments, the measuring identifies a genomic alteration in the sequenced nucleic acids. The genomic (or gene) profiling methods can involve panels of a predetermined set of genes, e.g., 150-500 genes, and in some instances the genomic alterations evaluated in the panel of genes are correlated with total somatic mutations evaluated. As used herein when referring to sequencing, the term "gene" includes DNA coding regions (e.g., exons), DNA non-coding regions associated with a coding region (e.g., introns and promoters), and mRNA transcripts.

The term "genomic alteration" as used herein refers to a change (or mutation) in the nucleotide sequence of the genome of a tumor, which change is not present in the germline nucleotide sequence, and which in some embodiments is a nonsynonymous mutation including, but not limited to, a base pair substitution, a base pair insertion, a base pair deletion, a copy number alteration (CNA), a gene rearrangement, and any combination thereof. In a particular embodiment, the genomic alterations measured in the biological sample are missense mutations.

The term "whole genome sequencing" or "WGS," as used herein, refers to a method of sequencing the entire genome. The term "whole exome sequencing" or "WES," as used herein, refers to a method of sequencing all the protein-coding regions (exons) of the genome.

A "cancer gene panel," "hereditary cancer panel," "comprehensive cancer panel," or "multigene cancer panel," as used herein, refers to a method of sequencing a subset of targeted cancer genes, including coding regions, introns, promoters, and/or mRNA transcripts. In some embodiments, the CGP comprises sequencing at least about 15, at least about 20, at least about 25, at least about 30, at least about 35, at least about 40, at least about 45, or at least about 50 targeted cancer genes.

The term "genomic profiling assay," "comprehensive genomic profiling," or "CGP" refers to an assay that analyzes a panel of genes and select introns for in vitro diagnosis. CGP is a combination of NGS and targeted bioinformatics analysis to screen for mutations in known clinically relevant cancer genes. This method can be used to catch mutations that are missed by testing "hotspots" (e.g., BRCA1/BRCA2 mutations or microsatellite markers). In some embodiments, the CGP further includes one or more mRNA transcript, non-coding RNA, and/or promoter region. In one embodiment, the genes in the panel are cancer-related genes. In another embodiment, a genomic profiling assay is a FOUNDATIONONE© assay.

The term "harmonization" refers to a study conducted to determine the comparability between two or more measures and/or diagnostic tests. Harmonization studies provide a systematic approach to address questions of how diagnostic tests compare with each other, as well as their interchangeability when used to determine the biomarker status of a patient's tumor. In general, at least one well-characterized measure and/or diagnostic test is used as a standard for comparison with others. Concordance assessment is often utilized in harmonization studies.

The term "concordance," as used herein, refers to a degree of agreement between two measurements and/or diagnostic tests. Concordance can be established using both qualitative and quantitative methods. Quantitative methods to assess concordance differ based on the type of measurement. A particular measurement can be expressed either as 1) a categorical/dichotomized variable or 2) a continuous variable. A "categorical/dichotomized variable" (e.g., above or below TMB cut-off) may use percent agreements, such as overall percent agreement (OPA), positive percent agreement (PPA), or negative percent agreement (NPA), to assess concordance. A "continuous variable" (e.g., TMB by WES) uses Spearman's rank correlation or Pearson's correlation coefficient (r), which takes on values $-1 \leq r \leq +1$, to assess concordance across a spectrum of values (Note $r=+1$ or $-1$ means that each of the variables is perfectly correlated). The term "analytical concordance" refers to the degree of agreement in the performance (e.g., identification of biomarkers, genomic alteration types, and genomic signatures, and assessment of test reproducibility) of two assays or diagnostic tests to support clinical use. The term "clinical concordance" refers to the degree of agreement in how the two assays or diagnostic tests correlate with clinical outcome.

The term "microsatellite instability" or "MSI" refers to a change that occurs in the DNA of certain cells (such as tumor cells) in which the number of repeats of microsatellites (short, repeated sequences of DNA) is different than the number of repeats that was in the DNA when it was inherited. MSI can be high microsatellite instability (MSI-H) or low microsatellite instability (MSI-L). Microsatellites are short tandem DNA repeat sequences of 1-6 bases. These are prone to DNA replication errors, which are repaired by mismatch repair (MMR). Hence microsatellites are good indicators of genome instability, especially deficient mismatch repair (dMMR). MSI is usually diagnosed by screening 5 microsatellite markers (BAT-25, BAT-26, NR21, NR24, and NR27). MSI-H represents the presence of at least 2 unstable markers among 5 microsatellite markers analyzed (or $\geq 30\%$ of the markers if a larger panel is used). MSI-L means instability of 1 MSI marker (or 10%-30% of markers in larger panels). MSS means the absence of an unstable microsatellite marker.

The term "biological sample" as used herein refers to biological material isolated from a subject. The biological sample can contain any biological material suitable for determining TMB, for example, by sequencing nucleic acids in the tumor (or circulating tumor cells) and identifying a genomic alteration in the sequenced nucleic acids. The biological sample can be any suitable biological tissue or fluid such as, for example, tumor tissue, blood, blood plasma, and serum. In one embodiment, the sample is a tumor tissue biopsy, e.g., a formalin-fixed, paraffin-embedded (FFPE) tumor tissue or a fresh-frozen tumor tissue or the like. In another embodiment, the biological sample is a liquid biopsy that, in some embodiments, comprises one or more of blood, serum, plasma, circulating tumor cells, exoRNA, ctDNA, and cfDNA.

The terms "once about every week," "once about every two weeks," or any other similar dosing interval terms as used herein mean approximate numbers. "Once about every week" can include every seven days±one day, i.e., every six days to every eight days. "Once about every two weeks" can include every fourteen days±three days, i.e., every eleven days to every seventeen days. Similar approximations apply, for example, to once about every three weeks, once about every four weeks, once about every five weeks, once about every six weeks, and once about every twelve weeks. In some embodiments, a dosing interval of once about every six weeks or once about every twelve weeks means that the first dose can be administered any day in the first week, and then the next dose can be administered any day in the sixth or twelfth week, respectively. In other embodiments, a dosing interval of once about every six weeks or once about every twelve weeks means that the first dose is administered on a particular day of the first week (e.g., Monday) and then the next dose is administered on the same day of the sixth or twelfth weeks (i.e., Monday), respectively.

The use of the alternative (e.g., "or") should be understood to mean either one, both, or any combination thereof of the alternatives. As used herein, the indefinite articles "a" or "an" should be understood to refer to "one or more" of any recited or enumerated component.

The terms "about" or "comprising essentially of" refer to a value or composition that is within an acceptable error range for the particular value or composition as determined by one of ordinary skill in the art, which will depend in part on how the value or composition is measured or determined, i.e., the limitations of the measurement system. For example, "about" or "comprising essentially of" can mean within 1 or more than 1 standard deviation per the practice in the art. Alternatively, "about" or "comprising essentially of" can mean a range of up to 10%. Furthermore, particularly with respect to biological systems or processes, the terms can mean up to an order of magnitude or up to 5-fold of a value. When particular values or compositions are provided in the application and claims, unless otherwise stated, the meaning of "about" or "comprising essentially of" should be assumed to be within an acceptable error range for that particular value or composition.

As described herein, any concentration range, percentage range, ratio range or integer range is to be understood to include the value of any integer within the recited range and, when appropriate, fractions thereof (such as one tenth and one hundredth of an integer), unless otherwise indicated.

Various aspects of the disclosure are described in further detail in the following subsections.

Methods of the Disclosure

Certain aspects of the present disclosure are directed to methods for treating a subject afflicted with a tumor, comprising administering a combination therapy comprising (1) an induction phase comprising administering to the subject a chemotherapy for a period of time that is less than the standard period of time for the chemotherapy; (2) a post induction phase comprising administering to the subject an anti-PD-1 antibody or an anti-PD-L1 antibody after (1). Some aspects of the present disclosure are directed to methods of treating a tumor in a subject in need thereof, comprising administering to the subject an anti-PD-1 antibody or an anti-PD-L1 antibody, wherein prior to administering the anti-PD-1 antibody or the anti-PD-L1 antibody, the subject is administered an induction phase comprising a chemotherapy for a period of time that is less than the standard period of time for the chemotherapy. In some embodiments, the tumor is derived from a NSCLC.

Induction Phase

In certain embodiments, the induction phase comprises administering a chemotherapy for a period of time that is less than the standard period of time for the chemotherapy. In some embodiments, the induction phase comprises administering a modified standard-of-care therapy, wherein the modified standard-of-care therapy is administered for a period of time that is less than the unmodified standard-of-care therapy. In some embodiments, the chemotherapy is administered once about every two weeks, once about every three weeks, once about every four weeks, once about every five weeks, or once about every six weeks. In some embodiments, the chemotherapy is administered for less than 10 cycles, less than 9 cycles, less than 8 cycles, less than 7 cycles, less than 6 cycles, less than 5 cycles, less than 4 cycles, or less than 3 cycles. In some embodiments, the chemotherapy is administered for 5 cycles, 4 cycles, 3 cycles, 2 cycles, or 1 cycle. In certain embodiments, the chemotherapy is administered for two cycles, wherein each cycle comprises administering the chemotherapy once about every three weeks.

Standard-of-care therapies for different types of cancer are well known by persons of skill in the art. For example, the National Comprehensive Cancer Network (NCCN), an alliance of 21 major cancer centers in the USA, publishes the NCCN Clinical Practice Guidelines in Oncology (NCCN GUIDELINES®) that provide detailed up-to-date information on the standard-of-care treatments for a wide variety of cancers (see NCCN GUIDELINES® (2018), available at: www.nccn.org/professionals/physician_gls/default.aspx, last accessed Oct. 22, 2018, which is incorporated by reference herein in its entirety).

By way of example, the NCCN Guidelines for treatment of NSCLC using a chemotherapy include, but are not limited to, a treatment selected from the following: (i) Cisplatin 75 mg/m$^2$ day 1 plus pemetrexed 500 mg/m$^2$ day 1 for non-squamous every 21 days for four cycles; (ii) carboplatin AUC 6 day 1, paclitaxel 200 mg/m$^2$ day 1, every 21 days for four cycles; and (iii) carboplatin AUC 5 day 1, pemetrexed 500 mg/m$^2$ day 1 for nonsquamous every 21 days for four cycles. See NCCN Guidelines Version 6.2018 Non-Small Cell Lung Cancer. Other standard of care chemotherapy regimens include (iv) cisplatin 50 mg/m$^2$ days 1 and 8 and vinorelbine 25 mg/m$^2$ days 1, 8, 15, 22, every 28 days for four cycles; (v) cisplatin 100 mg/m$^2$ day 1 and vinorelbine 30 mg/m$^2$ days 1, 8, 15, 22, every 28 days for four cycles; (vi) cisplatin 75-80 mg/m$^2$ day 1 and vinorelbine 25-30 mg/m$^2$ days 1 an 8, every 21 days for four cycles; (vii) cisplatin 100 mg/m$^2$ day 1 and etoposide 100 mg/m$^2$ days 1-3, every 28 days for four cycles; (viii) cisplatin 75 mg/m$^2$ day 1 and gemcitabine 1250 mg/m$^2$ days 1 and 8, every 21 days for four cycles; (ix) cisplatin 75 mg/m$^2$ day 1 and docetaxel 75 mg/m$^2$ day 1, every 21 days for four cycles; and (x) carboplatin AUC 5 day 1, gemcitabine 1000 mg/m$^2$ days 1 and 8, every 21 days for four cycles. Accordingly, in those embodiments where the tumor is derived from a NSCLC, e.g., a stage IV NSCLC, the induction phase comprises administering a chemotherapy, e.g., a modified standard-of-care chemotherapy, for a period of time that is less than the standard period of time for the chemotherapy, e.g., less than four cycles. In certain embodiments, the period of time is less than three cycles. In some embodiments, the period of time is less than two cycles. In certain embodiments, the period of time is two cycles. In particular embodiments, the period of time is no more than 2 cycles.

The chemotherapy administered during the induction phase can comprise any chemotherapy drug or combination known in the art. In certain embodiments, the chemotherapy comprises a standard-of-care therapy, e.g., a standard-of-care chemotherapy. See NCCN GUIDELINES® (2018). In certain embodiments, the particular chemotherapy administered is dependent on the histology of the tumor. For example, in some embodiments, the chemotherapy administered to treat a squamous NSCLC is different than the chemotherapy administered to treat a non-squamous NSCLC.

In some embodiments, the chemotherapy comprises an alkylating agent, and antimetabolite, an anti-microtubule agent, a topoisomerase inhibitory, a cytotoxic antibiotic, or any combination thereof. In certain embodiments, the chemotherapy comprises a platinum-based chemotherapy. In some embodiments, the platinum-based chemotherapy comprises cisplatin, oxaliplatin, carboplatin, nedaplatin, triplatin tetranitrate, phenanthriplatin, picoplatin, satraplatin or any combination thereof.

In certain embodiments, the chemotherapy comprises a platinum-based chemotherapy and a second agent. In some embodiments, the chemotherapy comprises a platinum-based chemotherapy and paclitaxel. In other embodiments, the chemotherapy comprises a platinum-based chemotherapy and pemetrexed. In some embodiments, the chemotherapy comprises carboplatin and paclitaxel. In some embodiments, the chemotherapy comprises carboplatin and pemetrexed. In some embodiments, the chemotherapy comprises cisplatin and pemetrexed. In some embodiments, the chemotherapy comprises cisplatin and paclitaxel.

In some embodiments, the induction phase comprises administering a chemotherapy, wherein the chemotherapy comprises carboplatin AUC 6 and paclitaxel 200 mg/m2 on day one of each three week cycle. In other embodiments, the induction phase comprises administering a chemotherapy, wherein the chemotherapy comprises carboplatin AUC 5 or AUC 6 and pemetrexed 500 mg/m$^2$, on day 1 of each three week cycle. In some embodiments, the induction phase comprises administering a chemotherapy, wherein the chemotherapy comprises carboplatin AUC 5 and pemetrexed 500 mg/m$^2$, on day 1 of each three week cycle. In some embodiments, the induction phase comprises administering a chemotherapy, wherein the chemotherapy comprises carboplatin AUC 6 and pemetrexed 500 mg/m$^2$, on day 1 of each three week cycle. In other embodiments, the induction phase comprises administering a chemotherapy, wherein the chemotherapy comprises cisplatin 75 mg/m$^2$ and pemetrexed 500 mg/m$^2$, on day 1 of each three week cycle.

In some embodiments, the induction phase further comprises administering (i) an anti-PD-1 antibody or an anti-PD-L1 antibody and (ii) an anti-CTLA-4 antibody in addition to the chemotherapy. In some embodiments, the anti-PD-1 antibody or the anti-PD-L1 antibody are administered on the same day as the chemotherapy. In some embodiments, the anti-PD-1 antibody or the anti-PD-L1 antibody are administered on a different day than the chemotherapy. In certain embodiments, (i) the anti-PD-1 antibody or the anti-PD-L1 antibody and at least one dose of (ii) the anti-CTLA-4 antibody are administered on the same day as the chemotherapy.

In certain embodiments, the anti-PD-1 antibody, the anti-PD-L1 antibody, or the anti-CTLA-4 antibody is administered during the induction phase at a weight-based dose. In some embodiments, the anti-PD-1 antibody is administered at a dose ranging from about 0.1 mg/kg to about 10.0 mg/kg body weight once about every 2, 3, or 4 weeks. In certain embodiments, the anti-PD-1 antibody is administered at a dose of about 2 mg/kg, about 3 mg/kg, about 4 mg/kg, about 5 mg/kg, about 6 mg/kg, about 7 mg/kg, about 8 mg/kg, about 9 mg/kg, or about 10 mg/kg body weight once about every 2 weeks or 3 weeks. In particular embodiments, the anti-PD-1 antibody is administered at a dose of about 2 mg/kg body weight once about every 3 weeks. In particular embodiments, the anti-PD-1 antibody is administered at a dose of about 3 mg/kg body weight once about every 3 weeks. In some embodiments, the anti-PD-1 antibody is administered at a dose of about 4 mg/kg body weight once about every 3 weeks. In other embodiments, the anti-PD-1 antibody is administered at a dose of about 5 mg/kg body weight once about every 3 weeks. In other embodiments, the anti-PD-1 antibody is administered at a dose of about 10 mg/kg body weight once about every 3 weeks.

In some embodiments, the anti-PD-L1 antibody is administered during the induction phase as a weight based dose. In some embodiments, the anti-PD-L1 antibody is administered at a dose ranging from about 0.1 mg/kg to about 15.0 mg/kg body weight once about every 2, 3, or 4 weeks. In some embodiments, the anti-PD-L1 antibody is administered at a dose of about 3 mg/kg or about 5 mg/kg body weight once about every 2 or 3 weeks. In particular embodiments, the anti-PD-L1 antibody is administered at a dose of about 2 mg/kg body weight once about every 2 weeks. In particular embodiments, the anti-PD-L1 antibody is administered at a dose of about 3 mg/kg body weight once about every 2 weeks. In particular embodiments, the anti-PD-L1 antibody is administered at a dose of about 4 mg/kg body weight once about every 2 weeks. In other embodiments, the anti-PD-L1 antibody is administered at a dose of about 5 mg/kg body weight once about every 2 weeks. In some embodiments, the anti-PD-L1 antibody is administered at a dose of about 6 mg/kg body weight once about every 2 weeks. In some embodiments, the anti-PD-L1 antibody is administered at a dose of about 7 mg/kg body weight once about every 2 weeks. In other embodiments, the anti-PD-L1 antibody is administered at a dose of about 8 mg/kg body weight once about every 2 weeks. In other embodiments, the anti-PD-L1 antibody is administered at a dose of about 10 mg/kg body weight once about every 2 weeks.

In some embodiments, the anti-CTLA-4 antibody is administered during the induction phase as a weight based dose. In some embodiments, the anti-CTLA-4 antibody is administered at a dose ranging from at least about 0.1 mg/kg to at least about 10.0 mg/kg body weight once about every 1, 2, 3, 4, 5, 6, 7, 8, 9, 10, 11, or 12 weeks. In some embodiments, the anti-CTLA-4 antibody is administered at a dose of about 1 mg/kg body weight once about every 6 weeks.

In some embodiments, the anti-PD-1 antibody or the anti-PD-L1 antibody is administered during the induction phase as a flat dose. In certain embodiments, the anti-PD-1 antibody (or the anti-PD-L1 antibody) and the anti-CTLA-4 antibody are both administered as a flat dose. In other embodiments, the anti-PD-1 antibody (or the anti-PD-L1 antibody) is administered as a flat dose, and the anti-CTLA-4 antibody is administered as a weight-based dose. In still other embodiments, the anti-PD-1 antibody (or the anti-PD-L1 antibody) is administered as a weight-based dose, and the anti-CTLA-4 antibody is administered as a flat dose.

In some embodiments, the anti-PD-1 antibody is administered during the induction phase at a flat dose of at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, at least about 500 mg, at least about 520 mg, at least about 540 mg, at least about 550 mg, at least about 560 mg, at least about 580 mg, at least about 600 mg, at least about 620 mg, at least about 640 mg, at least about 660 mg, at least about 680 mg, at least about 700 mg, or at least about 720 mg. In some embodiments, the anti-PD-1 antibody is administered at a flat dose once about once every 1, 2, 3, 4, 5, or 6 weeks. In some embodiments, the anti-PD-1 antibody is administered at a flat dose of about 360 mg once about every 3 weeks. In some embodiments, the anti-PD-1 antibody is administered at a flat dose of about 240 mg once about every 2 weeks. In some embodiments, the anti-PD-1 antibody is administered at a flat dose of about 480 mg once about every 4 weeks. In some embodiments, the anti-PD-1 antibody is administered at a flat dose of about 720 mg once about every 6 weeks.

In some embodiments, the anti-PD-1 antibody is administered at a flat dose of about 200 mg once about every 3 weeks. In some embodiments, the anti-PD-1 antibody is administered at a flat dose of about 400 mg once about every 6 weeks. In some embodiments, the anti-PD-1 antibody is administered at a flat dose of about 300 mg once about every 4 weeks. In some embodiments, the anti-PD-1 antibody is administered at a flat dose of about 300 mg about once a month. In some embodiments, the anti-PD-1 antibody is administered at a flat dose of about 400 mg once about every two months.

In some embodiments, the anti-PD-L1 antibody is administered during the induction phase at a flat dose of at least about 240 mg, at least about 300 mg, at least about 320 mg, at least about 400 mg, at least about 480 mg, at least about 500 mg, at least about 560 mg, at least about 600 mg, at least about 640 mg, at least about 700 mg, at least 720 mg, at least about 800 mg, at least about 880 mg, at least about 900 mg, at least 960 mg, at least about 1000 mg, at least about 1040 mg, at least about 1100 mg, at least about 1120 mg, at least about 1200 mg, at least about 1280 mg, at least about 1300 mg, at least about 1360 mg, at least about 1400 mg, or at least about 1500 mg. In some embodiments, the anti-PD-L1 antibody is administered at a flat dose once about once every 1, 2, 3, or 4 weeks. In some embodiments, the anti-PD-L1 antibody is administered at a flat dose of about 1200 mg once about every 3 weeks. In other embodiments, the anti-PD-L1 antibody is administered at a flat dose of about 1000 mg once about every 3 weeks. In some embodiments, the anti-PD-L1 antibody is administered at a flat dose of about 1100 mg once about every 3 weeks. In other embodiments, the anti-PD-L1 antibody is administered at a flat dose of about 1500 mg once about every 3 weeks.

In some embodiments, the anti-CTLA-4 antibody is administered during the induction phase at a flat dose at least about 40 mg, at least about 60 mg, at least about 80 mg, at least about 100 mg, at least about 120 mg, at least about 140 mg, at least about 160 mg, at least about 180 mg, at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, or at least about 500 mg. In some embodiments, the anti-PD-1 antibody is administered at a flat dose once about once every 1, 2, 3, 4, 5, 6, 7, 8, 9, 10, 11, or 12 weeks. In some embodiments, the anti-PD-1 antibody is administered at a flat dose of about 80 mg once about every 6 weeks.

Post Induction Phase

The post induction phase begins immediately after the induction phase. In some embodiments, the period between the first administration of the post induction phase and the last administration of the induction phase is equal to or less than about a day, two days, three days, four days, five days, six days, seven days, eight days, nine days, ten days, 11 days, 12 days, 13 days, 14 days (two weeks), 15 days, 16 days, 17 days, 18 days, 19 days, 20 days, 21 days, 22 days, 23 days, 24 days, 25 days, 26 days, 27 days, 28 days, 29 days, 30 days (a month), 31 days (a month), five weeks, six weeks, seven weeks, eight weeks, two months, or three months. In some embodiments, the first dose of the post induction phase is administered less than about a day, two days, three days, four days, five days, six days, seven days, eight days, nine days, ten days, 11 days, 12 days, 13 days, 14 days (two weeks), 15 days, 16 days, 17 days, 18 days, 19 days, 20 days, 21 days, 22 days, 23 days, 24 days, 25 days, 26 days, 27 days, 28 days, 29 days, 30 days (a month), 31 days (a month), five weeks, six weeks, seven weeks, eight weeks, two months, or three months after the last dose administered during the induction phase. In certain embodiments, the first dose of the post induction phase is administered about 3 weeks after the last dose of the induction phase. In certain embodiments, the first dose of the post induction phase is administered about 6 weeks after the last dose of the induction phase.

In certain embodiments, the post induction phase comprises administering an immunotherapy without a chemotherapy. In some embodiments, the post induction phase comprises administering an anti-PD-1 antibody or an anti-PD-L1 antibody. In certain embodiments, the post induction phase further comprises administering an anti-CTLA-4 antibody.

In some embodiments, the anti-PD-1 antibody (or the anti-PD-L1 antibody) is administered in the post induction phase at a dose that is the same as the dose of the anti-PD-1 antibody (or the anti-PD-L1 antibody) administered in the induction phase. In some embodiments, the anti-CTLA-4 antibody is administered in the post induction phase at a dose that is the same as the dose of the anti-CTLA-4 antibody administered in the induction phase. In some embodiments, the anti-PD-1 antibody (or the anti-PD-L1 antibody) are administered in the post induction phase at a dose that is different from the dose of the anti-PD-1 antibody (or the anti-PD-L1 antibody) administered in the induction phase. In some embodiments, the anti-CTLA-4 antibody is administered in the post induction phase at a dose that is different from the dose of the anti-CTLA-4 antibody administered in the induction phase.

In certain embodiments, the anti-PD-1 antibody, the anti-PD-L1 antibody, or the anti-CTLA-4 antibody is administered during the post induction phase at a weight-based dose.

In some embodiments, the anti-PD-1 antibody is administered at a dose ranging from about 0.1 mg/kg to about 10.0 mg/kg body weight once about every 2, 3, or 4 weeks. In certain embodiments, the anti-PD-1 antibody is administered at a dose of about 2 mg/kg, about 3 mg/kg, about 4 mg/kg, about 5 mg/kg, about 6 mg/kg, about 7 mg/kg, about 8 mg/kg, about 9 mg/kg, or about 10 mg/kg body weight once about every 2 weeks or 3 weeks. In particular embodiments, the anti-PD-1 antibody is administered at a dose of about 2 mg/kg body weight once about every 3 weeks. In particular embodiments, the anti-PD-1 antibody is administered at a dose of about 3 mg/kg body weight once about every 3 weeks. In some embodiments, the anti-PD-1 antibody is administered at a dose of about 4 mg/kg body weight once about every 3 weeks. In other embodiments, the anti-PD-1 antibody is administered at a dose of about 5 mg/kg body weight once about every 3 weeks. In other embodiments, the anti-PD-1 antibody is administered at a dose of about 10 mg/kg body weight once about every 3 weeks.

In some embodiments, the anti-PD-L1 antibody is administered during the post induction phase as a weight based dose. In some embodiments, the anti-PD-L1 antibody is administered at a dose ranging from about 0.1 mg/kg to about 15.0 mg/kg body weight once about every 2, 3, or 4 weeks. In some embodiments, the anti-PD-L1 antibody is administered at a dose of about 3 mg/kg or about 5 mg/kg body weight once about every 2 or 3 weeks. In particular embodiments, the anti-PD-L1 antibody is administered at a dose of about 2 mg/kg body weight once about every 2 weeks. In particular embodiments, the anti-PD-L1 antibody is administered at a dose of about 3 mg/kg body weight once about every 2 weeks. In particular embodiments, the anti-PD-L1 antibody is administered at a dose of about 4 mg/kg body weight once about every 2 weeks. In other embodiments, the anti-PD-L1 antibody is administered at a dose of about 5 mg/kg body weight once about every 2 weeks. In some embodiments, the anti-PD-L1 antibody is administered at a dose of about 6 mg/kg body weight once about every 2 weeks. In some embodiments, the anti-PD-L1 antibody is administered at a dose of about 7 mg/kg body weight once about every 2 weeks. In other embodiments, the anti-PD-L1 antibody is administered at a dose of about 8 mg/kg body weight once about every 2 weeks. In other embodiments, the anti-PD-L1 antibody is administered at a dose of about 10 mg/kg body weight once about every 2 weeks.

In some embodiments, the anti-CTLA-4 antibody is administered during the post induction phase as a weight based dose. In some embodiments, the anti-CTLA-4 antibody is administered at a dose ranging from at least about 0.1 mg/kg to at least about 10.0 mg/kg body weight once about every 1, 2, 3, 4, 5, 6, 7, 8, 9, 10, 11, or 12 weeks. In some embodiments, the anti-CTLA-4 antibody is administered at a dose of about 1 mg/kg body weight once about every 6 weeks.

In some embodiments, the anti-PD-1 antibody or the anti-PD-L1 antibody is administered during the post induction phase as a flat dose. In certain embodiments, the anti-PD-1 antibody (or the anti-PD-L1 antibody) and the anti-CTLA-4 antibody are both administered as a flat dose. In other embodiments, the anti-PD-1 antibody (or the anti-PD-L1 antibody) is administered as a flat dose, and the anti-CTLA-4 antibody is administered as a weight-based dose. In still other embodiments, the anti-PD-1 antibody (or the anti-PD-L1 antibody) is administered as a weight-based dose, and the anti-CTLA-4 antibody is administered as a flat dose.

In some embodiments, the anti-PD-1 antibody is administered during the post induction phase at a flat dose of at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, at least about 500 mg, at least about 520 mg, at least about 540 mg, at least about 550 mg, at least about 560 mg, at least about 580 mg, at least about 600 mg, at least about 620 mg, at least about 640 mg, at least about 660 mg, at least about 680 mg, at least about 700 mg, or at least about 720 mg. In some embodiments, the anti-PD-1 antibody is administered at a flat dose once about once every 1, 2, 3, 4, 5, or 6 weeks. In some embodiments, the anti-PD-1 antibody is administered at a flat dose of about 360 mg once about every 3 weeks. In some embodiments, the anti-PD-1 antibody is administered at a flat dose of about 240 mg once about every 2 weeks. In some embodiments, the anti-PD-1 antibody is administered at a flat dose of about 480 mg once about every 4 weeks. In some embodiments, the anti-PD-1 antibody is administered at a flat dose of about 720 mg once about every 6 weeks.

In some embodiments, the anti-PD-1 antibody is administered during the post induction phase at a flat dose of about 200 mg once about every 3 weeks. In some embodiments, the anti-PD-1 antibody is administered at a flat dose of about 400 mg once about every 6 weeks. In some embodiments, the anti-PD-1 antibody is administered at a flat dose of about 300 mg once about every 4 weeks. In some embodiments, the anti-PD-1 antibody is administered at a flat dose of about 300 mg about once a month. In some embodiments, the anti-PD-1 antibody is administered at a flat dose of about 400 mg once about every two months.

In some embodiments, the anti-PD-L1 antibody is administered during the post induction phase at a flat dose of at least about 240 mg, at least about 300 mg, at least about 320 mg, at least about 400 mg, at least about 480 mg, at least about 500 mg, at least about 560 mg, at least about 600 mg, at least about 640 mg, at least about 700 mg, at least about 720 mg, at least about 800 mg, at least about 880 mg, at least about 900 mg, at least about 960 mg, at least about 1000 mg, at least about 1040 mg, at least about 1100 mg, at least about 1120 mg, at least about 1200 mg, at least about 1280 mg, at least about 1300 mg, at least about 1360 mg, at least about 1400 mg, or at least about 1500 mg. In some embodiments, the anti-PD-L1 antibody is administered at a flat dose once about once every 1, 2, 3, or 4 weeks. In some embodiments, the anti-PD-L1 antibody is administered at a flat dose of about 1200 mg once about every 3 weeks. In other embodiments, the anti-PD-L1 antibody is administered at a flat dose of about 1000 mg once about every 3 weeks. In some embodiments, the anti-PD-L1 antibody is administered at a flat dose of about 1100 mg once about every 3 weeks. In other embodiments, the anti-PD-L1 antibody is administered at a flat dose of about 1500 mg once about every 3 weeks.

In some embodiments, the anti-CTLA-4 antibody is administered during the post induction phase at a flat dose at least about 40 mg, at least about 60 mg, at least about 80 mg, at least about 100 mg, at least about 120 mg, at least about 140 mg, at least about 160 mg, at least about 180 mg, at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, or at least about 500 mg. In some embodiments, the anti-PD-1 antibody is administered at a flat dose once about once every 1, 2, 3, 4, 5, 6, 7, 8, 9, 10, 11, or 12 weeks. In some embodiments, the anti-PD-1 antibody is administered at a flat dose of about 80 mg once about every 6 weeks.

Certain embodiments of the present disclosure are directed to a method for treating a subject afflicted with a tumor derived from a stage IV NSCLC, comprising administering a combination therapy comprising: (1) an induction phase comprising administering to the subject (a) a chemotherapy comprising carboplatin AUC 6 and paclitaxel 200 mg/m$^2$, administered on day one of each three-week cycle; (b) a flat dose of about 360 mg of an anti-PD-1 antibody administered once every three weeks; and (c) a dose of about 1 mg/kg body weight of an anti-CTLA-4 antibody administered once about every six weeks for 1 cycle; and (2) a post induction phase comprising administering to the subject a flat dose of about 360 mg of an anti-PD-1 antibody administered once about every three weeks and a dose of about 1 mg/kg body weight of an anti-CTLA-4 antibody administered once about every six weeks; wherein the post induction phase is administered after the induction phase. In some embodiments, the induction phase continues for less than four cycles of the chemotherapy. In some embodiments, the induction phase continues for less than three cycles of the chemotherapy. In certain embodiments, the induction phase continues for two cycles of the chemotherapy.

Certain embodiments of the present disclosure are directed to a method for treating a subject afflicted with a tumor derived from a stage IV NSCLC, comprising administering a combination therapy comprising: (1) an induction phase comprising administering to the subject (a) a chemotherapy comprising carboplatin AUC 5 and pemetrexed 500 mg/m$^2$, administered on day one of each three-week cycle; (b) a flat dose of about 360 mg of an anti-PD-1 antibody administered once every three weeks; and (c) a dose of about 1 mg/kg body weight of an anti-CTLA-4 antibody administered once about every six weeks for 1 cycle; and (2) a post induction phase comprising administering to the subject a flat dose of about 360 mg of an anti-PD-1 antibody administered once about every three weeks and a dose of about 1 mg/kg body weight of an anti-CTLA-4 antibody administered once about every six weeks; wherein the post induction phase is administered after the induction phase. In some embodiments, the induction phase continues for less than four cycles of the chemotherapy. In some embodiments, the induction phase continues for less than three cycles of the chemotherapy. In certain embodiments, the induction phase continues for two cycles of the chemotherapy.

Certain embodiments of the present disclosure are directed to a method for treating a subject afflicted with a tumor derived from a stage IV NSCLC, comprising administering a combination therapy comprising: (1) an induction phase comprising administering to the subject (a) a chemotherapy comprising carboplatin AUC 6 and pemetrexed 500 mg/m$^2$, administered on day one of each three-week cycle; (b) a flat dose of about 360 mg of an anti-PD-1 antibody administered once every three weeks; and (c) a dose of about 1 mg/kg body weight of an anti-CTLA-4 antibody administered once about every six weeks for 1 cycle; and (2) a post induction phase comprising administering to the subject a flat dose of about 360 mg of an anti-PD-1 antibody administered once about every three weeks and a dose of about 1 mg/kg body weight of an anti-CTLA-4 antibody administered once about every six weeks; wherein the post induction phase is administered after the induction phase. In some embodiments, the induction phase continues for less than four cycles of the chemotherapy. In some embodiments, the induction phase continues for less than three cycles of the chemotherapy. In certain embodiments, the induction phase continues for two cycles of the chemotherapy.

Certain embodiments of the present disclosure are directed to a method for treating a subject afflicted with a tumor derived from a stage IV NSCLC, comprising administering a combination therapy comprising: (1) an induction phase comprising administering to the subject (a) a chemotherapy comprising cisplatin 75 mg/m$^2$ and pemetrexed 500 mg/m$^2$, administered on day one of each three-week cycle; (b) a flat dose of about 360 mg of an anti-PD-1 antibody administered once every three weeks; and (c) a dose of about 1 mg/kg body weight of an anti-CTLA-4 antibody administered once about every six weeks for 1 cycle; and (2) a post induction phase comprising administering to the subject a flat dose of about 360 mg of an anti-PD-1 antibody administered once about every three weeks and a dose of about 1 mg/kg body weight of an anti-CTLA-4 antibody administered once about every six weeks; wherein the post induction phase is administered after the induction phase. In some embodiments, the induction phase continues for less than four cycles of the chemotherapy. In some embodiments, the induction phase continues for less than three cycles of the chemotherapy. In certain embodiments, the induction phase continues for two cycles of the chemotherapy.

In some embodiments, the subject exhibits progression-free survival of at least about one month, at least about 2 months, at least about 3 months, at least about 4 months, at least about 5 months, at least about 6 months, at least about 7 months, at least about 8 months, at least about 9 months, at least about 10 months, at least about 11 months, at least about one year, at least about eighteen months, at least about two years, at least about three years, at least about four years, or at least about five years after the administration. In some embodiments, the subject exhibits an overall survival of at least about one month, at least about 2 months, at least about 3 months, at least about 4 months, at least about 5 months, at least about 6 months, at least about 7 months, at least about 8 months, at least about 9 months, at least about 10 months, at least about 11 months, at least about one year, at least about 14 months, at least about 16 months, at least about 18 months, at least about 20 months, at least about 22 months, at least about two years, at least about three years, at least about four years, or at least about five years after the administration. In some embodiments, the subject exhibits an objective response rate of at least about 15%, at least about 20%, at least about 25%, at least about 30%, about 35%, about 40%, about 45%, about 50%, about 55%, about 60%, about 65%, about 70%, about 75%, about 80%, about 85%, about 90%, about 95%, or about 100%.

In some aspects, the methods of the present disclosure, e.g., a combination of nivolumab (e.g., about 360 mg every 3 weeks) plus low-dose ipilimumab (e.g., about 1 mg/kg every 6 weeks) and two cycles of chemotherapy (e.g., (i) carboplatin AUC 5 or 6 plus pemetrexed 500 mg/m$^2$ or (ii) cisplatin 75 mg/m$^2$ plus pemetrexed 500 mg/m$^2$), exhibits superior overall survival compared to the chemotherapy alone for up to four cycles followed by an optional maintenance therapy.

In some aspects, the methods of the present disclosure, e.g., a combination of nivolumab (e.g., about 360 mg every 3 weeks) plus low-dose ipilimumab (e.g., about 1 mg/kg every 6 weeks) and two cycles of chemotherapy (e.g., (i) carboplatin AUC 5 or 6 plus pemetrexed 500 mg/m$^2$ or (ii) cisplatin 75 mg/m$^2$ plus pemetrexed 500 mg/m$^2$), exhibits a safety profile that is comparable to the known safety profiles of the immunotherapy (nivolumab and/or ipilimumab) and chemotherapy components.

Anti-PD-1 Antibodies Useful for the Disclosure

Anti-PD-1 antibodies that are known in the art can be used in the presently described compositions and methods. Various human monoclonal antibodies that bind specifically to PD-1 with high affinity have been disclosed in U.S. Pat. No. 8,008,449. Anti-PD-1 human antibodies disclosed in U.S. Pat. No. 8,008,449 have been demonstrated to exhibit one or more of the following characteristics: (a) bind to human PD-1 with a $K_D$ of $1 \times 10^{-7}$ M or less, as determined by surface plasmon resonance using a Biacore biosensor system; (b) do not substantially bind to human CD28, CTLA-4 or ICOS; (c) increase T-cell proliferation in a Mixed Lymphocyte Reaction (MLR) assay; (d) increase interferon-γ production in an MLR assay; (e) increase IL-2 secretion in an MLR assay; (f) bind to human PD-1 and cynomolgus monkey PD-1; (g) inhibit the binding of PD-L1 and/or PD-L2 to PD-1; (h) stimulate antigen-specific memory responses; (i) stimulate antibody responses; and (i) inhibit tumor cell growth in vivo. Anti-PD-1 antibodies usable in the present disclosure include monoclonal antibodies that bind specifically to human PD-1 and exhibit at least one, in some embodiments, at least five, of the preceding characteristics.

Other anti-PD-1 monoclonal antibodies have been described in, for example, U.S. Pat. Nos. 6,808,710, 7,488, 802, 8,168,757 and 8,354,509, US Publication No. 2016/0272708, and PCT Publication Nos. WO 2012/145493, WO 2008/156712, WO 2015/112900, WO 2012/145493, WO 2015/112800, WO 2014/206107, WO 2015/35606, WO 2015/085847, WO 2014/179664, WO 2017/020291, WO 2017/020858, WO 2016/197367, WO 2017/024515, WO 2017/025051, WO 2017/123557, WO 2016/106159, WO 2014/194302, WO 2017/040790, WO 2017/133540, WO 2017/132827, WO 2017/024465, WO 2017/025016, WO 2017/106061, WO 2017/19846, WO 2017/024465, WO 2017/025016, WO 2017/132825, and WO 2017/133540 each of which is incorporated by reference in its entirety.

In some embodiments, the anti-PD-1 antibody is selected from the group consisting of nivolumab (also known as OPDIVO®, 5C4, BMS-936558, MDX-1106, and ONO-4538), pembrolizumab (Merck; also known as KEYTRUDA®, lambrolizumab, and MK-3475; see WO2008/156712), PDR001 (Novartis; also known as spartalizumab; see WO 2015/112900), MEDI-0680 (AstraZeneca; also known as AMP-514; see WO 2012/145493), cemiplimab (Regeneron; also known as REGN-2810; see WO 2015/112800), JS001 (TAIZHOU JUNSHI PHARMA; see Si-Yang Liu et al., J. Hematol. Oncol. 10:136 (2017)), BGB-A317 ("Tislelizumab;" Beigene; see WO 2015/35606 and US 2015/0079109), INCSHR1210 (Jiangsu Hengrui Medicine; also known as SHR-1210; see WO 2015/085847; Si-Yang Liu et al., J. Hematol. Oncol. 10:136 (2017)), TSR-042 (Tesaro Biopharmaceutical; also known as ANB011; see WO2014/179664), GLS-010 (Wuxi/Harbin Gloria Pharmaceuticals; also known as WBP3055; see Si-Yang Liu et al., J. Hematol. Oncol. 10:136 (2017)), AM-0001 (Armo), STI-1110 (Sorrento Therapeutics; see WO 2014/194302), AGEN2034 (Agenus; see WO 2017/040790), MGA012 (Macrogenics, see WO 2017/19846), IBI308 (Innovent; see WO 2017/024465, WO 2017/025016, WO 2017/132825, and WO 2017/133540), and BCD-100 (Biocad).

In one embodiment, the anti-PD-1 antibody is nivolumab. Nivolumab is a fully human IgG4 (S228P) PD-1 immune checkpoint inhibitor antibody that selectively prevents interaction with PD-1 ligands (PD-L1 and PD-L2), thereby blocking the down-regulation of antitumor T-cell functions (U.S. Pat. No. 8,008,449; Wang et al., 2014 Cancer Immunol Res. 2(9):846-56).

In another embodiment, the anti-PD-1 antibody is pembrolizumab. Pembrolizumab is a humanized monoclonal IgG4 (S228P) antibody directed against human cell surface receptor PD-1 (programmed death-1 or programmed cell death-1). Pembrolizumab is described, for example, in U.S. Pat. Nos. 8,354,509 and 8,900,587.

Anti-PD-1 antibodies usable in the disclosed compositions and methods also include isolated antibodies that bind specifically to human PD-1 and cross-compete for binding to human PD-1 with any anti-PD-1 antibody disclosed herein, e.g., nivolumab (see, e.g., U.S. Pat. Nos. 8,008,449 and 8,779,105; WO 2013/173223). In some embodiments, the anti-PD-1 antibody binds the same epitope as any of the anti-PD-1 antibodies described herein, e.g., nivolumab. The ability of antibodies to cross-compete for binding to an antigen indicates that these monoclonal antibodies bind to the same epitope region of the antigen and sterically hinder the binding of other cross-competing antibodies to that particular epitope region. These cross-competing antibodies are expected to have functional properties very similar those of the reference antibody, e.g., nivolumab, by virtue of their binding to the same epitope region of PD-1. Cross-competing antibodies can be readily identified based on their ability to cross-compete with nivolumab in standard PD-1 binding assays such as Biacore analysis, ELISA assays or flow cytometry (see, e.g., WO 2013/173223).

In certain embodiments, the antibodies that cross-compete for binding to human PD-1 with, or bind to the same epitope region of human PD-1 antibody, nivolumab, are monoclonal antibodies. For administration to human subjects, these cross-competing antibodies are chimeric antibodies, engineered antibodies, or humanized or human antibodies. Such chimeric, engineered, humanized or human monoclonal antibodies can be prepared and isolated by methods well known in the art.

Anti-PD-1 antibodies usable in the compositions and methods of the disclosure also include antigen-binding portions of the above antibodies. It has been amply demonstrated that the antigen-binding function of an antibody can be performed by fragments of a full-length antibody.

Anti-PD-1 antibodies suitable for use in the disclosed compositions and methods are antibodies that bind to PD-1 with high specificity and affinity, block the binding of PD-L1 and or PD-L2, and inhibit the immunosuppressive effect of the PD-1 signaling pathway. In any of the compositions or methods disclosed herein, an anti-PD-1 "antibody" includes an antigen-binding portion or fragment that binds to the PD-1 receptor and exhibits the functional properties similar to those of whole antibodies in inhibiting ligand binding and up-regulating the immune system. In certain embodiments, the anti-PD-1 antibody or antigen-binding portion thereof cross-competes with nivolumab for binding to human PD-1.

In some embodiments, the anti-PD-1 antibody is administered at a dose ranging from 0.1 mg/kg to 20.0 mg/kg body weight once every 2, 3, 4, 5, 6, 7, or 8 weeks, e.g., 0.1 mg/kg to 10.0 mg/kg body weight once every 2, 3, or 4 weeks. In other embodiments, the anti-PD-1 antibody is administered at a dose of about 2 mg/kg, about 3 mg/kg, about 4 mg/kg, about 5 mg/kg, about 6 mg/kg, about 7 mg/kg, about 8 mg/kg, about 9 mg/kg, or 10 mg/kg body weight once every 2 weeks. In other embodiments, the anti-PD-1 antibody is administered at a dose of about 2 mg/kg, about 3 mg/kg, about 4 mg/kg, about 5 mg/kg, about 6 mg/kg, about 7 mg/kg, about 8 mg/kg, about 9 mg/kg, or 10 mg/kg body weight once every 3 weeks. In one embodiment, the anti-PD-1 antibody is administered at a dose of about 5 mg/kg body weight about once every 3 weeks. In another embodiment, the anti-PD-1 antibody, e.g., nivolumab, is administered at a dose of about 3 mg/kg body weight about once every 2 weeks. In other embodiments, the anti-PD-1 antibody, e.g., pembrolizumab, is administered at a dose of about 2 mg/kg body weight about once every 3 weeks.

The anti-PD-1 antibody useful for the present disclosure can be administered as a flat dose. In some embodiments, the anti-PD-1 antibody is administered at a flat dose of from about 100 to about 1000 mg, from about 100 mg to about 900 mg, from about 100 mg to about 800 mg, from about 100 mg to about 700 mg, from about 100 mg to about 600 mg, from about 100 mg to about 500 mg, from about 200 mg to about 1000 mg, from about 200 mg to about 900 mg, from about 200 mg to about 800 mg, from about 200 mg to about 700 mg, from about 200 mg to about 600 mg, from about 200 mg to about 500 mg, from about 200 mg to about 480 mg, or from about 240 mg to about 480 mg, In one embodiment, the anti-PD-1 antibody is administered as a flat dose of at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, at least about 500 mg, at least about 520 mg, at least about 540 mg, at least about 550 mg, at least about 560 mg, at least about 580 mg, at least about 600 mg, at least about 620 mg, at least about 640 mg, at least about 660 mg, at least about 680 mg, at least about 700 mg, or at least about 720 mg at a dosing interval of about 1, 2, 3, 4, 5, 6, 7, 8, 9, or 10 weeks. In another embodiments, the anti-PD-1 antibody is administered as a flat dose of about 200 mg to about 800 mg, about 200 mg to about 700 mg, about 200 mg to about 600 mg, about 200 mg to about 500 mg, at a dosing interval of about 1, 2, 3, or 4 weeks.

In some embodiments, the anti-PD-1 antibody is administered as a flat dose of about 200 mg at about once every 3 weeks. In other embodiments, the anti-PD-1 antibody is administered as a flat dose of about 200 mg at about once every 2 weeks. In other embodiments, the anti-PD-1 antibody is administered as a flat dose of about 240 mg at about once every 2 weeks. In other embodiments, the anti-PD-1 antibody is administered as a flat dose of about 360 mg at about once every 2 weeks. In certain embodiments, the anti-PD-1 antibody is administered as a flat dose of about 480 mg at about once every 4 weeks.

Anti-PD-L1 Antibodies Useful for the Disclosure

Because anti-PD-1 and anti-PD-L1 target the same signaling pathway and have been shown in clinical trials to exhibit similar levels of efficacy in a variety of cancers, including renal cell carcinoma (see Brahmer et al. (2012) *N Engl J Med* 366:2455-65; Topalian et al. (2012a) *N Engl J Med* 366:2443-54; WO 2013/173223), an anti-PD-L1 antibody may be substituted for the anti-PD-1 antibody in any of the therapeutic methods disclosed herein. Anti-PD-L1 antibodies that are known in the art can be used in the compositions and methods of the present disclosure. Examples of anti-PD-L1 antibodies useful in the compositions and methods of the present disclosure include the antibodies disclosed in U.S. Pat. No. 9,580,507. Anti-PD-L1 human monoclonal antibodies disclosed in U.S. Pat. No. 9,580,507 have been demonstrated to exhibit one or more of the following characteristics: (a) bind to human PD-L1 with a $K_D$ of $1 \times 10^{-7}$ M or less, as determined by surface plasmon resonance using a Biacore biosensor system; (b) increase T-cell proliferation in a Mixed Lymphocyte Reaction (MLR) assay; (c) increase interferon-γ production in an MLR assay; (d) increase IL-2 secretion in an MLR assay; (e) stimulate antibody responses; and (f) reverse the effect of T regulatory cells on T cell effector cells and/or dendritic cells. Anti-PD-L1 antibodies usable in the present disclosure include monoclonal antibodies that bind specifically to human PD-L1 and exhibit at least one, in some embodiments, at least five, of the preceding characteristics.

In certain embodiments, the anti-PD-L1 antibody is selected from the group consisting of BMS-936559 (also known as 12A4, MDX-1105; see, e.g., U.S. Pat. No. 7,943, 743 and WO 2013/173223), atezolizumab (Roche; also known as TECENTRIQ®; MPDL3280A, RG7446; see U.S. Pat. No. 8,217,149; see, also, Herbst et al. (2013) J Clin Oncol 31(suppl): 3000), durvalumab (AstraZeneca; also known as IMFINZI™, MEDI-4736; see WO 2011/066389), avelumab (Pfizer; also known as BAVENCIO®, MSB-0010718C; see WO 2013/079174), STI-1014 (Sorrento; see WO2013/181634), CX-072 (Cytomx; see WO2016/149201), KN035 (3D Med/Alphamab; see Zhang et al., Cell Discov. 7:3 (March 2017), LY3300054 (Eli Lilly Co.; see, e.g., WO 2017/034916), and CK-301 (Checkpoint Therapeutics; see Gorelik et al., AACR:Abstract 4606 (April 2016)).

In certain embodiments, the PD-L1 antibody is atezolizumab (TECENTRIQ®). Atezolizumab is a fully humanized IgG1 monoclonal anti-PD-L1 antibody.

In certain embodiments, the PD-L1 antibody is durvalumab (IMFINZI™) Durvalumab is a human IgG1 kappa monoclonal anti-PD-L1 antibody.

In certain embodiments, the PD-L1 antibody is avelumab (BAVENCIO®). Avelumab is a human IgG1 lambda monoclonal anti-PD-L1 antibody.

Anti-PD-L1 antibodies usable in the disclosed compositions and methods also include isolated antibodies that bind specifically to human PD-L1 and cross-compete for binding to human PD-L1 with any anti-PD-L1 antibody disclosed herein, e.g., atezolizumab, durvalumab, and/or avelumab. In some embodiments, the anti-PD-L1 antibody binds the same epitope as any of the anti-PD-L1 antibodies described herein, e.g., atezolizumab, durvalumab, and/or avelumab. The ability of antibodies to cross-compete for binding to an antigen indicates that these antibodies bind to the same epitope region of the antigen and sterically hinder the binding of other cross-competing antibodies to that particular epitope region. These cross-competing antibodies are expected to have functional properties very similar those of the reference antibody, e.g., atezolizumab and/or avelumab, by virtue of their binding to the same epitope region of PD-L1. Cross-competing antibodies can be readily identified based on their ability to cross-compete with atezolizumab and/or avelumab in standard PD-L1 binding assays such as Biacore analysis, ELISA assays or flow cytometry (see, e.g., WO 2013/173223).

In certain embodiments, the antibodies that cross-compete for binding to human PD-L1 with, or bind to the same epitope region of human PD-L1 antibody as, atezolizumab, durvalumab, and/or avelumab, are monoclonal antibodies. For administration to human subjects, these cross-competing antibodies are chimeric antibodies, engineered antibodies, or humanized or human antibodies. Such chimeric, engineered, humanized or human monoclonal antibodies can be prepared and isolated by methods well known in the art.

Anti-PD-L1 antibodies usable in the compositions and methods of the disclosed disclosure also include antigen-binding portions of the above antibodies. It has been amply demonstrated that the antigen-binding function of an antibody can be performed by fragments of a full-length antibody.

Anti-PD-L1 antibodies suitable for use in the disclosed compositions and methods are antibodies that bind to PD-L1 with high specificity and affinity, block the binding of PD-1, and inhibit the immunosuppressive effect of the PD-1 signaling pathway. In any of the compositions or methods disclosed herein, an anti-PD-L1 "antibody" includes an antigen-binding portion or fragment that binds to PD-L1 and exhibits the functional properties similar to those of whole antibodies in inhibiting receptor binding and up-regulating the immune system. In certain embodiments, the anti-PD-L1 antibody or antigen-binding portion thereof cross-competes with atezolizumab, durvalumab, and/or avelumab for binding to human PD-L1.

The anti-PD-L1 antibody useful for the present disclosure can be any PD-L1 antibody that specifically binds to PD-L1, e.g., antibodies that cross-compete with durvalumab, avelumab, or atezolizumab for binding to human PD-1, e.g., an antibody that binds to the same epitope as durvalumab, avelumab, or atezolizumab. In a particular embodiment, the anti-PD-L1 antibody is durvalumab. In other embodiments, the anti-PD-L1 antibody is avelumab. In some embodiments, the anti-PD-L1 antibody is atezolizumab.

In some embodiments, the anti-PD-L1 antibody is administered at a dose ranging from about 0.1 mg/kg to about 20.0 mg/kg body weight, about 2 mg/kg, about 3 mg/kg, about 4 mg/kg, about 5 mg/kg, about 6 mg/kg, about 7 mg/kg, about 8 mg/kg, about 9 mg/kg, about 10 mg/kg, about 11 mg/kg, about 12 mg/kg, about 13 mg/kg, about 14 mg/kg, about 15 mg/kg, about 16 mg/kg, about 17 mg/kg, about 18 mg/kg, about 19 mg/kg, or about 20 mg/kg, about once every 2, 3, 4, 5, 6, 7, or 8 weeks.

In some embodiments, the anti-PD-L1 antibody is administered at a dose of about 15 mg/kg body weight at about once every 3 weeks. In other embodiments, the anti-PD-L1 antibody is administered at a dose of about 10 mg/kg body weight at about once every 2 weeks.

In other embodiments, the anti-PD-L1 antibody useful for the present disclosure is a flat dose. In some embodiments, the anti-PD-L1 antibody is administered as a flat dose of from about 200 mg to about 1600 mg, about 200 mg to about 1500 mg, about 200 mg to about 1400 mg, about 200 mg to about 1300 mg, about 200 mg to about 1200 mg, about 200 mg to about 1100 mg, about 200 mg to about 1000 mg, about 200 mg to about 900 mg, about 200 mg to about 800 mg, about 200 mg to about 700 mg, about 200 mg to about 600 mg, about 700 mg to about 1300 mg, about 800 mg to about 1200 mg, about 700 mg to about 900 mg, or about 1100 mg to about 1300 mg. In some embodiments, the anti-PD-L1 antibody is administered as a flat dose of at least about 240 mg, at least about 300 mg, at least about 320 mg, at least about 400 mg, at least about 480 mg, at least about 500 mg, at least about 560 mg, at least about 600 mg, at least about 640 mg, at least about 700 mg, at least 720 mg, at least about 800 mg, at least about 880 mg, at least about 900 mg, at least 960 mg, at least about 1000 mg, at least about 1040 mg, at least about 1100 mg, at least about 1120 mg, at least about 1200 mg, at least about 1280 mg, at least about 1300 mg, at least about 1360 mg, or at least about 1400 mg, at a dosing interval of about 1, 2, 3, or 4 weeks. In some embodiments, the anti-PD-L1 antibody is administered at a flat dose of about 1000 mg. In some embodiments, the anti-PD-L1 antibody is administered at a flat dose of about 1100 mg. In some embodiments, the anti-PD-L1 antibody is administered at a flat dose of about 1200 mg. In some embodiments, the anti-PD-L1 antibody is administered at a flat dose of about 1300 mg. In some embodiments, the anti-PD-L1 antibody is administered at a flat dose of about 1400 mg. In some embodiments, the anti-PD-L1 antibody is administered at a flat dose of about 1500 mg. In some embodiments, the anti-PD-L1 antibody is administered as a flat dose of about 1200 mg at about once every 3 weeks. In other embodiments, the anti-PD-L1 antibody is administered as a flat dose of about 800 mg at about once every 2 weeks.

Anti-CTLA-4 Antibodies

Anti-CTLA-4 antibodies that are known in the art can be used in the compositions and methods of the present disclosure. Anti-CTLA-4 antibodies of the instant disclosure bind to human CTLA-4 so as to disrupt the interaction of CTLA-4 with a human B7 receptor. Because the interaction of CTLA-4 with B7 transduces a signal leading to inactivation of T-cells bearing the CTLA-4 receptor, disruption of the interaction effectively induces, enhances or prolongs the activation of such T cells, thereby inducing, enhancing or prolonging an immune response.

Human monoclonal antibodies that bind specifically to CTLA-4 with high affinity have been disclosed in U.S. Pat. No. 6,984,720. Other anti-CTLA-4 monoclonal antibodies have been described in, for example, U.S. Pat. Nos. 5,977,318, 6,051,227, 6,682,736, and 7,034,121 and International Publication Nos. WO 2012/122444, WO 2007/113648, WO 2016/196237, and WO 2000/037504, each of which is incorporated by reference herein in its entirety. The anti-CTLA-4 human monoclonal antibodies disclosed in U.S. Pat. No. 6,984,720 have been demonstrated to exhibit one or more of the following characteristics: (a) binds specifically to human CTLA-4 with a binding affinity reflected by an equilibrium association constant ($K_a$) of at least about $10^7$ $M^{-1}$, or about $10^9$ $M^{-1}$, or about $10^{10}$ $M^{-1}$ to $10^{11}$ $M^{-1}$ or higher, as determined by Biacore analysis; (b) a kinetic association constant ($k_a$) of at least about $10^3$, about $10^4$, or about $10^5$ $m^{-1}$ $s^{-1}$; (c) a kinetic disassociation constant ($k_d$) of at least about $10^3$, about $10^4$, or about $10^5$ $m^{-1}$ $s^{-1}$; and (d) inhibits the binding of CTLA-4 to B7-1 (CD80) and B7-2 (CD86). Anti-CTLA-4 antibodies useful for the present disclosure include monoclonal antibodies that bind specifically to human CTLA-4 and exhibit at least one, at least two, or at least three of the preceding characteristics.

In certain embodiments, the CTLA-4 antibody is selected from the group consisting of ipilimumab (also known as YERVOY®, MDX-010, 10D1; see U.S. Pat. No. 6,984,720), MK-1308 (Merck), AGEN-1884 (Agenus Inc.; see WO 2016/196237), and tremelimumab (AstraZeneca; also known as ticilimumab, CP-675,206; see WO 2000/037504 and Ribas, Update Cancer Ther. 2(3): 133-39 (2007)). In particular embodiments, the anti-CTLA-4 antibody is ipilimumab.

In particular embodiments, the CTLA-4 antibody is ipilimumab for use in the compositions and methods disclosed herein. Ipilimumab is a fully human, IgG1 monoclonal antibody that blocks the binding of CTLA-4 to its B7 ligands, thereby stimulating T cell activation and improving overall survival (OS) in patients with advanced melanoma.

In particular embodiments, the CTLA-4 antibody is tremelimumab.

In particular embodiments, the CTLA-4 antibody is MK-1308.

In particular embodiments, the CTLA-4 antibody is AGEN-1884.

Anti-CTLA-4 antibodies usable in the disclosed compositions and methods also include isolated antibodies that bind specifically to human CTLA-4 and cross-compete for binding to human CTLA-4 with any anti-CTLA-4 antibody disclosed herein, e.g., ipilimumab and/or tremelimumab. In some embodiments, the anti-CTLA-4 antibody binds the same epitope as any of the anti-CTLA-4 antibodies described herein, e.g., ipilimumab and/or tremelimumab. The ability of antibodies to cross-compete for binding to an antigen indicates that these antibodies bind to the same epitope region of the antigen and sterically hinder the binding of other cross-competing antibodies to that particular epitope region. These cross-competing antibodies are expected to have functional properties very similar those of the reference antibody, e.g., ipilimumab and/or tremelimumab, by virtue of their binding to the same epitope region of CTLA-4. Cross-competing antibodies can be readily identified based on their ability to cross-compete with ipilimumab and/or tremelimumab in standard CTLA-4 binding assays such as Biacore analysis, ELISA assays or flow cytometry (see, e.g., WO 2013/173223).

In certain embodiments, the antibodies that cross-compete for binding to human CTLA-4 with, or bind to the same epitope region of human CTLA-4 antibody as, ipilimumab and/or tremelimumab, are monoclonal antibodies. For administration to human subjects, these cross-competing antibodies are chimeric antibodies, engineered antibodies, or humanized or human antibodies. Such chimeric, engineered, humanized or human monoclonal antibodies can be prepared and isolated by methods well known in the art.

Anti-CTLA-4 antibodies usable in the compositions and methods of the disclosed disclosure also include antigen-binding portions of the above antibodies. It has been amply demonstrated that the antigen-binding function of an antibody can be performed by fragments of a full-length antibody.

Anti-CTLA-4 antibodies suitable for use in the disclosed methods or compositions are antibodies that bind to CTLA-4 with high specificity and affinity, block the activity of CTLA-4, and disrupt the interaction of CTLA-4 with a human B7 receptor. In any of the compositions or methods disclosed herein, an anti-CTLA-4 "antibody" includes an antigen-binding portion or fragment that binds to CTLA-4 and exhibits the functional properties similar to those of whole antibodies in inhibiting the interaction of CTLA-4 with a human B7 receptor and up-regulating the immune system. In certain embodiments, the anti-CTLA-4 antibody or antigen-binding portion thereof cross-competes with ipilimumab and/or tremelimumab for binding to human CTLA-4.

In some embodiments, the anti-CTLA-4 antibody or antigen-binding portion thereof is administered at a dose ranging from 0.1 mg/kg to 10.0 mg/kg body weight once every 2, 3, 4, 5, 6, 7, or 8 weeks. In some embodiments, the anti-CTLA-4 antibody or antigen-binding portion thereof is administered at a dose of 1 mg/kg or 3 mg/kg body weight once every 3, 4, 5, or 6 weeks. In one embodiment, the anti-CTLA-4 antibody or antigen-binding portion thereof is administered at a dose of 3 mg/kg body weight once every 2 weeks. In another embodiment, the anti-PD-1 antibody or antigen-binding portion thereof is administered at a dose of 1 mg/kg body weight once every 6 weeks.

In some embodiments, the anti-CTLA-4 antibody or antigen-binding portion thereof is administered as a flat dose. In some embodiments, the anti-CTLA-4 antibody is administered at a flat dose of from about 10 to about 1000 mg, from about 10 mg to about 900 mg, from about 10 mg to about 800 mg, from about 10 mg to about 700 mg, from about 10 mg to about 600 mg, from about 10 mg to about 500 mg, from about 100 mg to about 1000 mg, from about 100 mg to about 900 mg, from about 100 mg to about 800 mg, from about 100 mg to about 700 mg, from about 100 mg to about 100 mg, from about 100 mg to about 500 mg, from about 100 mg to about 480 mg, or from about 240 mg to about 480 mg. In one embodiment, the anti-CTLA-4 antibody or antigen-binding portion thereof is administered as a flat dose of at least about 60 mg, at least about 80 mg, at least about 100 mg, at least about 120 mg, at least about 140 mg, at least about 160 mg, at least about 180 mg, at least about 200 mg, at least about 220 mg, at least about 240 mg, at least about 260 mg, at least about 280 mg, at least about 300 mg, at least about 320 mg, at least about 340 mg, at least about 360 mg, at least about 380 mg, at least about 400 mg, at least about 420 mg, at least about 440 mg, at least about 460 mg, at least about 480 mg, at least about 500 mg, at least about 520 mg at least about 540 mg, at least about 550 mg, at least about 560 mg, at least about 580 mg, at least about 600 mg, at least about 620 mg, at least about 640 mg, at least about 660 mg, at least about 680 mg, at least about 700 mg, or at least about 720 mg. In another embodiment, the anti-CTLA-4 antibody or antigen-binding portion thereof is administered as a flat dose about once every 1, 2, 3, 4, 5, 6, 7, or 8 weeks.

Cytokines

In some embodiments, the method comprises administering a combination therapy comprising (1) an induction phase comprising administering to the subject a chemotherapy for a period of time that is less than the standard period of time for the chemotherapy; (2) a post induction phase comprising administering to the subject an anti-PD-1 antibody (or an anti-PD-L1 antibody), an anti-CTLA-4 antibody, and a cytokine after (1). In some embodiments, the induction phase further comprises administering an anti-PD-1 antibody (or an anti-PD-L1 antibody), an anti-CTLA-4 antibody, and a cytokine.

The cytokine can be any cytokine or variant thereof known in the art. In some embodiments, the cytokine is selected from the group consisting of interleukin-2 (IL-2), IL-10, IL-6, TNF-α, RANTES, monocyte chemoattractant protein (MCP-1), monocyte inflammatory protein (MIP-1α and MIP-1), IL-8, lymphotactin, fractalkine, IL-1, IL-4, IL-10, IL-11, IL-13, LIF, interferon-alpha, TGF-beta, and any combination thereof. In some embodiments, the cytokine is a CD122 agonist. In certain embodiments, the cytokine comprises IL-2 or a variant thereof.

In some embodiments, the cytokine comprises one or more amino acid substitution, deletion, or insertion relative to the wild-type cytokine amino acid sequence. In some embodiments, the cytokine comprises an amino acid sequence having at least 1, at least 2, at least 3, at least 4, at least 5, at least 6, at least 7, at least 8, at least 9, or at least 10 amino acids substituted relative to the amino acid sequence of the wild-type cytokine.

In some embodiments, the cytokine is modified, e.g., to increase activity and/or half-life. In certain embodiments, the cytokine is modified through fusion of a heterologous moiety to the cytokine. The heterologous moiety can be any structure including a polypeptide, a polymer, a small molecule, a nucleotide, or a fragment or analog thereof. In certain embodiments, the heterologous moiety comprises a polypeptide. In some embodiments, the heterologous moiety comprises albumin or a fragment thereof, albumin-binding polypeptide (ABP), XTEN, Fc, PAS, the C-terminal peptide (CTP) of the β subunit of human chorionic gonadotropin, or any combination thereof.

In certain embodiments, the cytokine is modified through fusion of the cytokine with a polymer. In some embodiments, the polymer comprises polyethylene glycol (PEG), polypropylene glycol (PPG), hydroxyethyl starch (HES), or any combination thereof. "PEG" or "polyethylene glycol," as used herein, is meant to encompass any water-soluble poly(ethylene oxide). Unless otherwise indicated, a "PEG polymer" or a polyethylene glycol is one in which substantially all (preferably all) monomeric subunits are ethylene oxide subunits, though, the polymer may contain distinct end capping moieties or functional groups, e.g., for conjugation. PEG polymers for use in the present disclosure will comprise one of the two following structures: "—$(CH_2CH_2O)_{n-n}$" or "—$(CH_2CH_2O)_{n-1}CH_2CH_2$—," depending upon whether or not the terminal oxygen(s) has been displaced, e.g., during a synthetic transformation. As stated above, for the PEG polymers, the variable (n) ranges from about 3 to 4000, and the terminal groups and architecture of the overall PEG can vary.

In some embodiments, the methods of the present disclosure comprise administering a combination therapy comprising (1) an induction phase comprising administering to the subject a chemotherapy for a period of time that is less than the standard period of time for the chemotherapy; (2) a post induction phase comprising administering to the subject an anti-PD-1 antibody (or an anti-PD-L1 antibody), an anti-CTLA-4 antibody, and a CD122 agonist after (1). In some embodiments, the induction phase further comprises administering an anti-PD-1 antibody (or an anti-PD-L1 antibody), an anti-CTLA-4 antibody, and a CD122 agonist. In some embodiments, the CD122 agonist comprises IL-2 or a variant thereof. In some embodiments, the CD122 agonist comprises an IL-2 variant having at least 1 amino acid substitution relative to wild-type IL-2. In some embodiments, the CD122 agonist comprises an IL-2 fused to a PEG. In some embodiments, the CD122 agonist comprises an IL-2 variant having at least 1 amino acid substitution relative to wild-type IL-2, wherein the IL-2 variant is fused to a PEG.

Combination Therapies

In certain embodiments, the anti-PD-1 antibody, the anti-PD-L1 antibody, and/or the anti-CTLA-4 antibody are administered at a therapeutically effective amount. In some embodiments, the method comprises administering a therapeutically effective amount of an anti-PD-1 antibody and an anti-CTLA-4 antibody. In other embodiments, the method comprises administering a therapeutically effective amount of an anti-PD-L1 antibody and an anti-CTLA-4 antibody. Any anti-PD-1, anti-PD-L1, or anti-CTLA-4 antibody disclosed herein can be used in the method. In certain embodiments, the anti-PD-1 antibody comprises nivolumab. In some embodiments, the anti-PD-1 antibody comprises pembrolizumab. In some embodiments, the anti-PD-L1 antibody comprises atezolizumab. In some embodiments, the anti-PD-L1 antibody comprises durvalumab. In some embodiments, the anti-PD-L1 antibody comprises avelumab. In some embodiments, the anti-CTLA-4 antibody comprises ipilimumab. In some embodiments, the anti-CTLA-4 antibody comprises tremelimumab.

In some embodiments, the (a) anti-PD-1 antibody or the anti-PD-L1 antibody and the (b) anti-CTLA-4 antibody are each administered once about every 2 weeks, once about every 3 weeks, once about every 4 weeks, once about every 5 weeks, or once about every 6 weeks. In some embodiments, the (a) anti-PD-1 antibody or the anti-PD-L1 antibody and the (b) anti-CTLA-4 antibody are each administered once about every 7 weeks, once about every 8 weeks, once about every 9 weeks, once about every 10 weeks, once about every 11 weeks, or once about every 12 weeks. In some embodiments, the anti-PD-1 antibody or the anti-PD-L1 antibody is administered once about every 2 weeks, once about every 3 weeks, or once about every 4 weeks, and the anti-CTLA-4 antibody is administered once about every 6 weeks. In some embodiments, the anti-PD-1 antibody or the anti-PD-L1 antibody is administered once about every 2 weeks, once about every 3 weeks, or once about every 4 weeks, and the anti-CTLA-4 antibody is administered once about every 12 weeks. In some embodiments, the anti-PD-1 antibody or anti-PD-L1 antibody is administered on the same day as the anti-CTLA-4 antibody. In some embodiments, the anti-PD-1 antibody or the anti-PD-L1 antibody is administered on a different day than the anti-CTLA-4 antibody.

In certain embodiments, the anti-PD-1 antibody is administered at a dose of about 2 mg/kg once about every 2 weeks and the anti-CTLA-4 antibody is administered at a dose of about 1 mg/kg once about every 6 weeks. In some embodiments, the anti-PD-1 antibody is administered at a dose of about 2 mg/kg once about every 3 weeks and the anti-CTLA-4 antibody is administered at a dose of about 1 mg/kg once about every 6 weeks. In some embodiments, the anti-PD-1 antibody is administered at a dose of about 3 mg/kg once about every 3 weeks and the anti-CTLA-4 antibody is administered at a dose of about 1 mg/kg once about every 6 weeks. In some embodiments, the anti-PD-1 antibody is administered at a dose of about 4 mg/kg once about every 3 weeks and the anti-CTLA-4 antibody is administered at a dose of about 1 mg/kg once about every 6 weeks. In some embodiments, the anti-PD-1 antibody is administered at a dose of about 5 mg/kg once about every 3 weeks and the anti-CTLA-4 antibody is administered at a dose of about 1 mg/kg once about every 6 weeks. In some embodiments, the anti-PD-1 antibody is administered at a dose of about 10 mg/kg once about every 3 weeks and the anti-CTLA-4 antibody is administered at a dose of about 1 mg/kg once about every 6 weeks. In some embodiments, the anti-PD-1 antibody is administered at a dose of about 6 mg/kg once about every 4 weeks and the anti-CTLA-4 antibody is administered at a dose of about 1 mg/kg once about every 6 weeks.

In certain embodiments, the anti-PD-1 antibody is administered at a flat dose of about 200 mg once about every 3 weeks and the anti-CTLA-4 antibody is administered at a dose of about 1 mg/kg once about every 6 weeks. In some embodiments, the anti-PD-1 antibody is administered at a flat dose of about 200 mg once about every 2 weeks and the anti-CTLA-4 antibody is administered at a dose of about 1 mg/kg once about every 6 weeks. In some embodiments, the anti-PD-1 antibody is administered at a flat dose of about 240 mg once about every 2 weeks and the anti-CTLA-4 antibody is administered at a dose of about 1 mg/kg once about every 6 weeks. In some embodiments, the anti-PD-1 antibody is administered at a flat dose of about 300 mg once about every 3 weeks and the anti-CTLA-4 antibody is administered at a dose of about 1 mg/kg once about every 6 weeks. In some embodiments, the anti-PD-1 antibody is administered at a flat dose of about 300 mg once about every 4 weeks and the anti-CTLA-4 antibody is administered at a dose of about 1 mg/kg once about every 6 weeks. In some embodiments, the anti-PD-1 antibody is administered at a flat dose of about 360 mg once about every 2 weeks and the anti-CTLA-4 antibody is administered at a dose of about 1 mg/kg once about every 6 weeks. In some embodiments, the anti-PD-1 antibody is administered at a flat dose of about 400 mg once about every 4 weeks and the anti-CTLA-4 antibody is administered at a dose of about 1 mg/kg once about every 6 weeks. In some embodiments, the anti-PD-1 antibody is administered at a flat dose of about 400 mg once about every 6 weeks and the anti-CTLA-4 antibody is administered at a dose of about 1 mg/kg once about every 6 weeks. In some embodiments, the anti-PD-1 antibody is administered at a flat dose of about 400 mg once about every 8 weeks and the anti-CTLA-4 antibody is administered at a dose of about 1 mg/kg once about every 6 weeks. In some embodiments, the anti-PD-1 antibody is administered at a flat dose of about 480 mg once about every 4 weeks and the anti-CTLA-4 antibody is administered at a dose of about 1 mg/kg once about every 6 weeks. In some embodiments, the anti-PD-1 antibody is administered at a flat dose of about 480 mg once about every 6 weeks and the anti-CTLA-4 antibody is administered at a dose of about 1 mg/kg once about every 6 weeks.

In certain embodiments, the anti-PD-1 antibody is administered at a flat dose of about 200 mg once about every 3 weeks and the anti-CTLA-4 antibody is administered at a flat dose of about 80 mg once about every 6 weeks. In some embodiments, the anti-PD-1 antibody is administered at a flat dose of about 200 mg once about every 2 weeks and the anti-CTLA-4 antibody is administered at a flat dose of about 80 mg once about every 6 weeks. In some embodiments, the anti-PD-1 antibody is administered at a flat dose of about 240 mg once about every 2 weeks and the anti-CTLA-4 antibody is administered at a flat dose of about 80 mg once about every 6 weeks. In some embodiments, the anti-PD-1 antibody is administered at a flat dose of about 300 mg once about every 3 weeks and the anti-CTLA-4 antibody is administered at a flat dose of about 80 mg once about every 6 weeks. In some embodiments, the anti-PD-1 antibody is administered at a flat dose of about 300 mg once about every 4 weeks and the anti-CTLA-4 antibody is administered at a flat dose of about 80 mg once about every 6 weeks. In some embodiments, the anti-PD-1 antibody is administered at a flat dose of about 360 mg once about every 2 weeks and the anti-CTLA-4 antibody is administered at a flat dose of about 80 mg once about every 6 weeks. In some embodiments, the anti-PD-1 antibody is administered at a flat dose of about 400 mg once about every 4 weeks and the anti-CTLA-4 antibody is administered at a flat dose of about 80 mg once about every 6 weeks. In some embodiments, the anti-PD-1 antibody is administered at a flat dose of about 400 mg once about every 6 weeks and the anti-CTLA-4 antibody is administered at a flat dose of about 80 mg once about every 6 weeks. In some embodiments, the anti-PD-1 antibody is administered at a flat dose of about 400 mg once about every 8 weeks and the anti-CTLA-4 antibody is administered at a flat dose of about 80 mg once about every 6 weeks. In some embodiments, the anti-PD-1 antibody is administered at a flat dose of about 480 mg once about every 4 weeks and the anti-CTLA-4 antibody is administered at a flat dose of about 80 mg once about every 6 weeks. In some embodiments, the anti-PD-1 antibody is administered at a flat dose of about 480 mg once about every 6 weeks and the anti-CTLA-4 antibody is administered at a flat dose of about 80 mg once about every 6 weeks.

In some embodiments, the anti-PD-L1 antibody is administered at a dose of about 2 mg/kg once about every 2 weeks and the anti-CTLA-4 antibody is administered at a dose of about 1 mg/kg once about every 6 weeks. In some embodiments, the anti-PD-L1 antibody is administered at a dose of about 3 mg/kg once about every 2 weeks and the anti-CTLA-4 antibody is administered at a dose of about 1 mg/kg once about every 6 weeks. In some embodiments, the anti-PD-L1 antibody is administered at a dose of about 4 mg/kg once about every 2 weeks and the anti-CTLA-4 antibody is administered at a dose of about 1 mg/kg once about every 6 weeks. In some embodiments, the anti-PD-L1 antibody is administered at a dose of about 5 mg/kg once about every 2 weeks and the anti-CTLA-4 antibody is administered at a dose of about 1 mg/kg once about every 6 weeks. In some embodiments, the anti-PD-L1 antibody is administered at a dose of about 6 mg/kg once about every 2 weeks and the anti-CTLA-4 antibody is administered at a dose of about 1 mg/kg once about every 6 weeks. In some embodiments, the anti-PD-L1 antibody is administered at a dose of about 7 mg/kg once about every 2 weeks and the anti-CTLA-4 antibody is administered at a dose of about 1 mg/kg once about every 6 weeks. In some embodiments, the anti-PD-L1 antibody is administered at a dose of about 8 mg/kg once about every 2 weeks and the anti-CTLA-4 antibody is administered at a dose of about 1 mg/kg once about every 6 weeks. In some embodiments, the anti-PD-L1 antibody is administered at a dose of about 9 mg/kg once about every 2 weeks and the anti-CTLA-4 antibody is administered at a dose of about 1 mg/kg once about every 6 weeks. In some embodiments, the anti-PD-L1 antibody is administered at a dose of about 10 mg/kg once about every 2 weeks and the anti-CTLA-4 antibody is administered at a dose of about 1 mg/kg once about every 6 weeks. In some embodiments, the anti-PD-L1 antibody is administered at a dose of about 10 mg/kg once about every 3 weeks and the anti-CTLA-4 antibody is administered at a dose of about 1 mg/kg once about every 6 weeks. In some embodiments, the anti-PD-L1 antibody is administered at a dose of about 15 mg/kg once about every 3 weeks and the anti-CTLA-4 antibody is administered at a dose of about 1 mg/kg once about every 6 weeks. In some embodiments, the anti-PD-L1 antibody is administered at a dose of about 15 mg/kg once about every 3 weeks and the anti-CTLA-4 antibody is administered at a dose of about 1 mg/kg once about every 12 weeks.

In certain embodiments, the anti-PD-L1 antibody is administered at a flat dose of about 800 mg once about every 2 weeks and the anti-CTLA-4 antibody is administered at a dose of about 1 mg/kg once about every 6 weeks. In some embodiments, the anti-PD-L1 antibody is administered at a flat dose of about 1000 mg once about every 3 weeks and the anti-CTLA-4 antibody is administered at a dose of about 1 mg/kg once about every 6 weeks. In some embodiments, the anti-PD-L1 antibody is administered at a flat dose of about 1100 mg once about every 3 weeks and the anti-CTLA-4 antibody is administered at a dose of about 1 mg/kg once about every 6 weeks. In some embodiments, the anti-PD-L1 antibody is administered at a flat dose of about 1200 mg once about every 3 weeks and the anti-CTLA-4 antibody is administered at a dose of about 1 mg/kg once about every 6 weeks. In some embodiments, the anti-PD-L1 antibody is administered at a flat dose of about 1500 mg once about every 3 weeks and the anti-CTLA-4 antibody is administered at a dose of about 1 mg/kg once about every 6 weeks.

In certain embodiments, the anti-PD-L1 antibody is administered at a flat dose of about 800 mg once about every 2 weeks and the anti-CTLA-4 antibody is administered at a flat dose of about 80 mg once about every 6 weeks. In some embodiments, the anti-PD-L1 antibody is administered at a flat dose of about 1000 mg once about every 3 weeks and the anti-CTLA-4 antibody is administered at a flat dose of about 80 mg once about every 6 weeks. In some embodiments, the anti-PD-L1 antibody is administered at a flat dose of about 1100 mg once about every 3 weeks and the anti-CTLA-4 antibody is administered at a flat dose of about 80 mg once about every 6 weeks. In some embodiments, the anti-PD-L1 antibody is administered at a flat dose of about 1200 mg once about every 3 weeks and the anti-CTLA-4 antibody is administered at a flat dose of about 80 mg once about every 6 weeks. In some embodiments, the anti-PD-L1 antibody is administered at a flat dose of about 1500 mg once about every 3 weeks and the anti-CTLA-4 antibody is administered at a flat dose of about 80 mg once about every 6 weeks.

Tumor Mutational Burdon

As a tumor grows, it accumulates somatic mutations not present in germline DNA. TMB refers to the number of somatic mutations in a tumor's genome and/or the number of somatic mutations per area of the tumor genome (after taking into account germline variant DNA). The acquisition of somatic mutations and, thus, a higher TMB can be influenced by distinct mechanisms, such as exogenous mutagen exposure (e.g., tobacco smoking) and DNA mismatch repair mutations (e.g., MSI in colorectal and esophageal cancers). In solid tumors, about 95% of mutations are single-base substitutions. (Vogelstein et al., Science (2013) 339:1546-1558.) A "nonsynonymous mutation" herein refers to a nucleotide mutation that alters the amino acid sequence of a protein. Missense mutations and nonsense mutations can be both nonsynonymous mutations. A "missense mutation" herein refers to a nonsynonymous point mutation in which a single nucleotide change results in a codon that codes for a different amino acid. A "nonsense mutation" herein refers to a nonsynonymous point mutation in which a codon is changed to a premature stop codon that leads to truncation of the resulting protein.

In one embodiment, somatic mutations can be expressed at the RNA and/or protein level, resulting in neoantigens (also referred to as neoepitopes). Neoantigens can influence an immune-mediated anti-tumor response. For example, neoantigen recognition can promote T-cell activation, clonal expansion, and differentiation into effector and memory T-cells.

As a tumor develops, early clonal mutations (or "trunk mutations") can be carried by most or all tumor cells, while late mutations (or "branch mutations") can occur in only a subset of tumor cells or regions. (Yap et al., Sci Tranl Med (2012) 4:1-5; Jamai-Hanjani et al., (2015) Clin Cancer Res 21:1258-1266.) As a result, neoantigens derived from clonal "trunk" mutations are more widespread in the tumor genome than "branch" mutations and, thus, can lead to a high number of T cells reactive against the clonal neoantigen. (McGranahan et al., (2016) 351:1463-1469.) Generally, tumors with a high TMB can also have a high neoantigen load, which can lead to high tumor immunogenicity and increased T-cell reactivity and anti-tumor response. As such, cancers with a high TMB can respond well to treatment with immunotherapies, e.g., an anti-PD-1 antibody or anti-PD-L1 antibody. See, e.g., International Publication No. WO/2018/183928 A1, which is incorporated by reference herein in its entirety.

Advances in sequencing technologies allow for evaluation of the tumor's genomic mutation landscape. Any sequencing methods known to those of skill in the art can be used to sequence nucleic acids from the tumor genome (e.g., obtained from a biological sample from a subject afflicted with a tumor). In one embodiment, PCR or qPCR methods, Sanger sequencing methods, or next-generation sequencing ("NGS") methods (such as genomic profiling, exome sequencing, or genome sequencing) can be used to measure TMB. In some embodiments, the TMB status is measured using genomic profiling. Genomic profiling involves analyzing nucleic acids from tumor samples, including coding and non-coding regions, and can be performed using methods having integrated optimized nucleic acid selection, read alignment, and mutation calling. In some embodiments, gene profiling provides next generation sequencing (NGS)-based analysis of tumors that can be optimized on a cancer-by-cancer, gene-by-gene, and/or site-by-site basis. Genome profiling can integrate the use of multiple, individually tuned, alignment methods or algorithms to optimize performance in sequencing methods, particularly in methods that rely on massively parallel sequencing of a large number of diverse genetic events in a large number of diverse genes. Genomic profiling provides for a comprehensive analysis of a subject's cancer genome, with clinical grade quality, and the output of the genetic analysis can be contextualized with relevant scientific and medical knowledge to increase the quality and efficiency of cancer therapy.

Genomic profiling involves a panel of a predefined set of genes comprising as few as five genes or as many as 1000 genes, about 25 genes to about 750 genes, about 100 genes to about 800 genes, about 150 genes to about 500 genes, about 200 genes to about 400 genes, about 250 genes to about 350 genes. In one embodiment, the genomic profile comprises at least 300 genes, at least 305 genes, at least 310 genes, at least 315 genes, at least 320 genes, at least 325 genes, at least 330 genes, at least 335 genes, at least 340 genes, at least 345 genes, at least 350 genes, at least 355 genes, at least 360 genes, at least 365 genes, at least 370 genes, at least 375 genes, at least 380 genes, at least 385 genes, at least 390 genes, at least 395 genes, or at least 400 genes. In another embodiment, the genomic profile comprises at least 325 genes. In a particular embodiment, the genomic profile comprises at least 315 cancer-related genes and introns in 28 genes (FOUNDATIONONE®) or the complete DNA coding sequence of 406 genes, introns in 31 genes with rearrangements, and the RNA sequence (cDNA) of 265 genes (FOUNDATIONONE® Heme). In another embodiment, the genomic profile comprises 26 genes and 1000 associated mutations (EXODX® Solid Tumor). In yet another embodiment, the genomic profile comprises 76 genes (Guardant360). In yet another embodiment, the genomic profile comprises 73 genes (Guardant360). In another embodiment, the genomic profile comprises 354 genes and introns in 28 genes for rearrangements (FOUNDATIONONE® CDX™). In certain embodiments, the genomic profile is FOUNDATIONONE® F1CDx. In another embodiment, the genomic profile comprises 468 genes (MSK-IMPACT™) One or more genes can be added to the genome profile as more genes are identified to be related to oncology.

FOUNDATIONONE® Assay

The FOUNDATIONONE® assay is comprehensive genomic profiling assay for solid tumors, including but not limited to solid tumors of the lung, colon, and breast, melanoma, and ovarian cancer. The FOUNDATIONONE® assay uses a hybrid-capture, next-generation sequencing test to identify genomic alterations (base substitutions, insertions and deletions, copy number alterations, and rearrangements) and select genomic signatures (e.g., TMB and microsatellite instability). The assay covers 322 unique genes, including the entire coding region of 315 cancer-related genes, and selected introns from 28 genes. The full list of FOUNDATIONONE® assay genes is provided in Tables 1A and 1B. See FOUNDATIONONE: Technical Specifications, Foundation Medicine, Inc., available at FoundationMedicine.com, last visited Mar. 16, 2018, which is incorporated by reference herein in its entirety.

TABLE 1A

List of genes wherein entire coding sequences are assayed in the FOUNDATIONONE ® assay.

| | | | | | | | | | |
|---|---|---|---|---|---|---|---|---|---|
| ABL1 | BRAF | CHEK1 | FANCC | GATA3 | JAK2 | MITF | PDCD1LG2 (PD-L2) | RBM10 | STAT4 |
| ABL2 | BRCA1 | CHEK2 | FANCD2 | GATA4 | JAK3 | MLH1 | PDGFRA | RET | STK11 |
| ACVR1B | BRCA2 | CIC | FANCE | GATA6 | JUN | MPL | PDGFRB | RICTOR | SUFU |
| AKT1 | BRD4 | CREBBP | FANCF | GID4 (C17orf39) | KAT6A (MYST3) | MRE11A | PDK1 | RNF43 | SYK |
| AKT2 | BRIP1 | CRKL | FANCG | GLI1 | KDM5A | MSH2 | PIK3C2B | ROS1 | TAF1 |
| AKT3 | BTG1 | CRLF2 | FANCL | GNA11 | KDM5C | MSH6 | PIK3CA | RPTOR | TBX3 |
| ALK | BTK | CSF1R | FAS | GNA13 | KDM6A | MTOR | PIK3CB | RUNX1 | TERC |
| AMER1 (FAM123B) | C11orf30 (EMSY) | CTCF | FAT1 | GNAQ | KDR | MUTYH | PIK3CG | RUNX1T1 | TERT (Promoter only) |
| APC | CARD11 | CTNNA1 | FBXW7 | GNAS | KEAP1 | MYC | PIK3R1 | SDHA | TET2 |
| AR | CBFB | CTNNB1 | FGF10 | GPR124 | KEL | MYCL (MYCL1) | PIK3R2 | SDHB | TGFBR2 |
| ARAF | CBL | CUL3 | FGF14 | GRIN2A | KIT | MYCN | PLCG2 | SDHC | TNFAIP3 |
| ARFRP1 | CCND1 | CYLD | FGF19 | GRM3 | KLHL6 | MYD88 | PMS2 | SDHD | TNFRSF14 |
| ARID1A | CCND2 | DAXX | FGF23 | GSK3B | KMT2A (MLL) | NF1 | POLD1 | SETD2 | TOP1 |
| ARID1B | CCND3 | DDR2 | FGF3 | H3F3A | KMT2C (MLL3) | NF2 | POLE | SF3B1 | TOP2A |
| ARID2 | CCNE1 | DICER1 | FGF4 | HGF | KMT2D (MLL2) | NFE2L2 | PPP2R1A | SLIT2 | TP53 |
| ASXL1 | CD274 (PD-L1) | DNMT3A | FGF6 | HNF1A | KRAS | NFKBIA | PRDM1 | SMAD2 | TSC1 |
| ATM | CD79A | DOT1L | FGFR1 | HRAS | LMO1 | NKX2-1 | PREX2 | SMAD3 | TSC2 |
| ATR | CD79B | EGFR | FGFR2 | HSD3B1 | LRP1B | NOTCH1 | PRKAR1A | SMAD4 | TSHR |
| ATRX | CDC73 | EP300 | FGFR3 | HSP90AA1 | LYN | NOTCH2 | PRKCI | SMARCA4 | U2AF1 |
| AURKA | CDH1 | EPHA3 | FGFR4 | IDH1 | LZTR1 | NOTCH3 | PRKDC | SMARCB1 | VEGFA |
| AURKB | CDK12 | EPHA5 | FH | IDH2 | MAGI2 | NPM1 | PRSS8 | SMO | VHL |
| AXIN1 | CDK4 | EPHA7 | FLCN | IGF1R | MAP2K1 (MEK1) | NRAS | PTCH1 | SNCAIP | WISP3 |

TABLE 1A-continued

List of genes wherein entire coding sequences are assayed in the FOUNDATIONONE ® assay.

| AXL | CDK6 | EPHB1 | FLT1 | IGF2 | MAP2K2 (MEK2) | NSD1 | PTEN | SOCS1 | WT1 |
|---|---|---|---|---|---|---|---|---|---|
| BAP1 | CDK8 | ERBB2 | FLT3 | IKBKE | MAP2K4 | NTRK1 | PTPN11 | SOX10 | XPO1 |
| BARD1 | CDKN1A | ERBB3 | FLT4 | IKZF1 | MAP3K1 | NTRK2 | QKI | SOX2 | ZBTB2 |
| BCL2 | CDKN1B | ERBB4 | FOXL2 | IL7R | MCL1 | NTRK3 | RAC1 | SOX9 | ZNF217 |
| BCL2L1 | CDKN2A | ERG | FOXP1 | INHBA | MDM2 | NUP93 | RAD50 | SPEN | ZNF703 |
| BCL2L2 | CDKN2B | ERRFl1 | FRS2 | INPP4B | MDM4 | PAK3 | RAD51 | SPOP | |
| BCL6 | CDKN2C | ESR1 | FUBP1 | IRF2 | MED12 | PALB2 | RAF1 | SPTA1 | |
| BCOR | CEBPA | EZH2 | GABRA6 | IRF4 | MEF2B | PARK2 | RANBP2 | SRC | |
| BCORL1 | CHD2 | FAM46C | GATA1 | IRS2 | MEN1 | PAX5 | RARA | STAG2 | |
| BLM | CHD4 | FANCA | GATA2 | JAK1 | MET | PBRM1 | RB1 | STAT3 | |

TABLE 1B

List of genes wherein selected introns are assayed in the FOUNDATIONONE ® assay.

| ALK | BRCA1 | ETV1 | FGFR1 | MSH2 | NTRK1 | RARA |
|---|---|---|---|---|---|---|
| BCL2 | BRCA2 | ETV4 | FGFR2 | MYB | NTRK2 | RET |
| BCR | BRD4 | ETV5 | FGFR3 | MYC | PDGFRA | ROS1 |
| BRAF | EGFR | ETV6 | KIT | NOTCH2 | RAF1 | TMPRSS2 |

EXODX® Solid Tumor Assay

In one embodiment, TMB is measured using the EXODX® Solid Tumor assay. The EXODX® Solid Tumor assay is an exoRNA- and cfDNA-based assay, which detects actionable mutations in cancer pathways. The EXODX® Solid Tumor assay is a plasma-based assay that does not require a tissue sample. The EXODX® Solid Tumor assay covers 26 genes and 1000 mutations. The specific genes covered by the EXODX® Solid Tumor assay are shown in Table 2. See Plasma-Based Solid Tumor Mutation Panel Liquid Biopsy, Exosome Diagnostics, Inc., available at exosomedx.com, last accessed on Mar. 16, 2018.

TABLE 2

Genes covered by the EXODX ® Solid Tumor assay.

| BRAF | MEK1 | KIT | ROS1 | ALK | PTEN | TP53 | FGFR3 | TSC2 |
|---|---|---|---|---|---|---|---|---|
| NRAS | KRAS | PDGFRA | RET | AKT1 | DH2 | NOTCH1 | NTRK1 | CDKN2A |
| PIK3CA | EGFR | EML4-ALK | HER-2/NEU; ERBB2 | ARv7 | mTOR | Hedgehog | TSC1 | |

FOUNDATIONONE® Liquid Assay

In one embodiment, TMB is measured using the FOUNDATIONONE® Liquid assay. The FOUNDATIONONE® Liquid assay is cfDNA-based assay, which detects circulating tumor DNA (ctDNA). The assay is a plasma-based assay that does not require a solid tissue sample. The FOUNDATIONONE® Liquid assay covers 70 genes. The specific genes covered by the FOUNDATIONONE® Liquid assay are shown in Tables 3A-3C. See FOUNDATIONONE® Liquid, Technical Specifications, Foundation Medicine, available at assets.ctfassets.net/vhribv121mne/3SPY-AcbGdqAeMsOqMyKUog/d0eb51659e08d733bf39971e85e d940d/F1L_TechnicalInformation_MKT-0061-04.pdf, last accessed on Oct. 6, 2018.

TABLE 3A

Genes covered by the FOUNDATIONONE ® Liquid Assay: Entire Coding Sequence.

| APC | CCND1 | CDK12 | ERBB2 | KRAS | NF1 | RB1 |
|---|---|---|---|---|---|---|
| AR | CD274 (PD-L1) | CDKN2A | ERRFI1 | MDM2 | PALB2 | SMO |
| ATM | CDH1 | CHEK2 | FGFR1 | MET | PDCD1LG2 (PD-L2) | STK11 |
| BRCA1 | CDK4 | CRKL | FGFR2 | MYC | PTEN | TP53 |
| BRCA2 | CDK6 | EGFR | FOXL2 | MYCN | PTPN11 | VEGFA |

TABLE 3B

Genes covered by the FOUNDATIONONE ® Liquid Assay: Select Exons.

| ABL1 | BTK | FGFR3 | HRAS | KIT | MYD88 | PIK3CA |
|---|---|---|---|---|---|---|
| AKT1 | CTNNB1 | FLT3 | IDH1 | MAP2K1 (MEK1) | NPM1 | RAF1 |

TABLE 3B-continued

Genes covered by the FOUNDATIONONE ® Liquid Assay: Select Exons.

| | | | | | | |
|---|---|---|---|---|---|---|
| ALK | DDR2 | GNA11 | IDH2 | MAP2K2 (MEK2) | NRAS | RET |
| ARAF | ESR1 | GNAQ | JAK2 | MPL | PDGFRA | ROS1 |
| BRAF | EZH2 | GNAS | JAK3 | MTOR | PDGFRB | TERT |

TABLE 3C

Genes covered by the FOUNDATIONONE ® Liquid Assay: Select Rearrangements.

| | | | | | | |
|---|---|---|---|---|---|---|
| ALK | EGFR | FGFR2 | FGFR3 | PDGFRA | RET | ROS1 |

Guardant360 Assay

In some embodiments, TMB status is determined using the Guardant360 assay. The Guardant360 assay measures mutations in at least 73 genes (Table 4A), 23 indels (Table 4B), 18 CNVs (Table 4C), and 6 fusion genes (Table 4D). See GuardantHealth.com, last accessed on Mar. 16, 2018. In some embodiments, TMB status is determined using the GUARDANTOMNI™ assay. The GUARDANTOMNI™ assay is a comprehensive genomic profiling tool, comprising a 500-gene panel.

TABLE 4A

Guardant360 assay genes.

| | | | | | | |
|---|---|---|---|---|---|---|
| AKT1 | CCND2 | EZH2 | IDH1 | MLH1 | PDGFRA | SMAD4 |
| ALK | CCNE1 | FBXW7 | IDH2 | MPL | PIK3CA | SMO |
| APC | CDH1 | FGFR1 | JAK2 | MTOR | PTEN | STK11 |
| AR | CDK4 | FGFR2 | JAK3 | MYC | PTPN11 | TERT (including promoter) |
| ARAF | CDK6 | FGFR3 | KIT | NF1 | RAF1 | TP53 |
| ARID1A | CDKN2A | GATA3 | KRAS | NFE2L2 | RB1 | TSC1 |
| ATM | CTNNB1 | GNA11 | MAP2K1 | NOTCH1 | RET | VHL |
| BRAF | DDR2 | GNAQ | MAP2K2 | NPM1 | RHEB | |
| BRCA1 | EGFR | GNAS | MAPK1 | NRAS | RHOA | |
| BRCA2 | ERBB2 | HNF1A | MAPK3 | NTRK1 | RIT1 | |
| CCND1 | ESR1 | HRAS | MET | NTRK3 | ROS1 | |

TABLE 4B

Guardant360 assay indels.

| | | | | | | | |
|---|---|---|---|---|---|---|---|
| APC | BRCA1 | CDKN2A | GATA3 | MLH1 | PDGFRA | SMAD4 | TSC1 |
| ARID1A | BRCA2 | EGFR | KIT | MTOR | PTEN | STK11 | VHL |
| ATM | CDH1 | ERBB2 | MET | NF1 | RB1 | TP53 | |

TABLE 4C

Guardant360 assay amplifications (CNVs).

| | | | | | |
|---|---|---|---|---|---|
| AR | CCND2 | CDK6 | FGFR1 | KRAS | PDGFRA |
| BRAF | CCNE1 | EGFR | FGFR2 | MET | PIK3CA |
| CCND1 | CDK4 | ERBB2 | KIT | MYC | RAF1 |

TABLE 4D

Guardant360 assay fusions.

| | | |
|---|---|---|
| ALK | FGFR3 | RET |
| FGFR2 | NTRK1 | ROS1 |

ILLUMINA® TruSight Assay

In some embodiments, TMB is determined using the TruSight Tumor 170 assay (ILLUMINA). The TruSight Tumor 170 assay is a next-generation sequencing assay that covers 170 genes associated with common solid tumors, which simultaneously analyzes DNA and RNA. The TruSight Tumor 170 assay assesses fusions, splice variants, insertions/deletions, single nucleotide variants (SNVs), and amplifications. The TruSight Tumor 170 assay gene lists are shown in Tables 5A-5C.

TABLE 5A

TruSight Tumor 170 assay genes (amplifications).

| | | | | | |
|---|---|---|---|---|---|
| AKT2 | CDK4 | FGF1 | FGF7 | LAMP1 | PDGFRB |
| ALK | CDK6 | FGF10 | FGF8 | MDM2 | PIK3CA |

TABLE 5A-continued

TruSight Tumor 170 assay genes (amplifications).

| | | | | | |
|---|---|---|---|---|---|
| AR | CHEK1 | FGF14 | FGF9 | MDM4 | PIK3CB |
| ATM | CHEK2 | FGF19 | FGFR1 | MET | PTEN |
| BRAF | EGFR | FGF2 | FGFR2 | MYC | RAF1 |
| BRCA1 | ERBB2 | FGF23 | FGFR3 | MYCL1 | RET |
| BRCA2 | ERBB3 | FGF3 | FGFR4 | MYCN | RICTOR |
| CCND1 | ERCC1 | FGF4 | JAK2 | NRAS | RPS6KB1 |
| CCND3 | ERCC2 | FGF5 | KIT | NRG1 | TFRC |
| CCNE1 | ESR1 | FGF6 | KRAS | PDGFRA | |

TABLE 5B

TruSight Tumor 170 assay genes (fusions).

| | | | | | | | |
|---|---|---|---|---|---|---|---|
| ABL1 | BRCA1 | ERG | FGFR1 | JAK2 | MSH2 | NTRK2 | PPARG |
| AKT3 | BRCA2 | ESR1 | FGFR2 | KDR | MYC | NTRK3 | RAF1 |
| ALK | CDK4 | ETS1 | FGFR3 | KIF5B | NOTCH1 | PAX3 | RET |
| AR | CSF1R | ETV1 | FGFR4 | KIT | NOTCH2 | PAX7 | ROS1 |
| AXL | EGFR | ETV4 | FLI1 | KMT2A (MLL) | NOTCH3 | PDGFRA | RPS6KB1 |
| BCL2 | EML4 | ETV5 | FLT1 | MET | NRG1 | PDGFRB | TMPRSS2 |
| BRAF | ERBB2 | EWSR1 | FLT3 | MLLT3 | NTRK1 | PIK3CA | |

TABLE 5C

TruSight Tumor 170 assay genes (small variants).

| | | | | | | | | | |
|---|---|---|---|---|---|---|---|---|---|
| AKT1 | BRCA2 | CHEK1 | ESR1 | FGF7 | HRAS | MET | NF1 | PMS2 | SLX4 |
| AKT2 | BRIP1 | CHEK2 | EZH2 | FGF8 | IDH1 | MLH1 | NOTCH1 | PPP2R2A | SMAD4 |
| AKT3 | BTK | CREBBP | FAM175A | FGF9 | IDH2 | MLLT3 | NOTCH2 | PTCH1 | SMARCB1 |
| ALK | CARD11 | CSF1R | FANCI | FGFR1 | INPP4B | MPL | NOTCH3 | PTEN | SMO |
| APC | CCND1 | CTNNB1 | FANCL | FGFR2 | JAK2 | MRE11A | NPM1 | PTPN11 | SRC |
| AR | CCND2 | DDR2 | FBXW7 | FGFR3 | JAK3 | MSH2 | NRAS | RAD51 | STK11 |
| ARID1A | CCNE1 | DNMT3A | FGF1 | FGFR4 | KDR | MSH3 | NRG1 | RAD51B | TERT |
| ATM | CD79A | EGFR | FGF10 | FLT1 | KIT | MSH6 | PALB2 | RAD51C | TET2 |
| ATR | CD79B | EP300 | FGF14 | FLT3 | KMT2A (MLL) | MTOR | PDGFRA | RAD51D | TP53 |
| BAP1 | CDH1 | ERBB2 | FGF2 | FOXL2 | KRAS | MUTYH | PDGFRB | RAD54L | TSC1 |
| BARD1 | CDK12 | ERBB3 | FGF23 | GEN1 | MAP2K1 | MYC | PIK3CA | RB1 | TSC2 |
| BCL2 | CDK4 | ERBB4 | FGF3 | GNA11 | MAP2K2 | MYCL1 | PIK3CB | RET | VHL |
| BCL6 | CDK6 | ERCC1 | FGF4 | GNAQ | MCL1 | MYCN | PIK3CD | RICTOR | XRCC2 |
| BRAF | CDKN2A | ERCC2 | FGF5 | GNAS | MDM2 | MYD88 | PIK3CG | ROS1 | |
| BRCA1 | CEBPA | ERG | FGF6 | HNF1A | MDM4 | NBN | PIK3R1 | RPS6KB1 | |

FOUNDATIONONE® F1CDx Assay

FOUNDATIONONE® CDX™ ("F1CDx") is a next generation sequencing based in vitro diagnostic device for detection of substitutions, insertion and deletion alterations (indels), and copy number alterations (CNAs) in 324 genes and select gene rearrangements, as well as genomic signatures including microsatellite instability (MSI) and tumor mutation burden (TMB) using DNA isolated from formalin-fixed paraffin embedded (FFPE) tumor tissue specimens. F1CDx is approved by the United States Food and Drug Administration (FDA) for several tumor indications, including NSCLC, melanoma, breast cancer, colorectal cancer, and ovarian cancer.

The F1CDx assay employs a single DNA extraction method from routine FFPE biopsy or surgical resection specimens, 50-1000 ng of which will undergo whole-genome shotgun library construction and hybridization-based capture of all coding exons from 309 cancer-related genes, one promoter region, one non-coding (ncRNA), and selected intronic regions from 34 commonly rearranged genes, 21 of which also include the coding exons. Tables 6A and 6B provide the complete list of genes included in F1CDx. In total, the assay detects alterations in a total of 324 genes. Using the ILLUMINA® HiSeq 4000 platform, hybrid capture-selected libraries are sequenced to high uniform depth (targeting >500× median coverage with >9900 of exons at coverage >100×). Sequence data is then processed using a customized analysis pipeline designed to detect all classes of genomic alterations, including base substitutions, indels, copy number alterations (amplifications and homozygous gene deletions), and selected genomic rearrangements (e.g., gene fusions). Additionally, genomic signatures including microsatellite instability (MSI) and tumor mutation burden (TMB) are reported.

TABLE 6A

Genes with full coding exonic regions included in FOUNDATIONONE ® CDX ™
for the detection of substitutions, insertions and deletions (indels), and copy number alterations (CNAs).

| | | | | | | | | | |
|---|---|---|---|---|---|---|---|---|---|
| ABL1 | BRCA2 | CDKN2C | ERCC4 | GATA3 | KDM5C | MRE11A | PARP2 | RAD51 | SOX9 |
| ACVR1B | BRD4 | CEBPA | ERG | GATA4 | KDM6A | MSH2 | PARP3 | RAD51B | SPEN |
| AKT1 | BRIP1 | CHEK1 | ERRFI1 | GATA6 | KDR | MSH3 | PAX5 | RAD51C | SPOP |
| AKT2 | BTG1 | CHEK2 | ESR1 | GID4 (C17orf39) | KEAP1 | MSH6 | PBRM1 | RAD51D | SRC |
| AKT3 | BTG2 | CIC | EZH2 | GNA11 | KEL | MST1R | PDCD1 | RAD52 | STAG2 |
| ALK | BTK | CREBBP | FAM46C | GNA13 | KIT | MTAP | PDCD1LG2 | RAD54L | STAT3 |
| ALOX12B | C11orf30 | CRKL | FANCA | GNAQ | KLHL6 | MTOR | PDGFRA | RAF1 | STK11 |
| AMER1 | CALR | CSF1R | FANCC | GNAS | KMT2A (MLL) | MUTYH | PDGFRB | RARA | SUFU |
| APC | CARD11 | CSF3R | FANCG | GRM3 | KMT2D (MLL2) | MYC | PDK1 | RB1 | SYK |
| AR | CASP8 | CTCF | FANCL | GSK3B | KRAS | MYCL | PIK3C2B | RBM10 | TBX3 |
| ARAF | CBFB | CTNNA1 | FAS | H3F3A | LTK | MYCN | PIK3C2G | REL | TEK |
| ARFRP1 | CBL | CTNNB1 | FBXW7 | HDAC1 | LYN | MYD88 | PIK3CA | RET | TET2 |
| ARLD1A | CCND1 | CUL3 | FGF10 | HGF | MAF | NBN | PIK3CB | RICTOR | TGFBR2 |
| ASXL1 | CCND2 | CUL4A | FGF12 | HNF1A | MAP2K1 | NF1 | PIK3R1 | RNF43 | TIPARP |
| ATM | CCND3 | CXCR4 | FGF14 | HRAS | MAP2K2 | NF2 | PIM1 | ROS1 | TNFAIP3 |
| ATR | CCNE1 | CYP17A1 | FGF19 | HSD3B1 | MAP2K4 | NFE2L2 | PMS2 | RPTOR | TNFRSF14 |
| ATRX | CD22 | DAXX | FGF23 | ID3 | MAP3K1 | NFKBIA | POLD1 | SDHA | TP53 |
| AURKA | CD274 | DDR1 | FGF3 | IDH1 | MAP3K13 | NKX2-1 | POLE | SDHB | TSC1 |
| AURKB | CD70 | DDR2 | FGF4 | IDH2 | MAPK1 | NOTCH1 | PPARG | SDHC | TSC2 |
| AXIN1 | CD79A | DIS3 | FGF6 | IGF1R | MCL1 | NOTCH2 | PPP2R1A | SDHD | TYRO3 |
| AXL | CD79B | DNMT3A | FGFR1 | IKBKE | MDM2 | NOTCH3 | PPP2R2A | SETD2 | U2AF1 |
| BAP1 | CDC73 | DOT1L | FGFR2 | IKZF1 | MDM4 | NPM1 | PRDM1 | SF3B1 | VEGFA |
| BARD1 | CDH1 | EED | FGFR3 | INPP4B | MED12 | NRAS | PRKAR1A | SGK1 | VHL |
| BCL2 | CDK12 | EGFR | FGFR4 | IRF2 | MEF2B | NT5C2 | PRKCI | SMAD2 | WHSC1 |
| BCL2L1 | CDK4 | EP300 | FH | IRF4 | MEN1 | NTRK1 | PTCH1 | SMAD4 | WHSC1L1 |
| BCL2L2 | CDK6 | EPHA3 | FLCN | IRS2 | MERTK | NTRK2 | PTEN | SMARCA4 | WT1 |
| BCL6 | CDK8 | EPHB1 | FLT1 | JAK1 | MET | NTRK3 | PTPN11 | SMARCB1 | XPO1 |
| BCOR | CDKN1A | EPHB4 | FLT3 | JAK2 | MITF | P2RY8 | PTPRO | SMO | XRCC2 |
| BCORL1 | CDKN1B | ERBB2 | FOXL2 | JAK3 | MKNK1 | PALB2 | QKI | SNCAIP | ZNF217 |
| BRAF | CDKN2A | ERBB3 | FUBP1 | JUN | MLH1 | PARK2 | RAC1 | SOCS1 | ZNF703 |
| BRCA1 | CDKN2B | ERBB4 | GABRA6 | KDM5A | MPL | PARP1 | RAD21 | SOX2 | |

TABLE 13B

Genes with selected intronic regions for the detection of gene rearrangements,
one with 3'UTR, one gene with a promoter region and one ncRNA gene.

| | | | | | | | | |
|---|---|---|---|---|---|---|---|---|
| ALK introns 18, 19 | BRCA1 introns 2, 7, 8, 12, 16, 19, 20 | ETV4 introns 5, 6 | EZR introns 9-11 | KIT intron 16 | MYC intron 1 | NUTM1 intron 1 | RET introns 7-11 | SLC34A2 intron 4 |
| BCL2 3'UTR | BRCA2 intron 2 | ETV5 introns 6, 7 | FGFR1 intron 1, 5, 17 | KMT2A (MLL) introns 6-11 | NOTCH2 intron 26 | PDGFRA introns 7, 9, 11 | ROS1 introns 31-35 | TERC ncRNA |
| BCR introns 8, 13, 14 | CD74 introns 6-8 | ETV6 introns 5, 6 | FGFR2 intron 1, 17 | MSH2 intron 5 | NTRK1 introns 8-10 | RAF1 introns 4-8 | RSPO2 intron 1 | TERT Promoter |
| BRAF introns 7-10 | EGFR introns 7, 15, 24-27 | EWSR1 introns 7-13 | FGFR3 intron 17 | MYB intron 14 | NTRK2 Intron 12 | RARA intron 2 | SDC4 intron 2 | TMPRSS2 introns 1-3 |

The F1CDx assay identifies various alterations in the gene and/or intron sequences, including substitutions, insertions/deletions, and CNAs. The F1CDx assay was previously identified as having concordance with an externally validated NGS assay and the FOUNDATIONONE® (F1 LDT) assay. See FOUNDATIONONE® CDX™: Technical Information, Foundation Medicine, Inc., available at FoundationMedicine.com, last visited Mar. 16, 2018, which is incorporated by reference herein in its entirety.

MSK-IMPACT™

In some embodiments, TMB status is assessed using the MSK-IMPACT™ assay. The MSK-IMPACT™ assay uses next-generation sequencing to analyze the mutation status of 468 genes. Target genes are captured and sequenced on an ILLUMINA HISEQ™ instrument. The MSK-IMPACT™ assay is approved by the US FDA for detection of somatic mutations and microsatellite instability in solid malignant neoplasms. The full list of 468 genes analyzed by the MSK-IMPACT™ assay is shown in Table 7. See Evaluation of Automatic Class III Designation for MSK-IMPACT (Integrated Mutation Profiling of Actionable Cancer Targets): Decision Summary, United States Food and Drug Administration, Nov. 15, 2017, available at accessdata.fda.gov.

TABLE 7

Genes analyzed by the MSK-IMPACT™ assay.

| | | | | | | | | | |
|---|---|---|---|---|---|---|---|---|---|
| ABL1 | CALR | DDR2 | FGF19 | HIST3H3 | LYN | NKX2-1 | PPARG | RPTOR | STK19 |
| ACVR1 | CARD11 | DICER1 | FGF3 | HLA-A | MALT1 | NKX3-1 | PPM1D | RRAGC | STK40 |
| AGO2 | CARM1 | DIS3 | FGF4 | HLA-B | MAP2K1 | NOTCH1 | PPP2R1A | RRAS | SUFU |
| AKT1 | CASP8 | DNAJB1 | FGFR1 | HNF1A | MAP2K2 | NOTCH2 | PPP4R2 | RRAS2 | SUZ12 |
| AKT2 | CBFB | DNMT1 | FGFR2 | HOXB13 | MAP2K4 | NOTCH3 | PPP6C | RTEL1 | SYK |
| AKT3 | CBL | DNMT3A | FGFR3 | HRAS | MAP3K1 | NOTCH4 | PRDM1 | RUNX1 | TAP1 |
| ALK | CCND1 | DNMT3B | FGFR4 | ICOSLG | MAP3K13 | NPM1 | PRDM14 | RXRA | TAP2 |
| ALOX12B | CCND2 | DOT1L | FH | ID3 | MAP3K14 | NRAS | PREX2 | RYBP | TBX3 |
| AMER1 | CCND3 | DROSHA | FLCN | IDH1 | MAPK1 | NSD1 | PRKAR1A | SDHA | TCEB1 |
| ANKRD11 | CCNE1 | DUSP4 | FLT1 | IDH2 | MAPK3 | NTHL1 | PRKCI | SDHAF2 | TCF3 |
| APC | CD274 | E2F3 | FLT3 | IFNGR1 | MAPKAP1 | NTRK1 | PRKD1 | SDHB | TCF7L2 |
| AR | CD276 | EED | FLT4 | IGF1 | MAX | NTRK2 | PTCH1 | SDHC | TEK |
| ARAF | CD79A | EGFL7 | FOXA1 | IGF1R | MCL1 | NTRK3 | PTEN | SDHD | TERT |
| ARID1A | CD79B | EGFR | FOXL2 | IGF2 | MDC1 | NUF2 | PTP4A1 | SESN1 | TET1 |
| ARID1B | CDC42 | EIF1AX | FOXO1 | IKBKE | MDM2 | NUP93 | PTPN11 | SESN2 | TET2 |
| ARID2 | CDC73 | EIF4A2 | FOXP1 | IKZF1 | MDM4 | PAK1 | PTPRD | SESN3 | TGFBR1 |
| ARID5B | CDH1 | EIF4E | FUBP1 | IL10 | MED12 | PAK7 | PTPRS | SETD2 | TGFBR2 |
| ASXL1 | CDK12 | ELF3 | FYN | IL7R | MEF2B | PALB2 | PTPRT | SETD8 | TMEM127 |
| ASXL2 | CDK4 | EP300 | GATA1 | INHA | MEN1 | PARK2 | RAB35 | SF3B1 | TMPRSS2 |
| ATM | CDK6 | EPAS1 | GATA2 | INHBA | MET | PARP1 | RAC1 | SH2B3 | TNFAIP3 |
| ATR | CDK8 | EPCAM | GATA3 | INPP4A | MGA | PAX5 | RAC2 | SH2D1A | TNFRSF14 |
| ATRX | CDKN1A | EPHA3 | GLI1 | INPP4B | MITF | PBRM1 | RAD21 | SHOC2 | TOP1 |
| AURKA | CDKN1B | EPHA5 | GNA11 | INPPL1 | MLH1 | PDCD1 | RAD50 | SHQ1 | TP53 |
| AURKB | CDKN2A p14ARF | EPHA7 | GNAQ | INSR | MPL | PDCD1LG2 | RAD51 | SLX4 | TP53BP1 |
| AXIN1 | CDKN2A p16INK4A | EPHB1 | GNAS | IRF4 | MRE11A | PDGFRA | RAD51B | SMAD2 | TP63 |
| AXIN2 | CDKN2B | ERBB2 | GPS2 | IRS1 | MSH2 | PDGFRB | RAD51C | SMAD3 | TRAF2 |
| AXL | CDKN2C | ERBB3 | GREM1 | IRS2 | MSH3 | PDPK1 | RAD51D | SMAD4 | TRAF7 |
| B2M | CEBPA | ERBB4 | GRIN2A | JAK1 | MSH6 | PGR | RAD52 | SMARCA4 | TSC1 |
| BABAM1 | CENPA | ERCC2 | GSK3B | JAK2 | MSI1 | PHOX2B | RAD54L | SMARCB1 | TSC2 |
| BAP1 | CHEK1 | ERCC3 | H3F3A | JAK3 | MSI2 | PIK3C2G | RAF1 | SMARCD1 | TSHR |
| BARD1 | CHEK2 | ERCC4 | H3F3B | JUN | MST1 | PIK3C3 | RARA | SMO | U2AF1 |
| BBC3 | CIC | ERCC5 | H3F3C | KDM5A | MST1R | PIK3CA | RASA1 | SMYD3 | UPF1 |
| BCL10 | CREBBP | ERF | HGF | KDM5C | MTOR | PIK3CB | RB1 | SOCS1 | VEGFA |
| BCL2 | CRKL | ERG | HIST1H1C | KDM6A | MUTYH | PIK3CD | RBM10 | SOS1 | VHL |
| BCL2L1 | CRLF2 | ERRFI1 | HIST1H2BD | KDR | MYC | PIK3CG | RECQL | SOX17 | VTCN1 |
| BCL2L11 | CSDE1 | ESR1 | HIST1H3A | KEAP1 | MYCL1 | PIK3R1 | RECQL4 | SOX2 | WHSC1 |
| BCL6 | CSF1R | ETV1 | HIST1H3B | KIT | MYCN | PIK3R2 | REL | SOX9 | WHSC1L1 |
| BCOR | CSF3R | ETV6 | HIST1H3C | KLF4 | MYD88 | PIK3R3 | RET | SPEN | WT1 |
| BIRC3 | CTCF | EZH1 | HIST1H3D | KMT2A | MYOD1 | PIM1 | RFWD2 | SPOP | WWTR1 |
| BLM | CTLA-4 | EZH2 | HIST1H3E | KMT2B | NBN | PLCG2 | RHEB | SPRED1 | XIAP |
| BMPR1A | CTNNB1 | FAM175A | HIST1H3F | KMT2C | NCOA3 | PLK2 | RHOA | SRC | XPO1 |
| BRAF | CUL3 | FAM46C | HIST1H3G | KMT2D | NCOR1 | PMAIP1 | RICTOR | SRSF2 | XRCC2 |
| BRCA1 | CXCR4 | FAM58A | HIST1H3H | KNSTRN | NEGR1 | PMS1 | RIT1 | STAG2 | YAP1 |
| BRCA2 | CYLD | FANCA | HIST1H3I | KRAS | NF1 | PMS2 | RNF43 | STAT3 | YES1 |
| BRD4 | CYSLTR2 | FANCC | HIST1H3J | LATS1 | NF2 | PNRC1 | ROS1 | STAT5A | ZFHX3 |
| BRIP1 | DAXX | FAT1 | HIST2H3C | LATS2 | NFE2L2 | POLD1 | RPS6KA4 | STAT5B | |
| BTK | DCUN1D1 | FBXW7 | HIST2H3D | LMO1 | NFKBIA | POLE | RPS6KB2 | STK11 | |
| ABL1 | CALR | DDR2 | FGF19 | HIST3H3 | LYN | NKX2-1 | PPARG | RPTOR | STK19 |

NEOGENOMICS® NEOTYPE™ Assays

In some embodiments, TMB is determined using a NEOGENOMICS® NEOTYPE™ assay. In some embodiments, the TMB is determined using a NEOTYPE™ Discovery Profile. In some embodiments, the TMB is determined using a NEOTYPE Solid Tumor Profile. The NEOGENOMICS assays measure the number of non-synonymous DNA coding sequence changes per megabase of sequenced DNA.

ONCOMINE™ Tumor Mutation Load Assay

In some embodiments, TMB is determined using a THERMOFISHER SCIENTIFIC® ONCOMINE™ Tumor Mutation assay. In some embodiments, TMB is determined using a THERMOFISHER SCIENTIFIC® ION TORRENT™ ONCOMINE™ Tumor Mutation assay. The ION TORRENT™ ONCOMINE™ Tumor Mutation assay is a targeted NGS assay that quantitates somatic mutations to determine tumor mutation load. The assay covers 1.7 Mb of DNA.

NOVOGENE™ NOVOPM™ Assay

In some embodiments, TMB is determined using a NOVOGENE™ NOVOPM™ assay. In some embodiments, TMB is determined using a NOVOGENE™ NOVOPM™ Cancer Panel assay. The NOVOGENE™ NOVOPM™ Cancer Panel assay is a comprehensive NGS cancer panel that analyzes the complete coding regions of 548 genes and the introns of 21 genes, representing about 1.5 Mb of DNA, and that are relevant for the diagnosis and/or treatment of solid tumors according to the National Comprehensive Cancer Network (NCCN) guidelines and medical literature. The assay detects SNV, InDel, fusion, and copy number variation (CNV) genomic abnormalities.

Other TMB Assays

In some embodiments, TMB is determined using a TMB assay provided by CARIS® Life Sciences. In some embodiments, TMB is determined using the PESONALIS® ACE ImmunoID assay. In some embodiments, TMB is determined using the PGDX® CANCERXOME™—R assay.

In yet another particular embodiment, the genomic profiling detects all mutation types, i.e., single nucleotide variants, insertions/deletions (indels), copy number variations, and rearrangements, e.g., translocations, expression, and epigenetic markers.

Comprehensive gene panels often contain predetermined genes selected based on the type of tumor to be analyzed. Accordingly, the genomic profile used to measure TMB status can be selected based on the type of tumor the subject has. In one embodiment, the genomic profile can include a set of genes particular to a solid tumor. In another embodiment, the genomic profile can include a set of genes particular to hematologic malignancies and sarcomas.

In one embodiment, the genomic profile comprises one or more genes selected from the group consisting of ABL1, BRAF, CHEK1, FANCC, GATA3, JAK2, MITF, PDCD1LG2, RBM10, STAT4, ABL2, BRCA1, CHEK2, FANCD2, GATA4, JAK3, MLH1, PDGFRA, RET, STKI1, ACVR1B, BRCA2, CIC, FANCE, GATA6, JUN, MPL, PDGFRB, RICTOR, SUFU, AKT1, BRD4, CREBBP, FANCF, GID4 (C17orf39), KAT6A (MYST3), MRE11A, PDK1, RNF43, SYK, AKT2, BRIP1, CRKL, FANCG, GLI1, KDM5A, MSH2, PIK3C2B, ROS1, TAF1, AKT3, BTG1, CRLF2, FANCL, GNA11, KDM5C, MSH6, PIK3CA, RPTOR, TBX3, ALK, BTK, CSFIR, FAS, GNA13, KDM6A, MTOR, PIK3CB, RUNX1, TERC, AMER1 (FAM123B), C11orf30 (EMSY), CTCF, FAT1, GNAQ, KDR, MUTYH, PIK3CG, RUNXJT1, TERT (promoter only), APC, CARD11, CTNNA1, FBXW7, GNAS, KEAP1, MYC, PIK3R1, SDHA, TET2, AR, CBFB, CTNNB1, FGFJO, GPR124, KEL, MYCL (MYCL1), PIK3R2, SDHB, TGFBR2, ARAF, CBL, CUL3, FGF14, GRIN2A, KIT, MYCN, PLCG2, SDHC, TNFAIP3, ARFRP1, CCND1, CYLD, FGF19, GRM3, KLHL6, MYD88, PMS2, SDHD, TNFRSF14, ARID1A, CCND2, DAXX FGF23, GSK3B, KMT2A (MLL), NF1, POLD1, SETD2, TOP1, ARID1B, CCND3, DDR2, FGF3, H3F3A, KMT2C (MLL3), NF2, POLE, SF3B1, TOP2A, ARID2, CCNE1, DICER1, FGF4, HGF, KMT2D (MLL2), NFE2L2, PPP2RIA, SLIT2, TP53, ASXL1, CD274, DNMT3A, FGF6, HNFIA, KRAS, NFKBIA, PRDM1, SMAD2, TSC1, ATM, CD79A, DOT1L, FGFR1, HRAS, LMO1, NKX2-1, PREX2, SMAD3, TSC2, ATR, CD79B, EGFR, FGFR2, HSD3B1, LRP1B, NOTCH1, PRKAR1A, SMAD4, TSHR, ATRX, CDC73, EP300, FGFR3, HSP90AA1, LYN, NOTCH2, PRKC1, SMARCA4, U2AF1, AURKA, CDH1, EPHA3, FGFR4, IDH1, LZTR1, NOTCH3, PRKDC, SMARCB1, VEGFA, AURKB, CDK12, EPHA5, FH, IDH2, MAGI2, NPM1, PRSS8, SMO, VHL, AXIN1, CDK4, EPHA7, FLCN, IGFIR, MAP2K1, NRAS, PTCH1, SNCAIP, WISP3, AXL, CDK6, EPHB1, FLT1, IGF2, MAP2K2, NSD1, PTEN, SOCS1, WT1, BAP1, CDK8, ERBB2, FLT3, IKBKE, MAP2K4, NTRK1, PTPN11, SOX10, XPO1, BARD1, CDKN1A, ERBB3, FLT4, IKZF1, MAP3K1, NTRK2, QK1, SOX2, ZBTB2, BCL2, CDKN1B, ERBB4, FOXL2, IL7R, MCL1, NTRK3, RAC1, SOX9, ZNF217, BCL2L1, CDKN2A, ERG, FOXP1, INHBA, MDM2, NUP93, RAD50, SPEN, ZNF703, BCL2L2, CDKN2B, ERRFI1, FRS2, INPP4B, MDM4, PAK3, RAD51, SPOP, BCL6, CDKN2C, ESR1, FUBP1, IRF2, MED12, PALB2, RAF1, SPTA1, BCOR, CEBPA, EZH2, GABRA6, IRF4, MEF2B, PARK2, RANBP2, SRC, BCORL1, CHD2, FAM46C, GATA1, IRS2, MEN1, PAX5, RARA, STAG2, BLM, CHD4, FANCA, GATA2, JAK1, MET, PBRM1, RB1, STAT3, and any combination thereof. In other embodiments, the TMB analysis further comprises identifying a genomic alteration in one or more of ETV4, TMPRSS2, ETV5, BCR, ETV1, ETV6, and MYB.

In another embodiment, the genomic profile comprises one or more genes selected from the group consisting of ABL1, 12B, ABL2, ACTB, ACVR1, ACVR1B, AGO2, AKT1, AKT2, AKT3, ALK, ALOX, ALOX12B, AMER1, AMER1 (FAM123B or WTX), AMER1 (FAM123B), ANKRD11, APC, APH1A, AR, ARAF, ARFRP1, ARHGAP26 (GRAF), ARID1A, ARID1B, ARID2, ARID5B, ARv7, ASMTL, ASXL1, ASXL2, ATM, ATR, ATRX, AURKA, AURKB, AN1, AN2, AXL, B2M, BABAM1, BAP1, BARD1, BBC3, BCL10, BCL11B, BCL2, BCL2L1, BCL2L11, BCL2L2, BCL6, BCL7A, BCOR, BCORL1, BIRC3, BLM, BMPRIA, BRAF, BRCA1, BRCA2, BRD4, BRIP1, BRIP1 (BACH1), BRSK1, BTG1, BTG2, BTK, BTLA, C11orf 30 (EMSY), C11orf30, C11orf30 (EMSY), CAD, CALR, CARD11, CARM1, CASP8, CBFB, CBL, CCND1, CCND2, CCND3, CCNE1, CCT6B, CD22, CD274, CD274 (PD-L1), CD276, CD36, CD58, CD70, CD79A, CD79B, CDC42, CDC73, CDH1, CDK12, CDK4, CDK6, CDK8, CDKN1A, CDKN1B, CDKN2A, CDKN2Ap14ARF, CDKN2Ap16INK4A, CDKN2B, CDKN2C, CEBPA, CENPA, CHD2, CHD4, CHEK1, CHEK2, CIC, CIITA, CKSIB, CPS1, CREBBP, CRKL, CRLF2, CSDE1, CSFIR, CSF3R, CTCF, CTLA-4, CTNN B1, CTNNA1, CTNNB1, CUL3, CUL4A, CUX1, CXCR4, CYLD, CYP17A1, CYSLTR2, DAXX DCUNID1, DDR1, DDR2, DDX3X, DH2, DICER1, DIS3, DNAJB1, DNM2, DNMT1, DNMT3A, DNMT3B, DOT1L, DROSHA, DTX1, DUSP2, DUSP4, DUSP9, E2F3, EBF1, ECT2L, EED, EGFL7, EGFR, EIFAX, EIF4A2, EIF4E, ELF3, ELP2, EML4, EML4-ALK, EP300, EPAS1, EPCAM, EPHA3, EPHA5, EPHA7, EPHB1, EPHB4, ERBB2, ERBB3, ERBB4, ERCC1, ERCC2, ERCC3, ERCC4, ERCC5, ERF, ERG, ERRFI1, ERRFI1, ESR1, ETS1, ETV1, ETV4, ETV5, ETV6, EWSR1, EXOSC6, EZH1, EZH2, FAF1, FAM175A, FAM46C, FAM58A, FANCA, FANCC, FANCD2, FANCE, FANCF, FANCG, FANC1, FANCL, FAS, FAS (TNFRSF6), FAT1, FBXO11, FBXO31, FBXW7, FGF1, FGF10, FGF12, FGF14, FGF19, FGF2, FGF23, FGF3, FGF4, FGF5, FGF6, FGF7, FGF8, FGF9, FGFR1, FGFR2, FGFR3, FGFR4, FH, FHIT, FLCN, FLI1, FLT1, FLT3, FLT4, FLYWCH1, FOXA1, FOXL2, FOXO1, FOXO3, FOXP1, FRS2, FUBP1, FYN, GABRA6, GADD45B, GATA1, GATA2, GATA3, GATA4, GATA6, GEN1, GID4 (C17orf 39), GID4 (C17orf39), GLI1, GL11, GNA11, GNA12, GNA13, GNAQ, GNAS, GPR124, GPS2, GREM1, GRIN2A, GRM3, GSK3B, GTSE1, H3F3A, H3F3B, H3F3C, HDAC1, HDAC4, HDAC7, Hedgehog, HER-2/NEU, ERBB2, HGF, HIST1HIC, HIST1H1D, HIST1HIE, HIST1H2AC, HIST1H2AG, HIST1H2AL, HIST1H2AM, HIST1H2BC, HIST1H2BD, HIST1H2B1, HIST1H2BK, HIST1H2BO, HIST1H3A, HIST1H3B, HIST1H3C, HISTLH3D, HIST1H3E, HIST1H3F, HIST1H3G, HIST1H3H, HIST1H3I, HIST1H3J, HIST2H3C, HIST2H3D, HIST3H3, HLA-A, HLA-B, HNF1A, HOXB13, HRAS, HSD3B1, HSP90AA1, ICK, ICOSLG, ID3, IDH1, IDH2, IFNGR1, IGF1, IGFIR, IGF2, IKBKE, IKZF1, IKZF2, IKZF3, IL10, IL7R, INHA, INHBA, INPP4A, INPP4B, INPP5D (SHIP), INPPL1, INSR, IRF1, IRF2, IRF4, IRF8, IRS1, IRS2, JAK1, JAK2, JAK3, JARID2, JUN, K14, KAT6A (MYST3), KAT6A (MYST3), KDM2B, KDM4C, KDM5A, KDM5C, KDM6A, KDR, KEAP1, KEL, KIF5B, KIT, KLF4, KLHL6, KMT2A, KMT2A (MLL), KMT2B, KMT2C, KMT2C (MLL3), KMT2D, KMT2D (MLL2), KNSTRN, KRAS, LAMP1, LATS1, LATS2, LEF1, LMO1, LRPIB, LRRK2, LTK, LYN, LZTR1, MAF, MAFB, MAGED1, MAGI2, MALT1, MAP2K1, MAP2K1 (MEK1), MAP2K2, MAP2K2 (MEK2), MAP2K4, MAP3, MAP3K1, MAP3K13, MAP3K14, MAP3K6, MAP3K7, MAPK1, MAPK3, MAPKAP1, MAX, MCL1, MDC1, MDM2, MDM4, MED12, MEF2B, MEF2C, MEK1, MEN1, MERTK, MET, MGA, MIB1, MITF, MKI67, MKNK1, MLH1, MLLT3, MPL, MRE 11A, MRE11A, MSH2, MSH3, MSH6, MSI1, MSI2, MST1, MSTIR, MTAP, MTOR, MUTYH, MYC, MYCL, MYCL (MYC L1), MYCL (MYCL1), MYCL1, MYCN, MYD88, MYO18A, MYOD1, NBN, NCOA3, NCOR1, NCOR2, NCSTN, NEGR1, NF1, NF2, NFE2L2, NFKBIA, NKX2-1, NKX3-1, NOD1, NOTCH1, NOTCH2, NOTCH3, NOTCH4, NPM1, NRAS, NRG1, NSD1, NT5C2, NTHL1, NTRK1, NTRK2, NTRK3, NUF2, NUP93, NUP98, P2RY8, PAG1, PAK1, PAK3, PAK7, PALB2, PARK2, PARP1, PARP2, PARP3, PASK, PAX3, PAX5, PAX7, PBRM1, PC, PCBP1, PCLO, PDCD1, PDCD1 (PD-1), PDCD11, PDCD1LG2, PDCD1LG2 (PD-L2), PDGFRA, PDGFRB, PDK1, PDPK1, PGR, PHF6, PHOX2B, PIK3C2B, PIK3C2G, PIK3C3, PIK3CA, PIK3CB, PIK3CD, PIK3CG, PIK3R1, PIK3R2, PIK3R3, PIM1, PLCG2, PLK2, PMAIP1, PMS1, PMS2, PNRC1, POLD1, POLE, POT1, PPARG, PPMID, PPP2, PPP2RIA, PPP2R2A, PPP4R2, PPP6C, PRDM1, PRDM14, PREX2, PRKAR1A, PRKC1, PRKD1, PRKDC, PRSS8, PTCH1, PTEN, PTP4A1, PTPN11, PTPN2, PTPN6 (SHP-1), PTPRD, PTPRO, PTPRS, PTPRT, QK1, RIA, RAB35, RAC1, RAC2, RAD21, RAD50, RAD51, RAD51B, RAD51C, RAD51D, RAD52, RAD54L, RAF1, RANBP2, RARA, RASA1, RASGEFIA, RB1, RBM10, RECQL, RECQL4, REL, RELN, RET, RFWD2, RHEB, RHOA, RICTOR, RIT1, RNF43, ROS1, RPS6KA4, RPS6 KB1, RPS6KB2, RPTOR, RRAGC, RRAS, RRAS2, RTEL1, RUNX1, RUNX1T1, RXRA, RYBP, SIPR2, SDHA, SDHAF2, SDHB, SDHC, SDHD, SERP2, SESN1, SESN2, SESN3, SETBP1, SETD2, SETD8, SF3B1, SGK1, SH2B3, SH2DIA, SHOC2, SHQ1, SLIT2, SLX4, SMAD2, SMAD3, SMAD4, SMARCA1, SMARCA4, SMARCB1, SMARCD1, SMCIA, SMC3, SMO, SMYD3, SNCAIP, SOCS1, SOCS2, SOCS3, SOS1, SOX10, SOX17, SOX2, SOX9, SPEN, SPOP, SPRED1, SPTA1, SRC, SRSF2, STAG2, STAT3, STAT4, STAT5A, STAT5B, STAT6, STK11, STK19, STK40, SUFU, SUZ12, SYK, TAF1, TAP1, TAP2, TBL1XR1, TBX3, TCEB1, TCF3, TCF3 (E2A), TCF7L2, TCL1A (TCL1), TEK, TERC, TERT, TERT Promoter, TET1, TET2, TFRC, TGFBR1, TGFBR2, TIPARP, TLL2, TMEM127, TMEM30A, TMPRSS2, TMSB4XP8 (TMSL3), TNFAIP3, TNFRSF11A, TNFRSF14, TNFRSF17, TOP1, TOP2A, TP53, TP53BP1, TP63, TRAF2, TRAF3, TRAF5, TRAF7, TSC1, TSC2, TSHR, TUSC3, TYK2, TYRO3, U2AF1, U2AF2, UPF1, VEGFA, VHL, VTCN1, WDR90, WHSC1, WHSC1 (MM-SET or NSD2), WHSC1L1, WISP3, WT1, WWTR1, XBP1, XIAP, XPO1, XRCC2, YAP1, YES1, YY1AP1, ZBTB2, ZFHX3, ZMYM3, ZNF217, ZNF24 (ZSCAN3), ZNF703, ZRSR2, and any combination thereof.

In another embodiment, the genomic profiling assay comprises at least about 20, at least about 30, at least about 40, at least about 50, at least about 60, at least about 70, at least about 80, at least about 90, at least about 100, at least about 110, at least about 120, at least about 130, at least about 140, at least about 150, at least about 160, at least about 170, at least about 180, at least about 190, at least about 200, at least about 210, at least about 220, at least about 230, at least about 240, at least about 250, at least about 260, at least about 270, at least about 280, at least about 290, or at least about 300 genes selected from the group consisting of ABL1, 12B, ABL2, ACTB, ACVR1, ACVR1B, AGO2, AKT1, AKT2, AKT3, ALK, ALOX, ALOXJ2B, AMER1, AMER1 (FAM123B or WTX), AMER1 (FAM123B), ANKRD11, APC, APH1A, AR, ARAF, ARFRP1, ARHGAP26 (GRAF), ARID1A, ARID1B, ARID2, ARID5B, ARv7, ASMTL, ASXL1, ASXL2, ATM, ATR, ATRX, AURKA, AURKB, AXIN1, AXIN2, AM, B2M, BABAM1, BAP1, BARD1, BBC3, BCL10, BCL11B, BCL2, BCL2L1, BCL2L11, BCL2L2, BCL6, BCL7A, BCOR, BCORL1, BIRC3, BLM, BMPRIA, BRAF, BRCA1, BRCA2, BRD4, BRIP1, BRIP1 (BACH1), BRSK1, BTG1, BTG2, BTK, BTLA, C11orf 30 (EMSY), C11orf30, C11orf30 (EMSY), CAD, CALR, CARD11, CARM1, CASP8, CBFB, CBL, CCND1, CCND2, CCND3, CCNE1, CCT6B, CD22, CD274, CD274 (PD-L1), CD276, CD36, CD58, CD70, CD79A, CD79B, CDC42, CDC73, CDH1, CDK12, CDK4, CDK6, CDK8, CDKN1A, CDKN1B, CDKN2A, CDKN2Ap14ARF, CDKN2Ap16INK4A, CDKN2B, CDKN2C, CEBPA, CENPA, CHD2, CHD4, CHEK1, CHEK2, CIC, CHTA, CKSIB, CPS1, CREBBP, CRKL, CRLF2, CSDE1, CSFIR, CSF3R, CTCF, CTLA-4, CTNN B1, CTNNA1, CTNNB1, CUL3, CUL4A, CUX1, CXCR4, CYLD, CYP17A1, CYS-LTR2, DAXX, DCUNID1, DDR1, DDR2, DDX3X, DH2, DICER1, DIS3, DNAJB1, DNM2, DNMT1, DNMT3A, DNMT3B, DOT1L, DROSHA, DTX1, DUSP2, DUSP4, DUSP9, E2F3, EBF1, ECT2L, EED, EGFL7, EGFR, EIFIAX EIF4A2, EIF4E, ELF3, ELP2, EML4, EML4-ALK, EP300, EPAS1, EPCAM, EPHA3, EPHA5, EPHA7, EPHB1, EPHB4, ERBB2, ERBB3, ERBB4, ERCC1, ERCC2, ERCC3, ERCC4, ERCC5, ERF, ERG, ERRF11, ERRF11, ESR1, ETS1, ETV1, ETV4, ETV5, ETV6, EWSR1, EXOSC6, EZH1, EZH2, FAF1, FAM175A, FAM46C, FAM58A, FANCA, FANCC, FANCD2, FANCE, FANCF, FANCG, FANC1, FANCL, FAS, FAS (TNFRSF6), FAT1, FBXO11, FBXO31, FBXW7, FGF1, FGF10, FGF12, FGF14, FGF19, FGF2, FGF23, FGF3, FGF4, FGF5, FGF6, FGF7, FGF8, FGF9, FGFR1, FGFR2, FGFR3, FGFR4, FH, FHIT, FLCN, FLI1, FLT1, FLT3, FLT4, FLYWCH1, FOXA1, FOXL2, FOXO1, FOXO3, FOXP1, FRS2, FUBP1, FYN, GABRA6, GADD45B, GATA1, GATA2, GATA3, GATA4, GATA6, GEN1, GID4 (C17orf 39), GID4 (C17orf39), GLI1, GL11, GNA11, GNA12, GNA13, GNAQ, GNAS, GPR124, GPS2, GREM1, GRIN2A, GRM3, GSK3B, GTSE1, H3F3A, H3F3B, H3F3C, HDAC1, HDAC4, HDAC7, Hedgehog, HER-2/NEU, ERBB2, HGF, HIST1HIC, HIST1HID, HIST1HIE, HIST1H2AC, HIST1H2AG, HIST1H2AL, HIST1H2AM, HIST1H2BC, HIST1H2BD, HIST1H2B1, HIST1H2BK, HIST1H2BO, HIST1H3A, HIST1H3B, HIST1H3C, HIST1H3D, HIST1H3E, HIST1H3F, HIST1H3G, HIST1H3H, HIST1H3I, HIST1H3J, HIST2H3C, HIST2H3D, HIST3H3, HLA-A, HLA-B, HNF1A, HOXB13, HRAS, HSD3B1, HSP90AA1, ICK, ICOSLG, ID3, IDH1, IDH2, IFNGR1, IGF1, IGFIR, IGF2, IKBKE, IKZF, IKZF2, IKZF3, IL10, IL7R, INHA, INHBA, INPP4A, INPP4B, INPP5D (SHIP), INPPL1, INSR, IRF1, IRF2, IRF4, IRF8, IRS1, IRS2, JAK1, JAK2, JAK3, JARID2, JUN, K14, KAT6A (MYST3), KAT6A (MYST3), KDM2B, KDM4C, KDM5A, KDM5C, KDM6A, KDR, KEAP1, KEL, KIF5B, KIT, KLF4, KLHL6, KMT2A, KMT2A (MLL), KMT2B, KMT2C, KMT2C (MLL3), KMT2D, KMT2D (MLL2), KNSTRN, KRAS, LAMP1, LATS1, LATS2, LEF1, LMO1, LRPIB, LRRK2, LTK, LYN, LZTR1, MAF, MAFB, MAGED1, MAGI2, MALT1, MAP2K1, MAP2K1 (MEK1), MAP2K2, MAP2K2 (MEK2), MAP2K4, MAP3, MAP3K1, MAP3K13, MAP3K14, MAP3K6, MAP3K7, MAPK1, MAPK3, MAPKAP1, MAX, MCL1, MDC1, MDM2, MDM4, MED12, MEF2B, MEF2C, MEK1, MEN1, MERTK, MET, MGA, MIB1, MITF, MKI67, MKNK1, MLH1, MLLT3, MPL, MRE 11A, MRE11A, MSH2, MSH3, MSH6, MSI1, MSI2, MST1, MSTIR, MTAP, MTOR, MUTYH, MYC, MYCL, MYCL (MYC L1), MYCL (MYCL1), MYCL1, MYCN, MYD88, MYO18A, MYOD1, NBN, NCOA3, NCOR1, NCOR2, NCSTN, NEGR1, NF1, NF2, NFE2L2, NFKBIA, NKX2-1, NKX3-1, NOD1, NOTCH1, NOTCH2, NOTCH3, NOTCH4, NPM1, NRAS, NRG1, NSD1, NT5C2, NTHL1, NTRK1, NTRK2, NTRK3, NUF2, NUP93, NUP98, P2RY8, PAG1, PAK1, PAK3, PAK7, PALB2, PARK2, PARP1, PARP2, PARP3, PASK, PAX3, PAX5, PAX7, PBRM1, PC, PCBP1, PCLO, PDCD1, PDCD1 (PD-1), PDCD11, PDCD1LG2, PDCD1LG2 (PD-L2), PDGFRA, PDGFRB, PDK1, PDPK1, PGR, PHF6, PHOX2B, PIK3C2B, PIK3C2G, PIK3C3, PIK3CA, PIK3CB, PIK3CD, PIK3CG, PIK3R1, PIK3R2, PIK3R3, PIM1, PLCG2, PLK2, PMAIP1, PMS1, PMS2, PNRC1, POLD1, POLE, POT1, PPARG, PPMID, PPP2, PPP2RIA, PPP2R2A, PPP4R2, PPP6C, PRDM1, PRDM14, PREX2, PRKAR1A, PRKC1, PRKD1, PRKDC, PRSS8, PTCH1, PTEN, PTP4A1, PTPN11, PTPN2, PTPN6 (SHP-1), PTPRD, PTPRO, PTPRS, PTPRT, QK1, RIA, RAB35, RAC1, RAC2, RAD21, RAD50, RAD51, RAD51B, RAD51C, RAD51D, RAD52, RAD54L, RAF1, RANBP2, RARA, RASA1, RASGEFA, RB1, RBM10, RECQL, RECQL4, REL, RELN, RET, RFWD2, RHEB, RHOA, RICTOR, RIT1, RNF43, ROS1, RPS6KA4, RPS6 KB1, RPS6KB2, RPTOR, RRAGC, RRAS, RRAS2, RTEL1, RUNX1, RUNX1T1, RXRA, RYBP, SIPR2, SDHA, SDHAF2, SDHB, SDHC, SDHD, SERP2, SESN1, SESN2, SESN3, SETBP1, SETD2, SETD8, SF3B1, SGK1, SH2B3, SH2DIA, SHOC2, SHQ1, SLIT2, SLX4, SMAD2, SMAD3, SMAD4, SMARCA1, SMARCA4, SMARCB1, SMARCD, SMCIA, SMC3, SMO, SMYD3, SNCAIP, SOCS1, SOCS2, SOCS3, SOS1, SOX10, SOX17, SOX2, SOX9, SPEN, SPOP, SPRED1, SPTA1, SRC, SRSF2, STAG2, STAT3, STAT4, STAT5A, STAT5B, STAT6, STKI1, STK19, STK40, SUFU, SUZ12, SYK, TAF1, TAP1, TAP2, TBLIXR1, TBX3, TCEB1, TCF3, TCF3 (E2A), TCF7L2, TCL1A (TCL1), TEK, TERC, TERT, TERT Promoter, TET1, TET2, TFRC, TGFBR1, TGFBR2, TIPARP, TLL2, TMEM127, TMEM30A, TMPRSS2, TMSB4XP8 (TMSL3), TNFAIP3, TNFRSFIJA, TNFRSF14, TNFRSF17, TOP1, TOP2A, TP53, TP53BP1, TP63, TRAF2, TRAF3, TRAF5, TRAF7, TSC1, TSC2, TSHR, TUSC3, TYK2, TYRO3, U2AF1, U2AF2, UPF1, VEGFA, VHL, VTCN1, WDR90, WHSC1, WHSC1 (AIMSET or NSD2), WHSC1L1, WISP3, WT1, WWTR1, XBP1, XIAP, XPO1, XRCC2, YAP1, YES1, YY1AP1, ZBTB2, ZFHX3, ZMYM3, ZNF217, ZNF24 (ZSCAN3), ZNF703, ZRSR2, and any combination thereof.

In another embodiment, the genomic profile comprises one or more genes selected from the genes listed in Tables 2-14.

In one embodiment, TMB status based on genomic profiling is highly correlated with TMB status based on whole-exome or whole-genome sequencing. Evidence shows that the use of genomic profiling assays, such as the F1CDx assay, have concordance with whole-exome and/or whole genome sequencing assays. These data support the use of genomic profiling assays as a more efficient means of measuring TMB status, without forfeiting the prognostic qualities of TMB status.

TMB can be measured using a tissue biopsy sample or, alternatively, circulating tumor DNA (ctDNA), cfDNA (cell-free DNA), and/or a liquid biopsy sample. ctDNA can be used to measure TMB status according to whole-exome or whole-genome sequencing or genomic profiling using available methodologies, e.g., GRAIL, Inc.

In some embodiments, a subject is identified as suitable for combination therapy disclosed herein based on the measurement of TMB status and identification of a high TMB. In some embodiments, a TMB score is calculated as the total number of nonsynonymous missense mutations in a tumor, as measured by whole exome sequencing or whole genome sequencing. In one embodiment, the high TMB has a score of at least 210, at least 215, at least 220, at least 225, at least 230, at least 235, at least 240, at least 245, at least 250, at least 255, at least 260, at least 265, at least 270, at least 275, at least 280, at least 285, at least 290, at least 295, at least 300, at least 305, at least 310, at least 315, at least 320, at least 325, at least 330, at least 335, at least 340, at least 345, at least 350, at least 355, at least 360, at least 365, at least 370, at least 375, at least 380, at least 385, at least 390, at least 395, at least 400, at least 405, at least 410, at least 415, at least 420, at least 425, at least 430, at least 435, at least 440, at least 445, at least 450, at least 455, at least 460, at least 465, at least 470, at least 475, at least 480, at least 485, at least 490, at least 495, or at least 500. In another embodiment, the high TMB has a score of at least 215, at least 220, at least 221, at least 222, at least 223, at least 224, at least 225, at least 226, at least 227, at least 228, at least 229, at least 230, at least 231, at least 232, at least 233, at least 234, at least 235, at least 236, at least 237, at least 238, at least 239, at least 240, at least 241, at least 242, at least 243, at least 244, at least 245, at least 246, at least 247, at least 248, at least 249, or at least 250. In a particular embodiment, the high TMB has a score of at least 243. In other embodiments, the high TMB has a score of at least 244. In some embodiments, the high TMB has a score of at least 245. In other embodiments, the high TMB has a score of at least 246. In other embodiments, the high TMB has a score of at least 247. In other embodiments, the high TMB has a score of at least 248. In other embodiments, the high TMB has a score of at least 249. In other embodiments, the high TMB has a score of at least 250. In other embodiments, the high TMB has a score of any integer between 200 and 300 or higher. In other embodiments, the high TMB has a score of any integer between 210 and 290 or higher. In other embodiments, the high TMB has a score of any integer between 220 and 280 or higher. In other embodiments, the high TMB has a score of any integer between 230 and 270 or higher. In other embodiments, the high TMB has a score of any integer between 235 and 265 or higher.

Alternatively, the high TMB can be a relative value rather than an absolute value. In some embodiments, the subject's TMB status is compared to a reference TMB value. In one embodiment, the subject's TMB status is within the highest fractile of the reference TMB value. In another embodiment, the subject's TMB status is within the top tertile of the reference TMB value.

In some embodiments, TMB status is expressed as the number of mutations per sample, per cell, per exome, or per length of DNA (e.g., Mb). In some embodiments, a tumor has a high TMB status if the tumor has at least about 50 mutations/tumor, at least about 55 mutations/tumor, at least about 60 mutations/tumor, at least about 65 mutations/tumor, at least about 70 mutations/tumor, at least about 75 mutations/tumor, at least about 80 mutations/tumor, at least about 85 mutations/tumor, at least about 90 mutations/tumor, at least about 95 mutations/tumor, at least about 100 mutations/tumor, at least about 105 mutations/tumor, at least about 110 mutations/tumor, at least about 115 mutations/tumor, or at least about 120 mutations/tumor. In some embodiments, a tumor has a high TMB status if the tumor has at least about 125 mutations/tumor, at least about 150 mutations/tumor, at least about 175 mutations/tumor, at least about 200 mutations/tumor, at least about 225 mutations/tumor, at least about 250 mutations/tumor, at least about 275 mutations/tumor, at least about 300 mutations/tumor, at least about 350 mutations/tumor, at least about 400 mutations/tumor, or at least about 500 mutations/tumor. In one particular embodiment, a tumor has a high TMB status if the tumor has at least about 100 mutations/tumor.

In some embodiments, a tumor has a high TMB status if the tumor has at least about 5 mutations per megabase of genes, e.g., genome sequenced according to a TMB assay, e.g., genome sequenced according to a FOUNDATIONONE® CDX™ assay, (mutations/Mb), at least about 6 mutations/Mb, at least about 7 mutations/Mb, at least about 8 mutations/Mb, at least about 9 mutations/Mb, at least about 10 mutations/Mb, at least about 11 mutations/Mb, at least about 12 mutations/Mb, at least about 13 mutations/Mb, at least about 14 mutations/Mb, at least about 15 mutations/Mb, at least about 20 mutations/Mb, at least about 25 mutations/Mb, at least about 30 mutations/Mb, at least about 35 mutations/Mb, at least about 40 mutations/Mb, at least about 45 mutations/Mb, at least about 50 mutations/Mb, at least about 75 mutations/Mb, or at least about 100 mutations/Mb. In certain embodiments, a tumor has a high TMB status if the tumor has at least about 5 mutations/Mb. In certain embodiments, a tumor has a high TMB status if the tumor has at least about 10 mutations/Mb. In some embodiments, a tumor has a high TMB status if the tumor has at least about 11 mutations/Mb. In some embodiments, a tumor has a high TMB status if the tumor has at least about 12 mutations/Mb. In some embodiments, a tumor has a high TMB status if the tumor has at least about 13 mutations/Mb. In some embodiments, a tumor has a high TMB status if the tumor has at least about 14 mutations/Mb. In certain embodiments, a tumor has a high TMB status if the tumor has at least about 15 mutations/Mb.

Because the number of mutations varies by tumor type and other ways (see Q4 and Q5), the values associated with "TMB high" and "TMB low" can differ across tumor types.

PD-L1 Status

TMB status can be used alone or in combination with other factors as a means to predict a tumor's response to a combination therapy comprising (a) an anti-PD-1 antibody or an anti-PD-L1 antibody and (b) an anti-CTLA-4 antibody. In some embodiments, only the TMB status of a tumor is used to identify patients with a tumor more likely to respond to a combination therapy comprising (a) an anti-PD-1 antibody or an anti-PD-L1 antibody and (b) an anti-CTLA-4 antibody. In other embodiments, the PD-L1 status and TMB status are used to identify patients with a tumor more likely to respond to a combination therapy comprising (a) an anti-PD-1 antibody or an anti-PD-L1 antibody and (b) an anti-CTLA-4 antibody. In certain embodiments, the tumor has a PD-L1 expression of less than 1%, e.g., less than 1% of tumor cells express PD-L1. In particular embodiments, the subject has a high TMB status (≥10 mut/Mb) and a tumor PD-L1 expression level of less than 1%.

The PD-L1 status of a tumor in a subject can be measured prior to administering any composition or utilizing any method disclosed herein. PD-L1 expression can be determined by any methods known in the art.

In order to assess the PD-L1 expression, in one embodiment, a test tissue sample can be obtained from the patient who is in need of the therapy. In another embodiment, the assessment of PD-L1 expression can be achieved without obtaining a test tissue sample. In some embodiments, selecting a suitable patient includes (i) optionally providing a test tissue sample obtained from a patient having a tumor derived from a NSCLC, the test tissue sample comprising tumor cells and/or tumor-infiltrating inflammatory cells; and (ii) assessing the proportion of cells in the test tissue sample that express PD-L1 on the surface of the cells based on an assessment that the proportion of cells in the test tissue sample that express PD-L1 on the cell surface is higher than a predetermined threshold level.

In any of the methods comprising the measurement of PD-L1 expression in a test tissue sample, however, it should be understood that the step comprising the provision of a test tissue sample obtained from a patient is an optional step. It should also be understood that in certain embodiments the "measuring" or "assessing" step to identify, or determine the number or proportion of, cells in the test tissue sample that express PD-L1 on the cell surface is performed by a transformative method of assaying for PD-L1 expression, for example by performing a reverse transcriptase-polymerase chain reaction (RT-PCR) assay or an IHC assay. In certain other embodiments, no transformative step is involved and PD-L1 expression is assessed by, for example, reviewing a report of test results from a laboratory. In certain embodiments, the steps of the methods up to, and including, assessing PD-L1 expression provides an intermediate result that can be provided to a physician or other healthcare provider for use in selecting a suitable candidate for the combination therapy comprising (a) an anti-PD-1 antibody or an anti-PD-L1 antibody and (b) an anti-CTLA-4 antibody. In certain embodiments, the steps that provide the intermediate result is performed by a medical practitioner or someone acting under the direction of a medical practitioner. In other embodiments, these steps are performed by an independent laboratory or by an independent person such as a laboratory technician.

In certain embodiments of any of the present methods, the proportion of cells that express PD-L1 is assessed by performing an assay to determine the presence of PD-L1 RNA. In further embodiments, the presence of PD-L1 RNA is determined by RT-PCR, in situ hybridization or RNase protection. In other embodiments, the proportion of cells that express PD-L1 is assessed by performing an assay to determine the presence of PD-L1 polypeptide. In further embodiments, the presence of PD-L1 polypeptide is determined by immunohistochemistry (IHC), enzyme-linked immunosorbent assay (ELISA), in vivo imaging, or flow cytometry. In some embodiments, PD-L1 expression is assayed by IHC. In other embodiments of all of these methods, cell surface expression of PD-L1 is assayed using, e.g., IHC or in vivo imaging.

Imaging techniques have provided important tools in cancer research and treatment. Recent developments in molecular imaging systems, including positron emission tomography (PET), single-photon emission computed tomography (SPECT), fluorescence reflectance imaging (FRI), fluorescence-mediated tomography (FMT), bioluminescence imaging (BLI), laser-scanning confocal microscopy (LSCM) and multiphoton microscopy (MPM), will likely herald even greater use of these techniques in cancer research. Some of these molecular imaging systems allow clinicians to not only see where a tumor is located in the body, but also to visualize the expression and activity of specific molecules, cells, and biological processes that influence tumor behavior and/or responsiveness to therapeutic drugs (Condeelis and Weissleder, "In vivo imaging in cancer," *Cold Spring Harb. Perspect. Biol.* 2(12):a003848

(2010)). Antibody specificity, coupled with the sensitivity and resolution of PET, makes immunoPET imaging particularly attractive for monitoring and assaying expression of antigens in tissue samples (McCabe and Wu, "Positive progress in immunoPET—not just a coincidence," *Cancer Biother. Radiopharm.* 25(3):253-61 (2010); Olafsen et al., "ImmunoPET imaging of B-cell lymphoma using 124I-anti-CD20 scFv dimers (diabodies)," *Protein Eng. Des. Sel.* 23(4):243-9 (2010)). In certain embodiments of any of the present methods, PD-L1 expression is assayed by immunoPET imaging. In certain embodiments of any of the present methods, the proportion of cells in a test tissue sample that express PD-L1 is assessed by performing an assay to determine the presence of PD-L1 polypeptide on the surface of cells in the test tissue sample. In certain embodiments, the test tissue sample is a FFPE tissue sample. In other embodiments, the presence of PD-L1 polypeptide is determined by IHC assay. In further embodiments, the IHC assay is performed using an automated process. In some embodiments, the IHC assay is performed using an anti-PD-L1 monoclonal antibody to bind to the PD-L1 polypeptide. In certain embodiments, the anti-PD-L1 monoclonal antibody is selected from the group consisting of 28-8, 28-1, 28-12, 29-8, 5H1, and any combination thereof. See WO/2013/173223, which is incorporated by reference herein in its entirety.

In one embodiment of the present methods, an automated IHC method is used to assay the expression of PD-L1 on the surface of cells in FFPE tissue specimens, e.g., a tissue sample taken from a tumor derived from a NSCLC. The presence of human PD-L1 antigen can be measured in a test tissue sample by contacting the test sample, and a negative control sample (e.g., normal tissue), with a monoclonal antibody that specifically binds to human PD-L1, under conditions that allow for formation of a complex between the antibody or portion thereof and human PD-L1. In certain embodiments, the test and control tissue samples are FFPE samples. The formation of a complex is then detected, wherein a difference in complex formation between the test sample and the negative control sample is indicative of the presence of human PD-L1 antigen in the sample. Various methods are used to quantify PD-L1 expression.

In a particular embodiment, the automated IHC method comprises: (a) deparaffinizing and rehydrating mounted tissue sections in an autostainer; (b) retrieving antigen using a decloaking chamber and pH 6 buffer, heated to 110° C. for 10 min; (c) setting up reagents on an autostainer; and (d) running the autostainer to include steps of neutralizing endogenous peroxidase in the tissue specimen; blocking non-specific protein-binding sites on the slides; incubating the slides with primary antibody; incubating with a post primary blocking agent; incubating with NovoLink Polymer; adding a chromogen substrate and developing; and counterstaining with hematoxylin.

For assessing PD-L1 expression in tumor tissue samples, a pathologist examines the number of membrane PD-L1$^+$ tumor cells in each field under a microscope and mentally estimates the percentage of cells that are positive, then averages them to come to the final percentage. The different staining intensities are defined as 0/negative, 1+/weak, 2+/moderate, and 3+/strong. Typically, percentage values are first assigned to the 0 and 3+ buckets, and then the intermediate 1+ and 2+ intensities are considered. For highly heterogeneous tissues, the specimen is divided into zones, and each zone is scored separately and then combined into a single set of percentage values. The percentages of negative and positive cells for the different staining intensities are determined from each area and a median value is given to each zone. A final percentage value is given to the tissue for each staining intensity category: negative, 1+, 2+, and 3+. The sum of all staining intensities needs to be 100%. In one embodiment, the threshold number of cells that needs to be PD-L1 positive is at least about 100, at least about 125, at least about 150, at least about 175, or at least about 200 cells. In certain embodiments, the threshold number or cells that needs to be PD-L1 positive is at least about 100 cells. In some embodiments, a tumor sample must have at least 100 total tumor cells in order for the tumor sample to be considered an evaluable specimen for PD-L1 expression.

Staining is also assessed in tumor-infiltrating inflammatory cells such as macrophages and lymphocytes. In most cases macrophages serve as an internal positive control since staining is observed in a large proportion of macrophages. While not required to stain with 3+ intensity, an absence of staining of macrophages should be taken into account to rule out any technical failure. Macrophages and lymphocytes are assessed for plasma membrane staining and only recorded for all samples as being positive or negative for each cell category. Staining is also characterized according to an outside/inside tumor immune cell designation. "Inside" means the immune cell is within the tumor tissue and/or on the boundaries of the tumor region without being physically intercalated among the tumor cells. "Outside" means that there is no physical association with the tumor, the immune cells being found in the periphery associated with connective or any associated adjacent tissue.

In certain embodiments of these scoring methods, the samples are scored by two pathologists operating independently, and the scores are subsequently consolidated. In certain other embodiments, the identification of positive and negative cells is scored using appropriate software.

A histoscore is used as a more quantitative measure of the IHC data. The histoscore is calculated as follows:

$$\text{Histoscore} = [(\%\ \text{tumor} \times 1(\text{low intensity})) + (\%\ \text{tumor} \times 2(\text{medium intensity})) + (\%\ \text{tumor} \times 3(\text{high intensity}))]$$

To determine the histoscore, the pathologist estimates the percentage of stained cells in each intensity category within a specimen. Because expression of most biomarkers is heterogeneous the histoscore is a truer representation of the overall expression. The final histoscore range is 0 (no expression) to 300 (maximum expression).

An alternative means of quantifying PD-L1 expression in a test tissue sample IHC is to determine the adjusted inflammation score (AIS) score defined as the density of inflammation multiplied by the percent PD-L1 expression by tumor-infiltrating inflammatory cells (Taube et al., "Colocalization of inflammatory response with B7-hl expression in human melanocytic lesions supports an adaptive resistance mechanism of immune escape," Sci. Transl. Med. 4(127):127ra37 (2012)).

In one embodiment, the PD-L1 expression level of a tumor is at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 40%, at least about 50%, at least about 60%, at least about 70%, at least about 75%, at least about 80%, at least about 85%, at least about 90%, at least about 95%, or about 100%. In another embodiment, the PD-L1 status of a tumor is at least about 1%. In other embodiments, the PD-L1 status of the subject is at least about 5%. In a certain embodiment, the PD-L1 status of a tumor is at least about 10%. In one embodiment, the PD-L1 status of the tumor is at least about 25%. In a particular embodiment, the PD-L1 status of the tumor is at least about 50%.

"PD-L1 positive" as used herein can be interchangeably used with "PD-L1 expression of at least about 1%". In one embodiment, the PD-L1 positive tumors can thus have at least about 1%, at least about 2%, at least about 5%, at least about 10%, at least about 20%, at least about 25%, at least about 30%, at least about 40%, at least about 50%, at least about 60%, at least about 70%, at least about 75%, at least about 80%, at least about 85%, at least about 90%, at least about 95%, or about 100% of the tumor cells expressing PD-L1 as measured by an automated IHC. In certain embodiments, "PD-L1 positive" means that there are at least 100 cells that express PD-L1 on the surface of the cells. In other embodiments, "PD-L1 positive" means that at least one tumor cell expresses PD-L1 on its surface in a tumor sample comprising at least 100 total tumor cells.

In one embodiment, a tumor derived from a NSCLC that is PD-L1 positive and that has a high TMB has a greater likelihood of response to a combination therapy comprising (1) an induction phase comprising administering to the subject a chemotherapy for a period of time that is less than the standard period of time for the chemotherapy, and (2) a post induction phase comprising administering to the subject an anti-PD-1 antibody or an anti-PD-L1 antibody after (1) than a tumor with only high TMB, only PD-L1 positive expression, or neither. In one embodiment, the tumor derived from a NSCLC has at least about 1%, about 5%, about 10%, about 15%, about 20%, about 25%, about 30%, about 35%, about 40%, about 45%, or about 50% PD-L1 expression. In a particular embodiment, a tumor derived from a NSCLC with ≥50% PD-L1 expression and a high TMB status is more likely to respond to a combination therapy with (a) an anti-PD-1 antibody or an anti-PD-L1 antibody and (b) an anti-CTLA-4 antibody than a tumor with only high TMB, only ≥50% PD-L1 expression, or neither.

In certain embodiments, the tumor in the subject suitable for a combination therapy disclosed herein does not express PD-L1 (less than 1%, less than 2%, less than 3%, less than 4%, or less than 5% membranous PD-L1). In some embodiments, the methods of the present disclosure are irrelevant to the PD-L1 expression.

MSI Status

TMB status can be used alone or in combination with other factors, e.g., MSI status, as a means to predict the responsiveness of a tumor derived from a NSCLC to a combination therapy disclosed herein. In one embodiment, the MSI status is part of the TMB status. In other embodiments, the MSI status is measured separately from the TMB status.

Microsatellite instability (MSI) is the condition of genetic hypermutability that results from impaired DNA mismatch repair (MMR). The presence of MSI represents phenotypic evidence that MMR is not functioning normally. In most cases, the genetic basis for instability in MSI tumors is an inherited germline alteration in any one of the five human MMR genes: MSH2, MLH1, MSH6, PMS2, and PMS1. In certain embodiments, the tumor derived from a NSCLC (e.g., colon tumor) has a high degree of microsatellite instability (MSI-H) and has at least one mutation in genes MSH2, MLH1, MSH6, PMS2, or PMS1. In other embodiments, subjects receiving tumor treatment within a control group have no microsatellite instability (MSS or MSI stable) and has no mutation in genes MSH2, MLH1, MSH6, PMS2, and PMS1.

In one embodiment, the subject suitable for a combination therapy disclosed herein has a high TMB status and a MSI-H tumor derived from a NSCLC. As used herein, MSI-H tumors mean tumors having greater than at least about 30% of unstable MSI biomarkers. In some embodiments, the tumor derived from a NSCLC is MSI-H when a germline alteration is detected in at least two, at least three, at least four, or at least five MMR genes. In other embodiments, the tumor derived from a NSCLC is MSI-H when a germline alteration is detected in at least 30% of five or more MMR genes. In some embodiments, a germline alternation in MMR genes is measured by a polymerase chain reaction. In other embodiments, the tumor derived from a NCSLC is MSI-H when at least one protein encoded by DNA MMR genes is not detected in the tumor. In some embodiments, the at least one protein encoded by DNA MMR genes is detected by an immunohistochemistry.

Tumors of the Disclosure

The present disclosure is directed to methods of treating a subject afflicted with a tumor. The tumor can be any type of tumor or can be a tumor derived from any type of tumor. In some embodiments, the tumor is selected from lung cancer, renal cell carcinoma, ovarian cancer, colorectal cancer, gastrointestinal cancer, esophageal cancer, bladder cancer, lung cancer, and melanoma. In some embodiments, the tumor is derived from a lung cancer, renal cell carcinoma, ovarian cancer, colorectal cancer, gastrointestinal cancer, esophageal cancer, bladder cancer, lung cancer, or melanoma. In some embodiments, the tumor is derived from a small cell lung cancer (SCLC). In some embodiments, the tumor is derived from a NSCLC. In certain embodiments, the NSCLC is a squamous NSCLC. In other embodiments, the NSCLC is a non-squamous NSCLC. In particular embodiments, the tumor is a stage IV NSCLC.

In some embodiments, the tumor is advanced. In certain embodiments, the tumor is locally advanced. In certain embodiments, the tumor is metastatic. In some embodiments, the tumor is refractory. In certain embodiments, the tumor is refractory to one or more prior therapy to treat the tumor. In particular embodiments, the tumor is refractory to one or more standard-of-care therapy to treat the tumor. In certain embodiments, the at least one prior therapy comprises a chemotherapy. In some embodiments, the at least one prior therapy comprises a platinum-based chemotherapy. In other embodiments, the patient has not received a prior therapy to treat the tumor, e.g., the patient is naïve. In some embodiments, the tumor is not refractory. In some embodiments, the tumor is recurrent.

NSCLC

NSCLC is the leading cause of cancer death in the U.S. and worldwide, exceeding breast, colon and prostate cancer combined. In the U.S., an estimated 228,190 new cases of lung and bronchial will be diagnosed in the U.S., and some 159,480 deaths will occur because of the disease (Siegel et al. (2014) *CA Cancer J Clin* 64(1):9-29). The majority of patients (approximately 78%) are diagnosed with advanced/recurrent or metastatic disease. Metastases to the adrenal gland from lung cancer are a common occurrence, with about 33% of patients having such metastases. NSCLC therapies have incrementally improved OS, but benefit has reached a plateau (median OS for late stage patients is just 1 year). Progression after 1 L therapy occurred in nearly all of these subjects and the 5-year survival rate is only 3.6% in the refractory setting. From 2005 to 2009, the overall 5-year relative survival rate for lung cancer in the U.S. was 15.9% (NCCN GUIDELINES®, Version 3.2014—Non-Small Cell Lung Cancer, available at: www.nccn.org/professionals/physician_gls/pdf/nscl.pdf, last accessed May 14, 2014).

The present methods can treat an NSCLC tumor at any stage. In certain embodiments, the tumor is derived from an NSCLC of any stage. There are at least seven stages used for NSCLC: occult (hidden) stage, Stage 0 (carcinoma in situ), Stage I, Stage II, Stage IIIA, Stage IIIB, and Stage IV. In the occult stage, the cancer cannot be seen by imaging or bronchoscopy. In Stage 0, cancer cells are found in the lining of the airways.

In one embodiment, the present methods treat a Stage I non-squamous NSCLC. Stage I NSCLC is divided in Stage IA and IB. In Stage IA, the tumor is in the lung only and is 3 centimeters or smaller. In Stage IB, the cancer has not spread to the lymph nodes and one or more of the following is true: 1) the tumor is larger than 3 centimeters but not larger than 5 centimeters; 2) the cancer has spread to the main bronchus and is at least 2 centimeters below where the trachea joins the bronchus; 3) cancer has spread to the innermost layer of the membrane that covers the lung; or 4) part of the lung has collapsed or developed pneumonitis (inflammation of the lung) in the area where the trachea joins the bronchus.

In another embodiment, the methods of the present disclosure treat a Stage II non-squamous NSCLC. Stage II NSCLC is divided into Stage IIA and IIB. In Stage IIA, the cancer has either spread to the lymph nodes or not. If the cancer has spread to the lymph nodes, then the cancer can only have spread to the lymph nodes on the same side of the chest as the tumor, the lymph nodes with cancer or within the lung or near the bronchus. and one or more of the following is true: 1) the tumor is not larger than 5 centimeters; 2) the cancer has spread to the main bronchus and is at least 2 centimeters below where the trachea joins the bronchus; 3) cancer has spread to the innermost layer of the membrane that covers the lung; or 4) part of the lung has collapsed or developed pneumonitis (inflammation of the lung) in the area where the trachea joins the bronchus. The tumor is also considered Stage IIA if the cancer has not spread to the lymph nodes and one or more of the following is true: 1) the tumor is larger than 5 centimeters but not larger than 7 centimeters; 2) the cancer has spread to the main bronchus and is at least 2 centimeters below where the trachea joins the bronchus; 3) cancer has spread to the innermost layer of the membrane that covers the lung; or 4) part of the lung has collapsed or developed pneumonitis (inflammation of the lung) in the area where the trachea joins the bronchus. In stage IIB, the cancer has either spread to the lymph nodes or not. If the cancer has spread to the lymph nodes, then the cancer can only have spread to the lymph nodes on the same side of the chest as the tumor, the lymph nodes with cancer are within the lung or near the bronchus and one or more of the following is true: 1) the tumor is larger than 5 centimeters but not larger than 7 centimeters; 2) the cancer has spread to the main bronchus and is at least 2 centimeters below where the trachea joins the bronchus; 3) cancer has spread to the innermost layer of the membrane that covers the lung; or 4) part of the lung has collapsed or developed pneumonitis (inflammation of the lung) in the area where the trachea joins the bronchus. The tumor is also considered Stage IIB if the cancer has not spread to the lymph nodes and one or more of the following is true: 1) the tumor is larger than 7 centimeters; 2) the cancer has spread to the main bronchus (and is at least 2 centimeters below where the trachea joins the bronchus), the chest wall, the diaphragm, or the nerve that controls the diaphragm; 3) cancer has spread to the membrane around the heart or lining the chest wall; 4) the whole lung has collapsed or developed pneumonitis (inflammation of the lung); or 5) there are one or more separate tumors in the same lobe of the lung.

In other embodiments, any methods of the present disclosure treat Stage III non-squamous NSCLC. Stage IIIA is divided into 3 sections. These 3 sections are based on 1) the size of the tumor; 2) where the tumor is found and 3) which (if any) lymph nodes have cancer. In the first type of Stage IIIA NSCLC, the cancer has spread to the lymph nodes on the same side of the chest as the tumor, and the lymph nodes with the cancer are near the sternum or where the bronchus enters the lung. Additionally: 1) the tumor can be any size; 2) part of the lung (where the trachea joins the bronchus) or the whole lung can have collapsed or developed pneumonitis (inflammation of the lung); 3) there can be one or more separate tumors in the same lobe of the lung; and 4) cancer can have spread to any of the following: a) main bronchus, but not the area where the trachea joins the bronchus, b) chest well, c) diaphragm and the nerve that controls it, d) membrane around the lung or lining the chest wall, e) membrane around the heart. In the second type of Stage IIIA NSCLC, the cancer has spread to the lymph nodes on the same side of the chest as the tumor, and the lymph nodes with the cancer are within the lung or near the bronchus. Additionally: 1) the tumor can be any size; 2) the whole lung can have collapsed or developed pneumonitis (inflammation of the lung); 3) there can be one or more separate tumors in the any of the lobes of the lung with cancer; and 4) cancer can have spread to any of the following: a) main bronchus, but not the area where the trachea joins the bronchus, b) chest well, c) diaphragm and the nerve that controls it, d) membrane around the lung or lining the chest wall, e) heart or the membrane around it, f) major blood vessels that lead to or from the heart, g) trachea, h) esophagus, i) nerve that controls the larynx (voice box), j) sternum (chest bone) or backbone, or k) carina (where the trachea joins the bronchi). In the third type of Stage IIIA NSCLC, the cancer has not spread to the lymph nodes, the tumor can be any size, and cancer has spread to any one of the following: a) heart, b) major blood vessels that lead to or from the heart, c) trachea, d) esophagus, e) nerve that controls the larynx (voice box), f) sternum (chest bone) or backbone, or g) carina (where the trachea joins the bronchi). Stage IIIB is divided into 2 sections depending on 1) the size of the tumor, 2) where the tumor is found, and 3) which lymph nodes have cancer. In the first type of Stage IIIB NSCLC, the cancer has spread to the lymph nodes on the opposite side of the chest as the tumor. Additionally, 1) the tumor can be any size; 2) part of the lung (where the trachea joins the bronchus) or the whole lung can have collapsed or developed pneumonitis (inflammation of the lung); 3) there can be one or more separate tumors in any of the lobs of the lung with cancer; and 4) cancer can have spread to any of the following: a) main bronchus, b) chest well, c) diaphragm and the nerve that controls it, d) membrane around the lung or lining the chest wall, e) heart or the membrane around it, f) major blood vessels that lead to or from the heart, g) trachea, h) esophagus, i) nerve that controls the larynx (voice box), j) sternum (chest bone) or backbone, or k) carina (where the trachea joins the bronchi). In the second type of Stage IIIB NSCLC, the cancer has spread to lymph nodes on the same side of the chest as the tumor. The lymph nodes with cancer are near the sternum (chest bone) or where the bronchus enters the lung. Additionally, 1) the tumor can be any size; 2) there can be separate tumors in different lobes of the same lung; and 3)

cancer has spread to any of the following: a) heart, b) major blood vessels that lead to or from the heart, c) trachea, d) esophagus, e) nerve that controls the larynx (voice box), f) sternum (chest bone) or backbone, or g) carina (where the trachea joins the bronchi).

In some embodiments, the methods of the disclosure treat a Stage IV non-squamous NSCLC. In Stage IV NSCLC, the tumor can be any size and the cancer can have spread to the lymph nodes. One or more of the following is true in Stage IV NSCLC: 1) there are one or more tumors in both lungs; 2) cancer is found in the fluid around the lungs or heart; and 3) cancer has spread to other parts of the body, such as the brain, liver, adrenal glands, kidneys or bone.

In some embodiments, the subject has never smoked. In certain embodiments, the subject has formerly smoked. In one embodiment, the subject currently smokes. In certain embodiments, the subject has cancer cells that are squamous. In certain embodiments, the subject has cancer cells that are non-squamous.

Standard-of-Care Therapies for Cancer

In some embodiments, the methods disclosed herein are used in place of standard of care therapies. In certain embodiments, a standard of care therapy is used in combination with any method disclosed herein. Standard-of-care therapies for different types of cancer are well known by persons of skill in the art. For example, the National Comprehensive Cancer Network (NCCN), an alliance of 21 major cancer centers in the USA, publishes the NCCN Clinical Practice Guidelines in Oncology (NCCN GUIDELINES®) that provide detailed up-to-date information on the standard-of-care treatments for a wide variety of cancers (see NCCN GUIDELINES®, 2014).

Colorectal Cancer

In some embodiments, the combination therapy treats a cancer, which is colorectal cancer. In embodiments, the colorectal cancer is colon cancer. In other embodiments, the colorectal cancer is rectal cancer. In certain embodiments, the colorectal cancer has microsatellite instability (MSI). (See Pawlik et al., *Dis. Markers* 20(4-5): 199-206 (2004)) In other embodiments, the colorectal cancer has low microsatellite instability (MSI-L).

Colorectal cancer is the third most common type of cancer in both men and women in the U.S. (See http://www.cancer.gov/types/colorectal, last visited Dec. 9, 2015). Most colorectal cancers are adenocarcinomas. Colon cancer presents in five stages: Stage 0 (Carcinoma in Situ), Stage I, Stage II, Stage III and Stage IV. Six types of standard treatment are used for colon cancer: 1) surgery, including a local excision, resection of the colon with anastomosis, or resection of the colon with colostomy; 2) radiofrequency ablation; 3) cryosurgery; 4) chemotherapy; 5) radiation therapy; and 6) targeted therapies, including monoclonal antibodies and angiogenesis inhibitors. In some embodiments, the combination therapy of the disclosure treats a colon cancer along with a standard of care therapy.

Rectal cancer presents in five stages: Stage 0 (Carcinoma in Situ), Stage I, Stage II, Stage III and Stage IV. Six types of standard treatment are used for rectal cancer: 1) Surgery, including polypectomy, local excision, resection, radiofrequency ablation, cryosurgery, and pelvic exenteration; 2) radiation therapy; 3) chemotherapy; and 4) targeted therapy, including monoclonal antibody therapy. In some embodiments, the methods of the disclosure treat a rectal cancer along with a standard of care therapy.

Lung Cancer

In some embodiments, the combination therapy of the disclosure treats a tumor, which is derived from a lung cancer. In certain embodiments the cancer is NSCLC. In embodiments, the NSCLC has a squamous histology. In other embodiments, the NSCLC has a nonsquamous histology.

NSCLC is the leading cause of cancer death in the U.S. and worldwide, exceeding breast, colon and prostate cancer combined. In the U.S., an estimated 228,190 new cases of lung and bronchial will be diagnosed in the U.S., and some 159,480 deaths will occur because of the disease (Siegel et al. (2014) *CA Cancer J Clin* 64(1):9-29). The majority of patients (approximately 78%) are diagnosed with advanced/recurrent or metastatic disease. Metastases to the adrenal gland from lung cancer are a common occurrence, with about 33% of patients having such metastases. NSCLC therapies have incrementally improved OS, but benefit has reached a plateau (median OS for late stage patients is just 1 year). Progression after 1 L therapy occurred in nearly all of these subjects and the 5-year survival rate is only 3.6% in the refractory setting. From 2005 to 2009, the overall 5-year relative survival rate for lung cancer in the U.S. was 15.9% (NCCN GUIDELINES®, Version 3.2014—Non-Small Cell Lung Cancer, available at: www.nccn.org/professionals/physician_gls/pdf/nscl.pdf, last accessed May 14, 2014).

There are seven stages of NSCLC: Occult non-small cell lung cancer, Stage 0 (carcinoma in situ), Stage I, Stage II, Stage IIIA, Stage IIIB, and Stage IV. In some embodiments, the combination therapy of the disclosure treats a NSCLC along with a standard of care therapy.

In addition, the present methods can also be combined with surgery, radiation therapy (RT) and chemotherapy that are the three modalities commonly used to treat NSCLC patients. As a class, NSCLCs are relatively insensitive to chemotherapy and RT, compared to small cell carcinoma. In general, for patients with Stage I or II disease, surgical resection provides the best chance for cure, with chemotherapy increasingly being used both pre-operatively and post-operatively. RT can also be used as adjuvant therapy for patients with resectable NSCLC, the primary local treatment, or as palliative therapy for patients with incurable NSCLC.

In one embodiment, the subject is a patient with Stage IV disease. Patients with Stage IV disease who have a good performance status (PS) benefit from chemotherapy. Many drugs, including platinum agents (e.g., cisplatin, carboplatin), taxanes agents (e.g., paclitaxel, albumin-bound paclitaxel, and docetaxel), vinorelbine, vinblastine, etoposide, pemetrexed and gemcitabine are useful for Stage IV NSCLC. Combinations using many of these drugs produce 1-year survival rates of 30% to 40% and are superior to single agents. Specific targeted therapies have also been developed for the treatment of advanced lung cancer. For example, bevacizumab (AVASTIN®) is a mAb that blocks vascular endothelial growth factor A (VEGF-A). Erlotinib (TARCEVA®) is a small-molecule TKI of epidermal growth factor receptor (EGFR). Crizotinib (XALKORI®) is a small-molecule TKI that targets ALK and MET, and is used to treat NSCLC in patients carrying the mutated ALK fusion gene. Cetuximab (ERBITUX®) is a mAb that targets EGFR.

In some embodiments, the present methods are used to treat a subject who has squamous NSCLC. In certain embodiments, the present methods are used in combination with a standard of care therapy. There is a particular unmet need among patients who have squamous cell NSCLC (representing up to 25% of all NSCLC) as there are few treatment options after first line (1 L) therapy. Single-agent chemotherapy is standard of care following progression with platinum-based doublet chemotherapy (Pt-doublet), resulting in median OS of approximately 7 months. Docetaxel remains the benchmark treatment in this line of therapy although erlotinib can also be used with less frequency. Pemetrexed has also been shown to produce clinically equivalent efficacy outcomes but with significantly fewer side effects compared with docetaxel in the second line (2 L) treatment of patients with advanced NSCLC (Hanna et al., 2004 *J Clin Oncol* 22:1589-97). No therapy is currently approved for use in lung cancer beyond the third line (3 L) setting. Pemetrexed and bevacizumab are not approved in squamous NSCLC, and molecularly targeted therapies have limited application. The unmet need in advanced lung cancer has been compounded by the recent failure of Oncothyreon and Merck KgaA's STIMUVAX® to improve OS in a phase 3 trial, inability of ArQule's and Daiichi Sankyo's c-Met kinase inhibitor, tivantinib, to meet survival endpoints, failure of Eli Lilly's ALIMTA® in combination with Roche's AVASTIN® to improve OS in a late-stage study, and Amgen's and Takeda Pharmaceutical's failure to meet clinical endpoints with the small-molecule VEGF-R antagonist, motesanib, in late-stage trials.

Certain aspects of the present disclosure are directed to methods of administering a chemotherapy for a period of time that is less than the standard period of time for the chemotherapy. In some embodiments, the standard period of time for a given chemotherapy is based on the standard-of-care therapy for the given cancer type. In certain embodiments, the tumor is derived from a NSCLC, and the chemotherapy is administered for less than the standard period of time for administering a standard-of-care chemotherapy for the treatment of NSCLC, e.g., stage IV NSCLC.

Standard-of-care therapies for different types of cancer are well known by persons of skill in the art. For example, the National Comprehensive Cancer Network (NCCN), an alliance of 21 major cancer centers in the USA, publishes the NCCN Clinical Practice Guidelines in Oncology (NCCN GUIDELINES®) that provide detailed up-to-date information on the standard-of-care treatments for a wide variety of cancers (see NCCN GUIDELINES® (2018), available at: www.nccn.org/professionals/physician_gls/default.aspx, last accessed Oct. 22, 2018, which is incorporated by reference herein in its entirety).

There is a particular unmet need among patients who have squamous cell NSCLC (representing up to 25% of all NSCLC) as there are few treatment options after first line (1 L) therapy. Single-agent chemotherapy is standard of care following progression with platinum-based doublet chemotherapy (Pt-doublet), resulting in median OS of approximately 7 months. Docetaxel remains the benchmark treatment in this line of therapy although erlotinib can also be used with less frequency. Pemetrexed has also been shown to produce clinically equivalent efficacy outcomes but with significantly fewer side effects compared with docetaxel in the second line (2 L) treatment of patients with advanced NSCLC (Hanna et al. (2004) *J Clin Oncol* 22:1589-97).

The NCCN Guidelines for treatment of NSCLC using a chemotherapy include, but are not limited to, a treatment selected from the following: (i) Cisplatin 75 mg/m$^2$ day 1 plus pemetrexed 500 mg/m$^2$ day 1 for nonsquamous every 21 days for four cycles; (ii) carboplatin AUC 6 day 1, paclitaxel 200 mg/m$^2$ day 1, every 21 days for four cycles; and (iii) carboplatin AUC 5 day 1, pemetrexed 500 mg/m$^2$ day 1 for nonsquamous every 21 days for four cycles. See NCCN Guidelines Version 6.2018 Non-Small Cell Lung Cancer. Other standard of care chemotherapy regimens include (iv) cisplatin 50 mg/m$^2$ days 1 and 8 and vinorelbine 25 mg/m$^2$ days 1, 8, 15, 22, every 28 days for four cycles; (v) cisplatin 100 mg/m$^2$ day 1 and vinorelbine 30 mg/m$^2$ days 1, 8, 15, 22, every 28 days for four cycles; (vi) cisplatin 75-80 mg/m$^2$ day 1 and vinorelbine 25-30 mg/m$^2$ days 1 an 8, every 21 days for four cycles; (vii) cisplatin 100 mg/m$^2$ day 1 and etoposide 100 mg/m$^2$ days 1-3, every 28 days for four cycles; (viii) cisplatin 75 mg/m$^2$ day 1 and gemcitabine 1250 mg/m$^2$ days 1 and 8, every 21 days for four cycles; (ix) cisplatin 75 mg/m$^2$ day 1 and docetaxel 75 mg/m$^2$ day 1, every 21 days for four cycles; and (x) carboplatin AUC 5 day 1, gemcitabine 1000 mg/m$^2$ days 1 and 8, every 21 days for four cycles. Accordingly, in some embodiments, the method of the present disclosure comprises administering an induction phase comprising administering a chemotherapy, e.g., a standard of care chemotherapy, for a period of time that is less than the standard period of time for the chemotherapy. In certain embodiments, the period of time is less than four cycles. In some embodiments, the period of time is less than three cycles. In some embodiments, the period of time is less than two cycles. In certain embodiments, the period of time is two cycles.

In some embodiments, the subject has been administered one or more prior therapy for the tumor. In certain embodiments, the at least one prior therapy comprises a standard-of-care therapy for the treatment of stage IV NSCLC or a tumor derived therefrom. In some embodiments, the at least one prior therapy comprises a surgery, a radiation therapy, a chemotherapy, an immunotherapy, or any combination thereof. In some embodiments, the at least one prior therapy comprises a chemotherapy. In some embodiments, the at least one prior therapy is selected from a therapy comprising administration of an anticancer agent selected from the group consisting of a platinum agent (e.g., cisplatin, carboplatin), a taxanes agent (e.g., paclitaxel, albumin-bound paclitaxel, docetaxel), vinorelbine, vinblastine, etoposide, pemetrexed, gemcitabine, bevacizumab (AVASTIN®), erlotinib (TARCEVA®), crizotinib (XALKORI®), cetuximab (ERBITUX®), and any combination thereof. In certain embodiments, the at least one prior therapy comprises a platinum-based doublet chemotherapy.

In some embodiments, the subject has experienced disease progression after the at least one prior therapy. In certain embodiments, the subject has received at least two prior therapies, at least three prior therapies, at least four prior therapies, or at least 5 prior therapies. In certain embodiments, the subject has received at least two prior therapies. In one embodiment, the subject has experienced disease progression after the at least two prior therapies. In certain embodiments, the at least two prior therapies comprises a first prior therapy and a second prior therapy, wherein the subject has experienced disease progression after the first prior therapy and/or the second prior therapy, and wherein the first prior therapy comprises a surgery, a radiation therapy, a chemotherapy, an immunotherapy, or any combination thereof, and wherein the second prior therapy comprises a surgery, a radiation therapy, a chemotherapy, an immunotherapy, or any combination thereof. In some embodiments, the first prior therapy comprises a platinum-based doublet chemotherapy, and the second prior therapy comprises a single-agent chemotherapy. In certain embodiments, the single-agent chemotherapy comprises docetaxel.

In some aspects of the present disclosure, the methods disclosed herein further comprise administering an additional anticancer therapy. The additional anticancer therapy can comprise any therapy known in the art for the treatment of an NSCLC or a tumor derived therefrom and/or any standard-of-care therapy, as disclosed herein. In some embodiments, the additional anticancer therapy comprises a surgery, a radiation therapy, an additional chemotherapy, an additional immunotherapy, or any combination thereof. In some embodiments, the additional anticancer therapy comprises an additional chemotherapy, including any chemotherapy disclosed herein. In some embodiments, the additional anticancer therapy comprises an additional immunotherapy. In some embodiments, the additional anticancer therapy comprises administration of an antibody or antigen-binding portion thereof that specifically binds LAG3, TIGIT, TIM3, NKG2a, OX40, ICOS, MICA, CD137, KIR, TGFβ, IL-10, IL-8, B7-H4, Fas ligand, CXCR4, mesothelin, CD27, GITR, or any combination thereof.

In certain embodiments, the additional anticancer therapy is administered concurrently with, after, or concurrently with and after the administration of the anti-PD-1 antibody (or the anti-PD-L1 antibody) and an anti-CTLA-4 antibody. In some embodiments, the additional anticancer therapy is administered concurrently with the administration of the anti-PD-1 antibody (or the anti-PD-L1 antibody) and an anti-CTLA-4 antibody. In some embodiments, the additional anticancer therapy is administered after the administration of the anti-PD-1 antibody (or the anti-PD-L1 antibody) and an anti-CTLA-4 antibody. In some embodiments, the additional anticancer therapy is administered concurrently with and after the administration of the anti-PD-1 antibody (or the anti-PD-L1 antibody) and an anti-CTLA-4 antibody. In other embodiments, the additional anticancer therapy is administered between the anti-PD-1 antibody (or the anti-PD-L1 antibody) and an anti-CTLA-4 antibody. In certain embodiments, the additional anticancer therapy, the anti-PD-1 antibody (or the anti-PD-L1 antibody), and/or an anti-CTLA-4 antibody are combined in a single formulation. In other embodiments, the additional anticancer therapy, the anti-PD-1 antibody (or the anti-PD-L1 antibody), and/or an anti-CTLA-4 antibody are in separate formulations.

Melanoma

In some embodiments, the combination therapy treats a tumor, which is derived from a melanoma. Melanoma is the most deadly form of skin cancer, and is the fifth most common cancer diagnosis in men and the seventh most common cancer diagnosis in women. (See http://www.cancer.gov/types/skin, last visited Dec. 9, 2015). Melanoma presents in seven stages: Stage 0 (Melanoma in situ), Stage I, Stage II, Stage III that can be removed by surgery, Stage III that cannot be removed by surgery, Stage IV, and Recurrent Melanoma. Five standard types of treatment are used: 1) surgery; 2) chemotherapy; 3) radiation therapy and 4) biologic therapy, including interferon, interleukin-2 (IL-2), tumor necrosis factor (TNF) therapy, and ipilimumab, and 5) targeted therapy, including signal transduction inhibitor therapy (e.g., vemurafenib, dabrafenib, and trametinib), oncolytic virus therapy, monoclonal antibody therapy (including pembrolizumab and nivolumab), and angiogenesis inhibitors. In some embodiments, the combination therapy of the disclosure treats a melanoma along with a standard of care therapy Ovarian Cancer In certain embodiments, the combination therapy treats a tumor, which is derived from an ovarian, fallopian tube and/or primary peritoneal cancer ("ovarian cancer"). In certain embodiments, the cancer is ovarian epithelial cancer. In other embodiments, the cancer is ovarian germ cell tumor. In yet other embodiments, the cancer is an ovarian low malignant potential tumor. In embodiments, the ovarian cancer begins in the tissue that covers the ovaries, the peritoneum or the fallopian tube. (See http://www.cancer.gov/types/ovarian/patient/ovarian-epithelial-treatment-pdq, last visited Dec. 9, 2015).

There are four stages of ovarian cancer: Stage I, Stage II, Stage III, and Stage IV, which encompass early, advanced and recurrent or persistent ovarian cancer. There are four types of standard treatments that are used for patients with ovarian, fallopian tube and primary peritoneal cancer: 1) surgery, including hysterectomy, unilateral salpingo-oophorectomy, bilateral salpingo-oophorectomy, omentectomy, and lymph node biopsy; 2) radiation therapy; 3) chemotherapy; and 4) targeted therapy, including monoclonal antibody therapy and poly (ADP-ribose) polymerase inhibitors. Biologic therapies are also being tested for ovarian cancer. In some embodiments, the combination therapy of the disclosure treats an ovarian cancer along with a standard of care therapy.

There are four stages of ovarian germ cell tumors: Stage I, Stage II, Stage III and Stage IV. Four types of standard treatment are used: 1) surgery, including unilateral salpingo-oophorectomy, total hysterectomy, bilateral salpingo-oophorectomy, and tumor debulking; 2) observation; 3) chemotherapy and 4) radiation therapy. New treatment options being considered include high-dose chemotherapy with bone marrow transplant. In some embodiments, the combination therapy of the disclosure treats an ovarian germ cell tumor along with a standard of care therapy.

There are 3 stages of ovarian low malignant potential tumors: 1) early stage (Stage I and II), 2) late stage (Stage III and IB) and 3) recurrent. Two types of standard treatment are used: 1) surgery, including unilateral salpingo-oophorectomy, bilateral salpingo-oophorectomy, total hysterectomy, partial oophorectomy, and omentectomy and 2) chemotherapy. In some embodiments, the combination therapy of the disclosure treats an ovarian low malignant potential tumor along with a standard of care therapy.

Head and Neck Cancer

In some embodiments, the combination therapy treats a cancer, which is head and neck cancer. Head and neck cancers include cancers of the oral cavity, pharynx, larynx, paranasal sinuses and nasal cavity and salivary glands. Head and neck cancers usually begin in the squamous cells that line the moist, mucosal surfaces inside the head and neck (for example, inside the mouth, the nose, and the throat). These squamous cell cancers are often referred to as squamous cell carcinomas of the head and neck. Head and neck cancers can also begin in the salivary glands, but salivary gland cancers are relatively uncommon. (ee http://www.cancer.gov/types/head-and-neck/head-neck-fact-sheet, last visited Dec. 9, 2015). The treatment plan for an individual patient depends on a number of factors, including the exact location of the tumor, the stage of the cancer, and the person's age and general health. Treatment for head and neck cancer can include surgery, radiation therapy, chemotherapy, targeted therapy, or a combination of treatments. In some embodiments, the combination therapy of the disclosure treats a head and neck cancer along with a standard of care therapy.

Pharmaceutical Compositions and Dosages

Therapeutic agents of the present disclosure can be constituted in a composition, e.g., a pharmaceutical composition containing an antibody and/or a cytokine and a pharmaceutically acceptable carrier. As used herein, a "pharmaceutically acceptable carrier" includes any and all solvents, dispersion media, coatings, antibacterial and antifungal agents, isotonic and absorption delaying agents, and the like that are physiologically compatible. Preferably, the carrier for a composition containing an antibody is suitable for intravenous, intramuscular, subcutaneous, parenteral, spinal or epidermal administration (e.g., by injection or infusion), whereas the carrier for a composition containing an antibody and/or a cytokine is suitable for non-parenteral, e.g., oral, administration. In some embodiments, the subcutaneous injection is based on Halozyme Therapeutics' ENHANZE® drug-delivery technology (see U.S. Pat. No. 7,767,429, which is incorporated by reference herein in its entirety). ENHANZE® uses a co-formulation of an antibody with recombinant human hyaluronidase enzyme (rHuPH20), which removes traditional limitations on the volume of biologics and drugs that can be delivered subcutaneously due to the extracellular matrix (see U.S. Pat. No. 7,767,429). A pharmaceutical composition of the disclosure can include one or more pharmaceutically acceptable salts, anti-oxidant, aqueous and non-aqueous carriers, and/or adjuvants such as preservatives, wetting agents, emulsifying agents and dispersing agents. Therefore, in some embodiments, the pharmaceutical composition for the present disclosure can further comprise recombinant human hyaluronidase enzyme, e.g., rHuPH20.

In some embodiments, the anti-PD-1 antibody or the anti-PD-L1 antibody is administered in a fixed dose with the anti-CTLA-4 antibody in a single composition. In some embodiments, the anti-PD-1 antibody is administered in a fixed dose with the anti-CTLA-4 antibody. In some embodiments, the anti-PD-L1 antibody is administered in a fixed dose with the anti-CTLA-4 antibody in a single composition. In some embodiments, the ratio of the anti-PD-1 antibody or the anti-PD-L1 antibody to the anti-CTLA-4 antibody is at least about 1:1, about 1:2, about 1:3, about 1:4, about 1:5, about 1:6, about 1:7, about 1:8, about 1:9, about 1:10, about 1:15, about 1:20, about 1:30, about 1:40, about 1:50, about 1:60, about 1:70, about 1:80, about 1:90, about 1:100, about 1:120, about 1:140, about 1:160, about 1:180, about 1:200, about 200:1, about 180:1, about 160:1, about 140:1, about 120:1, about 100:1, about 90:1, about 80:1, about 70:1, about 60:1, about 50:1, about 40:1, about 30:1, about 20:1, about 15:1, about 10:1, about 9:1, about 8:1, about 7:1, about 6:1, about 5:1, about 4:1, about 3:1, or about 2:1 mg.

Although higher nivolumab monotherapy dosing up to 10 mg/kg every two weeks has been achieved without reaching the maximum tolerated does (MTD), the significant toxicities reported in other trials of checkpoint inhibitors plus anti-angiogenic therapy (see, e.g., Johnson et al., 2013; Rini et al., 2011) support the selection of a nivolumab dose lower than 10 mg/kg.

Treatment is continued as long as clinical benefit is observed or until unacceptable toxicity or disease progression occurs. Nevertheless, in certain embodiments, the dosages of the anti-PD-1 antibody, the anti-PD-L1 antibody, and/or the anti-CTLA-4 antibody administered are significantly lower than the approved dosage, i.e., a subtherapeutic dosage, of the agent. The anti-PD-1 antibody, the anti-PD-L1 antibody, and/or the anti-CTLA-4 antibody can be administered at the dosage that has been shown to produce the highest efficacy as monotherapy in clinical trials, e.g., about 3 mg/kg of nivolumab administered once every three weeks (Topalian et al., 2012a; Topalian et al., 2012), or at a significantly lower dose, i.e., at a subtherapeutic dose.

Dosage and frequency vary depending on the half-life of the antibody in the subject. In general, human antibodies show the longest half-life, followed by humanized antibodies, chimeric antibodies, and nonhuman antibodies. The dosage and frequency of administration can vary depending on whether the treatment is prophylactic or therapeutic. In prophylactic applications, a relatively low dosage is typically administered at relatively infrequent intervals over a long period of time. Some patients continue to receive treatment for the rest of their lives. In therapeutic applications, a relatively high dosage at relatively short intervals is sometimes required until progression of the disease is reduced or terminated, and preferably until the patient shows partial or complete amelioration of symptoms of disease. Thereafter, the patient can be administered a prophylactic regime.

Actual dosage levels of the active ingredients in the pharmaceutical compositions of the present disclosure can be varied so as to obtain an amount of the active ingredient which is effective to achieve the desired therapeutic response for a particular patient, composition, and mode of administration, without being unduly toxic to the patient. The selected dosage level will depend upon a variety of pharmacokinetic factors including the activity of the particular compositions of the present disclosure employed, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors well known in the medical arts. A composition of the present disclosure can be administered via one or more routes of administration using one or more of a variety of methods well known in the art. As will be appreciated by the skilled artisan, the route and/or mode of administration will vary depending upon the desired results.

Kits

Also within the scope of the present disclosure are kits comprising (a) a chemotherapeutic agent, (b) an anti-PD-1 antibody or an anti-PD-L1 antibody, and (c) an anti-CTLA-4 antibody for therapeutic uses. Kits typically include a label indicating the intended use of the contents of the kit and instructions for use. The term label includes any writing, or recorded material supplied on or with the kit, or which otherwise accompanies the kit. In some embodiments, this disclosure provides a kit for treating a subject afflicted with a tumor, e.g., a tumor derived from a NSCLC, the kit comprising: (a) a dose of carboplatin sufficient to administer a dosage of AUC 6, and a dosage of 200 mg/m$^2$ of paclitaxel; (b) a dosage ranging from 200 mg to 800 mg of an anti-PD-1 antibody or a dosage ranging from 200 mg to 1800 mg of an anti-PD-L1 antibody; (c) a dosage ranging from 0.1 to 10 mg/kg body weight of an anti-CTLA-4 antibody; (d) instructions for using (a) the carboplatin and the paclitaxel; (b) the anti-PD-1 antibody or the anti-PD-L1 antibody; and (c) the anti-CTLA-4 antibody in the methods disclosed herein. In some embodiments, this disclosure provides a kit for treating a subject afflicted with a tumor, e.g., a tumor derived from a NSCLC, the kit comprising: (a) a dose of carboplatin sufficient to administer a dose of AUC 5, and a dosage of 500 mg/m$^2$ pemetrexed; (b) a dosage ranging from 200 mg to 800 mg of an anti-PD-1 antibody or a dosage ranging from 200 mg to 1800 mg of an anti-PD-L1 antibody; (c) a dosage ranging from 0.1 to 10 mg/kg body weight of an anti-CTLA-4 antibody; (d) instructions for using (a) the carboplatin and the pemetrexed; (b) the anti-PD-1 antibody or the anti-PD-L1 antibody; and (c) the anti-CTLA-4 antibody in the methods disclosed herein. In some embodiments, this disclosure provides a kit for treating a subject afflicted with a tumor, e.g., a tumor derived from a NSCLC, the kit comprising: (a) a dose of carboplatin sufficient to administer a dose of AUC 6, and a dosage of 500 mg/m² pemetrexed; (b) a dosage ranging from 200 mg to 800 mg of an anti-PD-1 antibody or a dosage ranging from 200 mg to 1800 mg of an anti-PD-L1 antibody; (c) a dosage ranging from 0.1 to 10 mg/kg body weight of an anti-CTLA-4 antibody; (d) instructions for using (a) the carboplatin and the pemetrexed; (b) the anti-PD-1 antibody or the anti-PD-L1 antibody; and (c) the anti-CTLA-4 antibody in the methods disclosed herein. In some embodiments, this disclosure provides a kit for treating a subject afflicted with a tumor, e.g., a tumor derived from a NSCLC, the kit comprising: (a) a dosage of 75 mg/m² cisplatin and a dosage of 500 mg/m² pemetrexed; (b) a dosage ranging from 200 mg to 800 mg of an anti-PD-1 antibody or a dosage ranging from 200 mg to 1800 mg of an anti-PD-L1 antibody; (c) a dosage ranging from 0.1 to 10 mg/kg body weight of an anti-CTLA-4 antibody; (d) instructions for using (a) the cisplatin and the pemetrexed; (b) the anti-PD-1 antibody or the anti-PD-L1 antibody; and (c) the anti-CTLA-4 antibody in the methods disclosed herein.

In certain preferred embodiments for treating human patients, the kit comprises an anti-human PD-1 antibody disclosed herein, e.g., nivolumab or pembrolizumab. In certain preferred embodiments for treating human patients, the kit comprises an anti-human PD-L1 antibody disclosed herein, e.g., atezolizumab, durvalumab, or avelumab. In certain preferred embodiments for treating human patients, the kit comprises an anti-human CTLA-4 antibody disclosed herein, e.g., ipilimumab, tremelimumab, MK-1308, or AGEN-1884.

In some embodiments, the kit further comprises a cytokine or a variant thereof. In certain embodiments the kit comprises (a) an anti-PD-1 antibody or an anti-PD-L1 antibody, (b) an anti-CTLA-4 antibody, and (c) a CD122 agonist.

In some embodiments, the kit further includes a comprehensive genomic profiling assay disclosed herein. In some embodiments, the kit includes a FOUNDATIONONE® CDX™ genomic profiling assay. In some embodiments, the kit further includes instructions to administer (a) the anti-PD-1 antibody or the anti-PD-L1 antibody and (b) the anti-CTLA-4 antibody to a subject identified as having a high TMB status, e.g., a TMB status of at least about 10 mutations/Mb of genome sequenced, according to the methods disclosed herein. In other embodiments, the kit further includes instructions to administer (a) the anti-PD-1 antibody or the anti-PD-L1 antibody, (b) the anti-CTLA-4 antibody, and (c) the cytokine, e.g., the CD122 agonist, to a subject identified as having a high TMB status, e.g., a TMB status of at least about 10 mutations/Mb of genome sequenced, according to the methods disclosed herein.

In certain embodiments, the kit further includes an assay for detecting and/or measuring tumor cell surface PD-L1 expression. In certain embodiments, the kit further includes a Dako PD-L1 IHC 28-8 pharmDx test for IHC staining of tumor cell surface PD-L1 protein.

All of the references cited above, as well as all references cited herein, are incorporated herein by reference in their entireties.

The following examples are offered by way of illustration and not by way of limitation.

EXAMPLES

Example 1: A Study of Nivolumab in Combination with Ipilimumab as First Line Therapy for the Treatment of Stage IV Non-Small Cell Lung Cancer (NSCLC)

A clinical trial is ongoing to study the safety and efficacy of first line treatment of stage IV NSCLC using a combination of nivolumab and ipilimumab. Nivolumab is administered intravenously over 30 minutes at 3 mg/kg every 2 weeks combined with ipilimumab administered intravenously over 30 minutes at 1 mg/kg every 6 weeks until progression, unacceptable toxicity, or other pre-specified reasons. Treatment with nivolumab and ipilimumab will be given for a maximum of 2 years from the start of study treatment in the absence of disease progression or unacceptable toxicity.

Objectives

The primary objectives of the present study are (i) to determine the objective response rate (ORR) in all treated PD-L1 positive (membranous staining in ≥1% tumor cells) subjects by blinded independent central review per RECIST 1.1 in stage IV NSCLC subjects treated with nivolumab in combination with ipilimumab as first line therapy; and (ii) to determine the ORR in all treated PD-L1 negative (≤1%) subjects by blinded independent central review per RECIST 1.1 in stage IV NSCLC subjects treated with nivolumab in combination with ipilimumab as first line therapy.

Secondary objectives include: (i) to assess ORR by blinded independent central review per RECIST 1.1 in all treated subjects treated with nivolumab in combination with ipilimumab as first line therapy; (ii) to assess progression free survival (PFS) based on blinded independent central review assessment per RECIST 1.1; (iii) to assess overall survival; (iv) to assess ORR, PFS, and OS by PD-L1 expression levels; and (v) to evaluate tumor mutation burden (TMB) as a potential predictive biomarker of efficacy (such as ORR, PFS and OS) of nivolumab in combination with ipilimumab using DNA derived from tumor specimens.

Exploratory objectives include: (i) to assess safety and tolerability, pharmacokinetics and immunogenicity of nivolumab in combination with ipilimumab as first line therapy; and (ii) to evaluate tumor inflammatory gene expression signatures as potential predictive biomarkers of efficacy (such as ORR, PFS and OS) of nivolumab in combination with ipilimumab using RNA derived from tumor specimens.

Study Design

Approximately 300 subjects having stage IV NSCLC will be enrolled and treated with the combination therapy, including at least 120 PD-L1 positive subjects and at least 100 PD-L1 negative subjects. Subjects will be administered nivolumab 3 mg/kg once every two weeks and ipilimumab 1 mg/kg once every six weeks. On the day of infusion, nivolumab is to be administered first. The second infusion will always be ipilimumab (if ipilimumab is scheduled to be given), and will start at least 30 minutes after completion of the nivolumab infusion. Subjects will receive the combination therapy until disease progression or unacceptable toxicity, or for a maximum of two years.

Subjects are permitted the use of topical, ocular, intraarticular, intranasal, and inhalational corticosteroids (with minimal systemic absorption). Adrenal replacement steroid doses >10 mg daily prednisone are permitted. A brief (less than 3 weeks) course of corticosteroids for prophylaxis (e.g., contrast dye allergy) or for treatment of non-autoimmune conditions (e.g., delayed-type hypersensitivity reaction caused by a contact allergen) is permitted. Regular concomitant use of bisphosphonates and RANK-L inhibitors for prevention or reduction of skeletal-related events in patients with bone metastases is allowed if initiated prior to first dose of study therapy. Prior palliative radiotherapy must have been completed at least 2 weeks prior to treatment.

Inclusion/Exclusion Criteria

Eligible subjects must have histologically confirmed stage IV NSCLC (per the 7th International Association for the Study of Lung Cancer classification) squamous or non-squamous histology and measurable disease by CT or MRI per RECIST 1.1 criteria. Subjects must have had no prior systemic therapy for stage IV disease. Prior definitive chemoradiation for locally advanced disease is permitted as long as the last administration of chemotherapy or radiotherapy (which ever was given last) occurred at least six months prior to enrollment. Locally advanced disease with recurrence after concurrent chemoradiation therapy (stage IIIB, specifically refers to patients with no curative treatment options) is eligible to enroll. Prior adjuvant or neoadjuvant chemotherapy for early stage lung cancer is permitted if completed at least six months before initiating study treatment. Subjects must be EGFR/ALK wild type and must have an EXOG PS of 0 or 1. Subject must have a tumor tissue sample available for PD-L1 immunohistochemical (IHC) testing.

Either a formalin-fixed, paraffin-embedded (FFPE) tissue block or unstained tumor tissue sections, with an associated pathology report, must be submitted for biomarker evaluation prior to treatment. The tumor tissue sample may be fresh or archival if obtained within 6 months prior to enrollment, and there can have been no systemic therapy (e.g., adjuvant or neoadjuvant chemotherapy) given after the sample was obtained. Tissue samples must be collected by a core needle biopsy, excisional or incisional biopsy. Fine needle biopsies or drainage of pleural effusions with cytospins are not considered adequate for biomarker review. Biopsies of bone lesions that do not have a soft tissue component or decalcified bone tumor samples are also not acceptable.

Subjects are excluded that have known EGFR mutations, which are sensitive to available targeted inhibitor therapy (including, but not limited to, deletions in exon 19 and exon 21 [L858R] substitution mutations) are excluded. All subjects with non-squamous histology must have been tested for EGFR mutation status. EGFR test is to be done locally. Use of an FDA-approved or local Health Authority approved test is strongly encouraged. Tests other than PCR or next generation sequencing will be requested to repeat using PCR or next generation sequencing based method. Subjects with non-squamous histology with unknown or indeterminate EGFR status are excluded.

Subjects with known ALK translocations which are sensitive to available targeted inhibitor therapy are excluded. ALK tests are to be done at local lab and use of a FDA-approved test is strongly encouraged. Subjects with unknown or indeterminate ALK status may be enrolled.

Subjects with untreated CNS metastases are excluded. Subjects are eligible if CNS metastases are adequately treated and subjects are neurologically returned to baseline (except for residual signs or symptoms related to the CNS treatment) for at least 2 weeks prior to first dose. In addition, subjects must be either off corticosteroids, or on a stable or decreasing dose of ≤10 mg daily prednisone (or equivalent) for at least 2 weeks prior to first dose.

Subjects with carcinomatous meningitis or an active, known or suspected autoimmune disease are excluded. Subjects with type I diabetes mellitus, hypothyroidism only requiring hormone replacement, skin disorders (such as vitiligo, psoriasis, or alopecia) not requiring systemic treatment, or conditions not expected to recur in the absence of an external trigger are permitted to enroll.

Subjects with a condition requiring systemic treatment with either corticosteroids (>10 mg daily prednisone equivalent) or other immunosuppressive medications within 14 days of first treatment are excluded. Inhaled or topical steroids, and adrenal replacement steroid >10 mg daily prednisone equivalent, are permitted in the absence of active autoimmune disease.

Subjects with history of screen failure to any anti-PD-L1 or anti-PD-L1 antibody clinical trial due to PD-L1-negative status are also excluded.

Study Assessments

Subjects will be assessed for PD-L1 expression in tumor cells, and categorized into 4 groups (PD-L1 positive, PD-L1 negative, PD-L1≥50%, and PD-L1 not quantifiable). PD-L1 status will be determined by Dako PD-L1 IHC 28-8 pharmDx test for IHC staining of PD-L1 protein in the submitted tumor samples. PD-L1 positive is characterized by ≥1% tumor cell membrane staining in a minimum of a hundred evaluable tumor cells. PD-L1 negative is characterized by <1% tumor cell membrane staining in a minimum of a hundred evaluable tumor cells. PD-L1≥50% is characterized by ≥50% tumor cell membrane staining in a minimum of a hundred evaluable tumor cells and is a subset of all PD-L1 positive subjects. PD-L1 not quantifiable is defined as subjects with no quantifiable PD-L1 expression at baseline which is likely due to insufficient tumor biopsy specimens for IHC staining and analysis. For subjects with PD-L1 not quantifiable status tumors key efficacy and safety parameters will be summarized in a descriptive way.

On-study tumor assessments by CT or MRI will begin 6 weeks post first dose date (+/−7 days) and be performed every 6 weeks (+/−7 days) until week 48. After week 48, tumor assessments will be performed every 12 weeks (+/−7 days) until disease progression is documented or treatment is discontinued (whichever occurs later).

Treatment beyond initial RECIST 1.1 defined progression is permitted in subjects receiving nivolumab and ipilimumab containing treatment if the subject has investigator assessed clinical benefit and is tolerating nivolumab plus ipilimumab. Subjects receiving investigational treatment beyond investigator-assessed progression must also continue tumor assessments until such treatment has been discontinued.

OS will be followed continuously while subjects are on the study drugs and every 3 months via in-person or phone contact after subject discontinued the study drugs.

Endpoints

The primary endpoints are (i) the objective response rate (ORR) in all treated PD-L1 positive (≥1%) subjects by blinded independent central review per RECIST 1.1 in stage IV NSCLC subjects treated with nivolumab in combination with ipilimumab as first line therapy; and (ii) the ORR in all treated PD-L1 negative (<1%) subjects by blinded independent central review per RECIST 1.1 in stage IV NSCLC subjects treated with nivolumab in combination with ipilimumab as first line therapy.

ORR is based on blinded independent central review assessment per RECIST 1.1 criteria. ORR is defined as the number of subjects with a best overall response (BOR) of confirmed CR or PR, divided by the number of treated subjects among PD-L1 positive or PD-L1 negative subjects or all treated subjects. BOR is defined as the best response designation recorded between baseline and the date of objectively documented progression per RECIST 1.1 or the date of initiation of palliative local therapy or the date of initiation of subsequent anticancer therapy, whichever occurs first.

Blinded independent central review determined PFS is defined as the time from the first dosing date for treated subjects to the date of the first documented tumor progression as determined by blinded independent central review (per RECIST 1.1), or death due to any cause. Subjects who did not progress or die will be censored on the date of their last evaluable tumor assessment. Subjects who did not have any on study tumor assessments will be censored at the first dose date for subjects. Subjects who started any palliative local therapy or subsequent anti-cancer therapy without a prior reported progression will be censored on the date of their last evaluable tumor assessment prior to the initiation of the palliative local therapy or subsequent anti-cancer therapy, whichever procedure occurred first.

The secondary endpoints are (i) ORR by blinded independent central review per RECIST 1.1 in all treated subjects treated with nivolumab in combination with ipilimumab as first line therapy; (ii) PFS based on blinded independent central review assessment per RECIST 1.1; (iii) OS; (iv) ORR, PFS, and OS by PD-L1 expression levels; and (iv) tumor cell total somatic mutations and their association with ORR, PFS, and OS. OS is defined as the time between the date of the first dosing date and the date of death due to any cause.

Example 2: A Study of Nivolumab Plus Ipilimumab in Combination with Chemotherapy as First Line Therapy for the Treatment of Stage IV Non-Small Cell Lung Cancer (NSCLC)

A clinical trial is ongoing to study the safety and tolerability of phase-in, first line treatment of stage IV NSCLC using a combination of nivolumab, ipilimumab, and chemotherapy. Nivolumab is administered intravenously and ipilimumab is administered intravenously together with 2 cycles of histology-based platinum doublet chemotherapy as an induction treatment, followed by nivolumab and ipilimumab until disease progression or unacceptable toxicity. Treatment with nivolumab and ipilimumab will be given for a maximum of 2 years from the start of study treatment in the absence of disease progression or unacceptable toxicity.

The two cycles of histology-based platinum doublet chemotherapy include carboplatin AUC 6 plus paclitaxel 200 mg/m$^2$ for squamous histology, and (i) carboplatin AUC 5 or 6 plus pemetrexed 500 mg/m$^2$ or (ii) cisplatin 75 mg/m$^2$+ pemetrexed 500 mg/m$^2$ for non-squamous histology.

Objectives

The primary objectives of the present study are (i) to determine the incidence of DLT (dose limiting toxicity) during DLT evaluation period (within 9 weeks after first dose); and (ii) to determine the safety and tolerability of nivolumab and ipilimumab combined with chemotherapy.

A secondary objective is to assess ORR and PFS by investigator review using RECIST 1.1, and OS.

Exploratory objectives include: (i) to assess overall health status, using the EQ-5D descriptive system and visual analogue scale, and lung cancer symptoms, as measured by the Lung Cancer Symptom Scale (LCSS) average symptom burden index (ASBI), in subjects receiving nivolumab in combination with ipilimumab plus chemotherapy; (ii) to evaluate tumor inflammatory gene expression signatures as potential predictive biomarkers of efficacy (such as ORR, PFS and OS) of nivolumab plus ipilimumab in combination with chemotherapy using RNA derived from tumor specimens; and (iii) to explore TMB as a potential predictive biomarker of efficacy (such as ORR, PFS and OS) of nivolumab plus ipilimumab in combination with chemotherapy using DNA derived from tumor specimens.

Study Design

The safety lead-in phase will be conducted to evaluate safe dose level. Approximately 28 subjects (in order to achieve at least 22 DLT evaluable subjects) will receive 2 cycles of induction chemotherapy and nivolumab plus ipilimumab (FIG. 1). The starting dose of nivolumab is 360 mg every 3 weeks and ipilimumab is 1 mg/kg every 6 weeks. Nivolumab will be administered with ipilimumab, plus two cycles of histology-based platinum doublet chemotherapy. For squamous histology, carboplatin AUC 6 plus paclitaxel 200 mg/m$^2$ will be administered. For non-squamous histology, (i) carboplatin AUC 5 or 6 plus pemetrexed 500 mg/m$^2$ or (ii) cisplatin 75 mg/m$^2$ plus pemetrexed 500 mg/m$^2$ will be administered.

After the two cycles of induction therapy, nivolumab is administered intravenously over 30 minutes combined with ipilimumab administered intravenously over 30 minutes until progression, unacceptable toxicity, or other reasons specified in the protocol. Treatment with nivolumab and ipilimumab will be given for a maximum of 2 years from the start of study treatment in the absence of disease progression or unacceptable toxicity.

"Safe" is defined as 25% evaluated subjects or less exhibit DLTs (i.e., 5 or less subjects with such events out of 22 DLT evaluable subjects).

A safety assessment will be performed on the first 10 subjects after a minimum of 9 weeks of follow-up. If 20% or less of the first 10 subjects exhibit DLTs (i.e., 2 or less subjects with such events), the regimen is determined safe and enrollment in subsequent studies using this combination may start while the safety lead in phase is ongoing. If more than 20% of the first 10 subjects exhibit DLTs, the full safety cohort will be evaluated prior to using this dose regimen in subsequent studies. If more than 25% of the overall DLT evaluable subjects exhibit DLTs, the protocol may be amended to evaluate different dose levels, depending on the toxicities observed.

After above 2 cycles of induction treatment, nivolumab and ipilimumab will continue until disease progression or unacceptable toxicity, withdrawal of consent, or for a maximum of 2 years from the start of study treatment in in the absence of disease progression or inacceptable toxicity.

During the safety lead-in phase, subjects are permitted the use of topical, ocular, intra-articular, intranasal, and inhalational corticosteroids (with minimal systemic absorption). Adrenal replacement steroid doses >10 mg daily prednisone are permitted. A brief (less than 3 weeks) course of corticosteroids for prophylaxis (e.g., contrast dye allergy) or for treatment of non-autoimmune conditions (e.g., delayed-type hypersensitivity reaction caused by a contact allergen) is permitted. Regular concomitant use of bisphosphonates and RANK-L inhibitors for prevention or reduction of skeletal-related events in patients with bone metastases is allowed if initiated prior to first dose of study therapy. Prior palliative radiotherapy must have been completed at least 2 weeks prior to treatment.

Inclusion/Exclusion Criteria and Study Assessments

Inclusion and exclusion criteria and study assessments are the same as in Example 1, except that the tumor tissue sample may be fresh or archival if obtained within 3 months prior to enrollment.

Endpoints

The primary endpoints are (i) to determine the incidence of DLT within nine weeks after first dose; and (ii) to determine the safety and tolerability of nivolumab and ipilimumab combined with chemotherapy. A secondary endpoint is to evaluate ORR and PFS by investigator assessment using RECIST 1.1, and OS. OS is defined as the time between the date of the first dosing date and the date of death due to any cause.

Blinded independent central review determined PFS is defined as the time from the first dosing date for treated subjects to the date of the first documented tumor progression as determined by blinded independent central review (per RECIST 1.1), or death due to any cause. Subjects who did not progress or die will be censored on the date of their last evaluable tumor assessment. Subjects who did not have any on study tumor assessments will be censored at the first dose date for subjects. Subjects who started any palliative local therapy or subsequent anti-cancer therapy without a prior reported progression will be censored on the date of their last evaluable tumor assessment prior to the initiation of the palliative local therapy or subsequent anti-cancer therapy, whichever procedure occurred first.

The secondary endpoints are (i) ORR by blinded independent central review per RECIST 1.1 in all treated subjects treated with nivolumab in combination with ipilimumab as first line therapy; (ii) PFS based on blinded independent central review assessment per RECIST 1.1; (iii) OS; (iv) ORR, PFS, and OS by PD-L1 expression levels; and (iv) tumor cell total somatic mutations and their association with ORR, PFS, and OS.

Preliminary Results

Thirty-six participants with minimum follow-up of 11 weeks (longest follow-up 9 month, median follow-up 4.7 month) have been treated with nivolumab plus ipilimumab in combination with chemotherapy. There was 1 case of dose limiting toxicities (DLTs) as defined by hepatic enzyme elevation. Twenty-five percent of participants experienced drug-related SAEs, 8% of participants had treatment-related discontinuations of nivolumab, ipilimumab, and chemotherapy. No safety concerns were observed with ongoing monitoring.

Dose limiting toxicities were defined as any of the following, which occur during the first 9 weeks: (i) any Grade 2 drug-related uveitis or eye pain that does not respond to topical therapy and does not improve to Grade 1 severity within the re-treatment period OR requires systemic treatment; (ii) any Grade 2 drug-related pneumonitis or interstitial lung disease that does not resolve to dose delay and systemic steroids in fourteen days (radiologic changes may take longer to resolve); (iii) any Grade 3 non-skin drug-related adverse event with the exception of laboratory abnormalities, that cannot be alleviated (defined as returning to grade 1, radiologic changes may take longer to resolve) or controlled by appropriate care within fourteen days (appropriate care being defined as treatment outlined in AE management algorithms in the investigators brochure); (iv) any Grade 4 drug-related adverse event including laboratory abnormalities except Grade 4 leukopenia or neutropenia lasting less than fourteen days and asymptomatic amylase/lipase evaluation; and (v) any of the following drug-related hepatic function laboratory abnormalities: AST or ALT>5-10×ULN for >2 weeks, AST or ALT>10×ULN, total bilirubin >5×ULN, concurrent AST or ALT>3×ULN and total bilirubin >2×ULN, and grade 3 thrombocytopenia associated with bleeding.

Example 3: A Phase 3, Randomized Study of Nivolumab Plus Ipilimumab in Combination with Chemotherapy as First Line Therapy in Stage IV NSCLC Early assessment of the tolerability data from the safety lead-in study of Example 2 showed that nivolumab 360 mg every 3 weeks and ipilimumab 1 mg/kg every 6 weeks with 2 cycles of platinum based chemotherapy is safe, with no DLTs after a minimal follow-up of 9 weeks. The present randomized phase 3 study evaluates safety in a larger cohort of patients and compares the efficacy and other outcomes in nivolumab plus ipilimumab combined with chemotherapy to chemotherapy alone.

Objectives

The primary objective of the present study is to compare the efficacy of nivolumab plus ipilimumab with chemotherapy vs. chemotherapy in participants with histologically confirmed stage IV NSCLC. Secondary objectives include (i) to evaluate efficacy outcomes in participants with histologically confirmed stage IV NSCLC treated with nivolumab plus ipilimumab combined with chemotherapy vs. chemotherapy with different PD-L1 expression levels; and (ii) to evaluate tumor mutation burden as a potential predictive biomarker of efficacy (such as ORR, PFS and OS) of nivolumab plus ipilimumab in combination with chemotherapy.

Exploratory objectives include to (i) evaluate candidate predictive biomarkers including, but not limited to, biomarkers within the tumor as well as within the periphery as potential predictive biomarkers of efficacy of nivolumab in plus ipilimumab in combination with chemotherapy; (ii) evaluate the safety and tolerability of nivolumab plus ipilimumab combined with chemotherapy; (iii) characterize the immunogenic potential of nivolumab and ipilimumab; (iv) characterize pharmacokinetics of nivolumab and ipilimumab; (v) assess overall health status using the EQ-5D descriptive system and visual analogue scale in participants receiving nivolumab in combination with ipilimumab plus chemotherapy and in participants receiving platinum doublet chemotherapy; (vi) evaluate the disease-related symptom burden in participants with histologically confirmed stage IV NSCLC treated with nivolumab plus ipilimumab combined with chemotherapy as compared to chemotherapy; (vii) assess healthcare resource utilization HCRU of participants; and (viii) evaluate the efficacy of nivolumab plus ipilimumab with chemotherapy as compared to chemotherapy in participants with histologically confirmed stage IV NSCLC after next line of treatment.

Study Design

Figure 2:
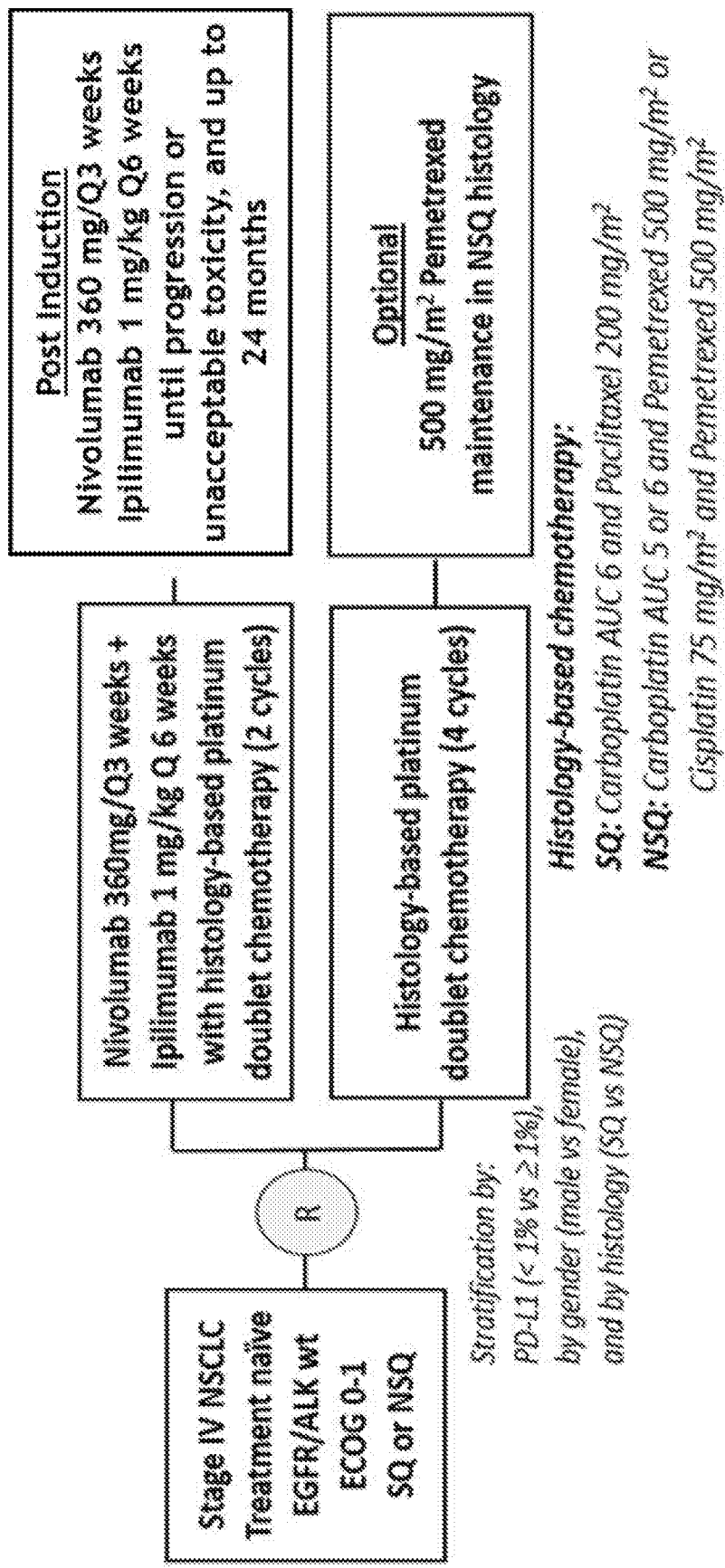
FIG. 2 shows the study design for a clinical trial evaluating the safety and efficacy of treating stage IV NSCLC using a combination of nivolumab and ipilimumab and a lead-in treatment comprising histology-based platinum doublet chemotherapy. SQ=squamous; NSQ=non-squamous.

The present study has two arms: a treatment arm and a control arm (FIG. 2). For the treatment arm, subjects are administered an induction treatment of nivolumab intravenously and ipilimumab intravenously and 2 cycles of histology-based platinum doublet chemotherapy, followed by nivolumab and ipilimumab until disease progression or unacceptable toxicity. Treatment with nivolumab and ipilimumab will be given for up to twenty-four months in the absence of disease progression or unacceptable toxicity. Subjects in the treatment arm receive nivolumab at 360 mg every 3 weeks and ipilimumab at 1 mg/kg every 6 weeks. The 2 cycles of histology-based platinum doublet chemotherapy are histology-based. Subjects exhibiting squamous histology are administered carboplatin AUC 6 plus paclitaxel 200 mg/m$^2$. Subjects exhibiting non-squamous histology are administered (i) carboplatin AUC 5 or 6 plus pemetrexed 500 mg/m$^2$ or (ii) cisplatin 75 mg/m$^2$+pemetrexed 500 mg/m$^2$. The investigator must decide prior to randomization whether or not the participant with non-squamous histology will receive cisplatin, if eligible. Chemotherapy is administered on day 1 of each three-week cycle, e.g., on day 1 of the first three-week cycle and again on day 1 of the second three-week cycle (Table 8). After two cycles of induction treatment, nivolumab 360 mg every 3 weeks and ipilimumab 1 mg/kg every 6 weeks continues until progression, unacceptable toxicity, or other predetermined reasons.

TABLE 8

Treatments Administered.

| | Week 1, Cycle 1 Day 1 ± 3 Days | Week 4, Cycle 2 Day 1 ± 3 Days | Week 7, Cycle 3 Day 1 ± 3 Days |
|---|---|---|---|
| Nivolumab (360 mg q3 weeks) + ipilimumab (1 mg/kg q6 weeks) + platinum-based doublet chemotherapy q 3 week x 2 cycles followed by nivolumab (360 mg q 3 weeks) + ipilimumab (1 mg/kg q 6 weeks) | Cycle 1 Nivolumab + Ipilimumab + Histology-based chemotherapy | Cycle 2 Nivolumab + Histology-based chemotherapy | Cycle 3 Nivolumab + Ipilimumab |
| Platinum-based doublet chemotherapy q 3 week x 4 followed by optional maintenance Pemetrexed for non-squamous histology | Cycle 1 Histology-based chemotherapy | Cycle 2 Histology-based chemotherapy | Cycle 3 Histology-based chemotherapy |

Both nivolumab and ipilimumab should be administered as 30 minute infusions. Nivolumab is administered first. Ipilimumab is administered after at least 30 minutes after completion of the nivolumab infusion. Platinum-doublet starts at least 30 minutes after completion of the nivolumab or ipilimumab infusion (if ipilimumab is scheduled to be given). At the investigator's discretion, nivolumab or ipilimumab may be administered over a longer infusion time (60 minutes) if the participant developed a prior infusion reaction.

Participants are permitted the use of topical, ocular, intra-articular, intranasal, and inhalational corticosteroids (with minimal systemic absorption). Adrenal replacement steroid doses >10 mg daily prednisone are permitted. A brief (less than 3 weeks) course of corticosteroids for prophylaxis (e.g., contrast dye allergy) or for treatment of non-autoimmune conditions (e.g., delayed-type hypersensitivity reaction caused by a contact allergen) is permitted. Regular concomitant use of bisphosphonates and RANK-L inhibitors for prevention or reduction of skeletal-related events in patients with bone metastases is allowed if initiated prior to first dose of study therapy. Prior palliative radiotherapy must have been completed at least 2 weeks prior to treatment.
Paclitaxel and Carboplatin Participants will receive paclitaxel 200 mg/m$^2$ as a 180-minute IV infusion with carboplatin at a dose of AUC 6 as a 30-minute IV infusion, on Day 1 of a 3-week cycle, or at doses per the local prescribing information. The infusion time can follow local institutional standard. Paclitaxel dosing calculations should be based on the body surface area calculation. The dose may remain the same if the participant's weight is within 10% of the baseline weight or prior dose weight. Oral corticosteroid should be given according to local standard at a dose equivalent to dexamethasone 20 mg 12 hours and 6 hours prior to paclitaxel administration. Oral or intravenous diphenhydramine (or its equivalent) 50 mg and H2-blocker (per local standard of care) should be administered 30 to 60 minutes prior to paclitaxel infusion. Doses of paclitaxel and/or carboplatin may be interrupted, delayed, reduced, or discontinued depending on how well the participant tolerates the treatment.

Carboplatin should be given following paclitaxel on Day 1 of each cycle, and the carboplatin dose will be calculated using the Calvert formula as follows: carboplatin dose (mg) is equal to the target AUC×([CrCl (ml/min)+25]. The creatinine clearance (CrCl) calculation is based on the Cockcroft-Gault formula and should include the most recent serum creatinine and most recent weight. Note that if calculation of the CrCl by the Cockcroft-Gault formula yields a result of >125 mL/min, then a CrCl should be calculated by an alternative formula per institutional standards or capped at 125 mL/min. The dose of carboplatin may be capped per local standards.
Pemetrexed and Cisplatin Pemetrexed dosing calculations should be based on the body surface area calculation. The dose may remain the same if the participant's weight is within 10% weight used to calculate the previous dose. Oral corticosteroid should be given according to local standards at a dose equivalent todexamethasone 4 mg BID on the day prior to, the day of, and the day after the administration of pemetrexed. Oral folic acid 350 to 1000 mcg daily should be given starting 1 week prior to the first dose of pemetrexed, with at least 5 doses of folic acid administered in the 7 days prior to the first dose. Oral folic acid should be continued daily throughout the treatment with pemetrexed and for 21 days after the last dose of pemetrexed. Intramuscular (IM) injection of vitamin B12 1000 mcg should be given approximately one week prior to the first dose of pemetrexed and repeated every 3 cycles thereafter during pemetrexed treatment. Subsequent injections of vitamin B12 may be given on the same day as pemetrexed. (Participant with non-squamous histology may begin folic acid and vitamin B12 prior to randomization in anticipation of pemetrexed). Antiemetic premedication will be administered according to local standards. Recommended antiemetic treatments are dexamethasone (dosing according to local standards; an equivalent dose of another corticosteroid may be substituted) and a 5-HT3 receptor antagonist (type per investigator discretion and local standards-of-care). Additional use of antiemetic premedications may be employed at the discretion of the Investigator.

Participants will receive pemetrexed at a dose of 500 mg/m$^2$ as a 10 minute IV infusion on day 1 with cisplatin at a dose of 75 mg/m$^2$ infusion as per local standard practice on day 1 of a 3-week treatment cycle for up to 2 cycles in treatment arm or 4 cycles in control arm.

Cisplatin will be administered to participants at least 30 minutes following the end of the pemetrexed infusion. Pretreatment hydration for cisplatin can follow local standard of care, or use 1 to 2 liters of fluid (per local standards) infused IV for 8 to 12 hours prior to cisplatin infusion is recommended. Adequate hydration and urinary output must be maintained for at least 24 hours following cisplatin administration. Administration and monitoring should be performed according to local standards. Use of mannitol following the cisplatin infusion should also follow local standards-of-care.

Participants who discontinue cisplatin alone may, at the investigator's discretion, be switched to pemetrexed/carboplatin for the remainder of the platinum-based doublet cycles (up to 2 cycles in treatment arm or 4 cycles in control arm in total). Dosing for pemetrexed/carboplatin for such participants should follow the instructions in the pemetrexed/carboplatin with or without Pemetrexed Continuation Maintenance section below.

Pemetrexed and Carboplatin

Participants will receive pemetrexed at a dose of 500 mg/m2 as a 10-minute IV infusion on Day 1, followed by carboplatin at a dose of AUC 5 or 6 as a 30-minute IV infusion, on Day 1 of a 3-week treatment cycle, for up to 4 cycles. The dose of carboplatin will be calculated as described above.

Control Arm

For the control arm, participants receive four cycles of histology-based platinum chemotherapy. Subjects exhibiting squamous histology are administered carboplatin AUC 6 plus paclitaxel 200 mg/m². Subjects exhibiting non-squamous histology are administered (i) carboplatin AUC 5 or 6 plus pemetrexed 500 mg/m² or (ii) cisplatin 75 mg/m²+ pemetrexed 500 mg/m². The investigator must decide prior to randomization whether or not the participant with non-squamous histology will receive cisplatin, if eligible. Chemotherapy is administered on day 1 of each three-week cycle. Participants with non-squamous histology who have stable disease or response after induction chemotherapy are permitted to receive optional pemetrexed maintenance therapy: 500 mg/m² pemetrexed on day 1 of each three week cycle until disease progression or unacceptable toxicity, or other predetermined reasons.

PD-L1 Expression

Participants will be assessed by PD-L1 expression, and categorized into 3 groups (PD-L1 positive, PD-L1 negative, and PD-L1 not quantifiable). PD-L1 status will be determined by Dako PD-L1 IHC 28-8 pharmDx test for IHC staining of PD-L1 protein in the submitted tumor sample. PD-L1 positive is characterized by ≥1% tumor cell membrane staining in a minimum of a hundred evaluable tumor cells. PD-L1 negative is characterized by <1% tumor cell membrane staining in a minimum of a hundred evaluable tumor cells. Participants that are PD-L1 not quantifiable have tumor biopsy specimens without quantifiable PD-L1 expression. Participants tested but with not quantifiable PD-L1 will stratify with PD-L1 negative participants. PD-L1 not quantifiable population will be capped to 10% of total randomized population.

Dose Reduction for Chemotherapy

Dose reductions of chemotherapy may be required, and will be performed according to Table 9. Chemotherapy dose reductions are permanent; once the dose of any chemotherapy agent is reduced, it may not be re-escalated in subsequent cycles, except as noted when starting pemetrexed maintenance therapy. The dose reductions for each agent in the platinum-based doublet chemotherapy regimen are not linked and may be adjusted independently as summarized below.

TABLE 9

Dose Modifications of Chemotherapeutic Agents

| Dose Level | Carboplatin | Pemetrexed | Paclitaxel | Cisplatin |
|---|---|---|---|---|
| Starting Dose | AUC 6 or AUC 5 | 500 mg/m² | 200 mg/m² | 75 mg/m² |
| First Dose Reduction | AUC 5 (if starting dose is AUC6) or AUC 4 (if starting dose is AUC 5) | 375 mg/m² | 150 mg/m² | 56 mg/m² |
| Second Dose Reduction | AUC 4 (if starting dose is AUC6) or AUC 3 (if starting dose is AUC 5) | 250 mg/m² | 100 mg/m² | 38 mg/m² |
| Third Dose Reduction | Discontinue | Discontinue | Discontinue | Discontinue |

Study Population

Approximately 700 patients will be randomized to the treatment arm and control arm in a 1:1 ration. Participants must have histologically confirmed stage IV non-small cell lung cancer (NSCLC), squamous or non-squamous histology, as defined by the 7th International Association for the Study of Lung Cancer Classification. Subjects must not have had a prior systemic therapy for stage IV disease. Subjects must be EGFR/ALK wild type and have an ECOG Performance Status of ≤1. Participants are to have tumor tissue sample for biomarker analysis, and participants must have PD-L1 IHC testing with results available for randomization or PD-L1 testing will be performed by the central laboratory Prior definitive chemoradiation for locally advanced disease is permitted as long as the last administration of chemotherapy or radiotherapy (which ever was given last) occurred at least 6 months prior to enrollment. Locally advanced disease with recurrence after chemoradiation therapy (stage IIIB disease, specifically refers to patients with no curative options), is eligible to enroll. Prior adjuvant or neoadjuvant chemotherapy for early stage lung cancer is permitted if completed at least 6 months prior to initiating study treatment. Prior palliative radiotherapy to non-CNS lesions must have been completed at least 2 weeks prior to treatment. Subjects with symptomatic tumor lesions at baseline that may require palliative radiotherapy within 4 weeks of first treatment are strongly encouraged to receive palliative radiotherapy prior to treatment.

Subjects will be excluded for any of the following reasons. Participants with known EGFR mutations which are sensitive to available targeted inhibitor therapy (including, but not limited to, deletions in exon 19 and exon 21 [L858R] substitution mutations) are excluded. All participants with non-squamous histology must have been tested for EGFR mutation status. EGFR test is to be done locally. EGFR test is not provided by a third party laboratory. Use of a FDA-approved or local Health Authority-approved test is strongly encouraged. Participants of non-squamous histology with unknown or indeterminate EGFR status are excluded. Participants with known ALK translocations which are sensitive to available targeted inhibitor therapy are excluded. If tested, use of an FDA-approved test is strongly encouraged. Participants with unknown or indeterminate ALK status may be enrolled. Participants with untreated CNS metastases are excluded. Participants are eligible if CNS metastases are adequately treated and participants are neurologically returned to baseline (except for residual signs or symptoms related to the CNS treatment) for at least 2 weeks prior to first treatment. In addition, participants must be either off corticosteroids, or on a stable or decreasing dose of ≤10 mg daily prednisone (or equivalent) for at least 2 weeks prior to first treatment. Participants with carcinomatous meningitis will be excluded. Participants with previous malignancies (except non-melanoma skin cancers, and in situ cancers such as the following: bladder, gastric, colon, cervical/dysplasia, melanoma, or breast) are excluded unless a complete remission was achieved at least 2 years prior to first treatment and no additional therapy is required or anticipated to be required during the study period. Participants with an active, known or suspected autoimmune disease. Participants with type I diabetes mellitus, hypothyroidism only requiring hormone replacement, skin disorders (such as vitiligo, psoriasis, or alopecia) not requiring systemic treatment, or conditions not expected to recur in the absence of an external trigger are permitted to enroll. Participants with a condition requiring systemic treatment with either corticosteroids (>10 mg daily prednisone equivalent) or other immunosuppressive medications within 14 days of first treatment. Inhaled or topical steroids, and adrenal replacement steroid >10 mg daily prednisone equivalent, are permitted in the absence of active autoimmune disease.

Endpoints

The primary endpoint is to determine overall survival (OS). Additional endpoints include (i) PFS and ORR; (ii) OS, PFS, and ORR for participants with different PD-L1 levels; (iii) tumor cell total somatic mutation numbers and their association with ORR, PFS, and OS; (iv) gene expression signatures (e.g., tumor inflammatory gene expression signatures, driver mutations, immune cell infiltrates, tumor inflammation, immune cell infiltration etc.), drive mutations (e.g., STK11, KRAS) as well as peripheral markers and soluble factors within blood (e.g., cytokines, solHLA, soluble inflammatory/immunosuppressive factors) and other factors within blood (e.g., MDSC, miRNA) and their association with clinical outcomes (ORR, PFS, and OS); (v) blood TMB analysis using plasma circulating free DNA; (vi) incidence of AEs, SAEs, and select AEs; (vii) anti-nivolumab and anti-ipilimumab antibodies and their relationship with other outcome measures; (viii) pharmacokinetic (PK) measurements of nivolumab and ipilimumab; (ix) the EQ-5D-3L descriptive system and Visual Analogue Scale (EQ-5D VAS); (x) Lung Cancer Symptom Score (LCSS) average symptom burden index (ASBI); (xi) HCRU incidence; and (xii) PFS after next line treatment (PF S2).

Biomarkers

Tumor Tissue Specimens

Archival (or fresh) FFPE tumor tissue is to be collected within 3 months prior to enrollment. As feasible, an optional fresh biopsy at baseline or at the time of clinical progression may also be collected. Samples collected at progression may provide important information about mechanisms underlying the biology of acquired resistance and are therefore extremely valuable in these exploratory studies.

Tissue samples must be sent to a central laboratory for determination of PD-L1 status using the analytically validated IHC assay. PD-L1 stained tissue samples will be assessed by a pathologist at a central laboratory identified by the Sponsor and scored as PD-L1 expressing if membrane staining is observed in ≥1% tumor cells among a minimum of 100 evaluable tumor cells.

To explore the potential association of tumor mutation burden with clinical outcomes, tumor tissue will be evaluated by targeted and/or whole exome sequencing. Gene expression signatures such as but not limited to those associated with inflammatory processes and/or immune related signaling will also be evaluated by targeted and/or whole transcriptome RNA sequencing for potential association with clinical outcomes.

Tissue may also be analyzed by IHC or similar methodology to determine the abundance of immunoregulatory proteins such as, but not limited to, PD-L1, PD L2, PD-1, and other markers associated with TILs (e.g., CD4, CD8, FOXP3). These data will be evaluated for potential association with clinical endpoints.

Single Nucleotide Polymorphisms (SNPs)

Whole blood will be collected from all participants prior to treatment to generate genomic DNA for SNP analyses. These analyses will focus on SNPs within genes associated with PD-1 and other immunoregulatory signaling pathways to determine if natural variation within those genes is associated with response to nivolumab and/or with adverse events during treatment. Genomic DNA derived from whole blood may also be used for germ line control for whole exome sequencing studies in tumor.

Serum Soluble Factors

To understand the prevalence of circulating proteins and the impact they may have on the clinical activity of nivolumab, the protein concentrations of a panel of cytokines, chemokines, and other relevant immunomodulatory, serum-soluble factors (e.g., soluble PD-L1) will be investigated at baseline and during treatment.

Serum MicroRNA (miRNA)

MicroRNAs (miRNA) are widely-expressed, small RNAs that regulate the abundance of mRNA transcripts and their translation into protein. Global miRNA expression profiling has become increasingly common in cancer research, and miRNA signatures that are correlated to stage of disease or to clinical outcomes are now available for a variety of cancer types. Expression profiling of miRNA may be useful also in identifying molecular markers for the prediction of drug-responses and for prospective stratification. Intriguingly, miRNAs are stable in serum and may represent miRNAs over-expressed in tumors and/or reflect immune system activity. Serum taken at baseline and during treatment from participants randomized to each treatment arm will be analyzed for miRNA content by microarray or similar methodology. The resulting miRNA profiles will be evaluated for changes in miRNA abundance that occurs following treatment and for associations with response and survival data. Ultimately, the goal will be to determine if unique, immune-relevant and/or NSCLC-relevant miRNA signatures exist and if they are potentially useful for identifying patients who are likely (or unlikely) to respond to nivolumab treatment.

Myeloid Derived Suppressor Cells (MDSC)

Myeloid derived suppressor cells are an immune cell population capable of suppressing T cell activation and proliferation. Low pre-treatment myeloid derived suppressor cells (MDSC) levels in peripheral blood may be associated with better OS in melanoma patients treated with the immunotherapeutic agent ipilimumab. MDSCs will be measured at baseline/pre-treatment and on-treatment to assess associations with outcomes.

Peripheral Blood Mononuclear Cells (PBMCs)

Peripheral blood mononuclear cells in whole blood taken from participants at baseline and on treatment and will be analyzed by flow cytometry or other methods (e.g., ELIspot) to assess immune cell activity.

Blood TMB Using Plasma Circulating Cell Free DNA (cfDNA)

Circulating/cell free DNA (cfDNA) are small fragments of DNA that are shed from tumor and from non-malignant cells and can be found circulating in the peripheral bloodstream. cfDNA derived from malignant cells can be isolated and analyzed from blood-derived plasma for genetic features including, but not limited to somatic mutations using targeted sequencing-based methods (e.g., Next Generation sequencing). To complement the planned genomics analyses outlined for tumor assessments, plasma will be collected at baseline and on-treatment to isolate cfDNA. Mutational data derived from these samples will be compared to those identified directly in the tumor. Baseline and on-treatment changes in mutational burden (either global or individual genes) will be evaluated for association with treatment outcomes. Correlation between mutational burden in blood and the tumor will be explored.

On Oct. 21, 2019, it was announced that the investigational arm of this study met its primary endpoint of superior overall survival (OS) at a pre-specified interim analysis. The comparator in this study was chemotherapy alone for up to four cycles followed by optional maintenance therapy. The safety profile of nivolumab plus low-dose ipilimumab and two cycles of chemotherapy in this study was reflective of the known safety profiles of the immunotherapy and chemotherapy components in first-line NSCLC.

What is claimed is:

1. A method of treating a tumor in a subject afflicted with a non-small cell lung carcinoma (NSCLC), comprising:
   (1) administering to the subject (i) a platinum doublet chemotherapy comprising carboplatin and paclitaxel, (ii) a flat dose of about 360 mg of an anti-PD-1 antibody or antigen binding portion thereof, and (iii) a dose of about 1 mg/kg of an anti-CTLA-4 antibody or antigen binding portion thereof on day 1 of a first 3-week cycle, and administering to the subject (i) the platinum based doublet chemotherapy and (ii) a flat dose of about 360 mg of the anti-PD-1 antibody on day 1 of a second 3 week cycle; and
   (2) administering to the subject (i) a flat dose of about 360 mg of the anti-PD-1 antibody once about every 3 weeks and (ii) a dose of about 1 mg/kg of the anti-CTLA-4 antibody once about every 6 weeks.

2. The method of claim 1, wherein the anti-PD-1 antibody comprises nivolumab or pembrolizumab.

3. The method of claim 1, wherein the anti-CTLA-4 antibody comprises ipilimumab or tremelimumab.

4. The method of claim 1, wherein (i) the tumor has a tumor mutational burden (TMB) status that is a high TMB, (ii) at least 1% of tumor cells exhibit membrane PD-L1 expression; or both (i) and (ii).

5. The method of claim 1, further comprising administering an additional anticancer therapy to the subject.

6. The method of claim 5, wherein the additional anticancer therapy comprises administering an antibody or an antigen-binding portion thereof that specifically binds LAG3, TIGIT, TIM3, NKG2a, OX40, ICOS, MICA, CD137, KIR, TGFβ, IL-10, IL-8, B7-H4, Fas ligand, CXCR4, mesothelin, CD27, GITR, or any combination thereof.

7. The method of claim 1, wherein the platinum doublet chemotherapy comprises carboplatin AUC 6 and paclitaxel 200 mg/m$^2$.

8. The method of claim 1, wherein the anti-PD-1 antibody comprises nivolumab.

9. The method of claim 1, wherein the anti-CTLA-4 antibody comprises ipilimumab.

10. The method of claim 8, wherein the anti-CTLA-4 antibody comprises ipilimumab.

11. The method of claim 8, wherein the platinum doublet chemotherapy comprises carboplatin AUC 6 and paclitaxel 200 mg/m$^2$.

12. The method of claim 9, wherein the platinum doublet chemotherapy comprises carboplatin AUC 6 and paclitaxel 200 mg/m$^2$.

13. The method of claim 10, wherein the platinum doublet chemotherapy comprises carboplatin AUC 6 and paclitaxel 200 mg/m$^2$.

14. The method of claim 1, wherein the NSCLC is a squamous cell NSCLC.

15. The method of claim 8, wherein the NSCLC is a squamous cell NSCLC.

16. The method of claim 9, wherein the NSCLC is a squamous cell NSCLC.

17. The method of claim 12, wherein the NSCLC is a squamous cell NSCLC.

18. The method of claim 13, wherein the NSCLC is a squamous cell NSCLC.

19. A method of treating a tumor in a subject afflicted with a metastatic NSCLC, comprising:
   (1) administering to the subject (i) a platinum doublet chemotherapy comprising carboplatin and paclitaxel, (ii) a flat dose of about 360 mg nivolumab, and (iii) a dose of about 1 mg/kg ipilimumab on day 1 of a first 3-week cycle, and administering to the subject (i) the platinum doublet chemotherapy comprising carboplatin and paclitaxel and (ii) a flat dose of about 360 mg nivolumab on day 1 of a second 3-week cycle; and
   (2) administering to the subject (i) a flat dose of about 360 mg nivolumab once about every 3 weeks and (ii) a dose of about 1 mg/kg ipilimumab once about every 6 weeks after (1) until disease progression, unacceptable adverse events, complete response, or two years.

20. A method of treating a tumor in a subject afflicted with a metastatic NSCLC, comprising:
   (1) administering to the subject (i) carboplatin AUC 6 and paclitaxel 200 mg/m$^2$, (ii) a flat dose of about 360 mg nivolumab, and (iii) a dose of about 1 mg/kg ipilimumab on day 1 of a first 3-week cycle, and administering to the subject (i) carboplatin AUC 6 and paclitaxel 200 mg/m$^2$ and (ii) a flat dose of about 360 mg nivolumab on day 1 of a second 3-week cycle; and
   (2) administering to the subject (i) a flat dose of about 360 mg nivolumab once about every 3 weeks and (ii) a dose of about 1 mg/kg ipilimumab once about every 6 weeks after (1) until disease progression, unacceptable adverse events, complete response, or two years.

* * * * *